US012720236B2

(12) United States Patent
Ikeda et al.

(10) Patent No.: US 12,720,236 B2
(45) Date of Patent: Aug. 25, 2026

(54) PHOTODETECTION DEVICE

(71) Applicant: Sony Semiconductor Solutions Corporation, Kanagawa (JP)

(72) Inventors: Yasuji Ikeda, Kanagawa (JP); Qing Ding, Kanagawa (JP); Noam Zeev Eshel, Pardessia (IL)

(73) Assignee: Sony Semiconductor Solutions Corporation, Kanagawa (JP)

( * ) Notice: Subject to any disclaimer, the term of this patent is extended or adjusted under 35 U.S.C. 154(b) by 76 days.

(21) Appl. No.: 18/865,995

(22) PCT Filed: Jul. 4, 2022

(86) PCT No.: PCT/JP2022/026565

§ 371 (c)(1),
(2) Date: Nov. 14, 2024

(87) PCT Pub. No.: WO2024/009343

PCT Pub. Date: Jan. 11, 2024

(65) Prior Publication Data

US 2025/0324177 A1 Oct. 16, 2025

(51) Int. Cl.

*H04N 25/773* (2023.01)
*G01J 1/42* (2006.01)

(Continued)

(52) U.S. Cl.

CPC .............. *H04N 25/773* (2023.01); *G01J 1/42* (2013.01); *G01J 11/00* (2013.01); *H04N 23/55* (2023.01);

(Continued)

(58) Field of Classification Search

CPC ...... H04N 23/55; H04N 23/665; H04N 25/53; H04N 25/77; H04N 25/773; G01J 1/42; G01J 11/00

See application file for complete search history.

(56) References Cited

U.S. PATENT DOCUMENTS

2020/0213542 A1* 7/2020 Ikeda .................. H04N 13/271
2020/0252563 A1* 8/2020 Yasuda ................ H04N 25/704

FOREIGN PATENT DOCUMENTS

JP 2019140537 A 8/2019
JP 2020145502 A * 9/2020 ........... H04N 25/773

(Continued)

OTHER PUBLICATIONS

International Search Report (PCT/ISA/210), International Application No. PCT/JP2022/026565, dated Sep. 27, 2022.

*Primary Examiner* — Lin Ye
*Assistant Examiner* — Chriss S Yoder, III
(74) *Attorney, Agent, or Firm* — Michael Best & Friedrich LLP

(57) ABSTRACT

Improved image quality in photodetection devices that count pulses with a counter is disclosed. In one example, a first sensor unit generates a first pulse signal in response to incidence of photons. A second sensor unit generates a second pulse signal in response to incidence of photons. A first counter counts a count value in synchronization with one of a plurality of signals including the first and second pulse signals, and outputs a first digital signal indicating the count value and a first carry flag indicating whether or not overflow has occurred. A second counter counts a count value in synchronization with one of the first carry flag and the second pulse signal, and outputs a second digital signal indicating the count value.

19 Claims, 46 Drawing Sheets

(51) Int. Cl.
*G01J 11/00* (2006.01)
*H04N 23/55* (2023.01)
*H04N 23/60* (2023.01)
*H04N 25/53* (2023.01)
*H04N 25/77* (2023.01)

(52) U.S. Cl.
CPC ........... *H04N 23/665* (2023.01); *H04N 25/53* (2023.01); *H04N 25/77* (2023.01)

(56) References Cited

FOREIGN PATENT DOCUMENTS

| | | | |
|---|---|---|---|
| JP | 2021022921 | A | 2/2021 |
| JP | 2021044782 | A | 3/2021 |
| JP | 2021093583 | A | 6/2021 |
| JP | 2022070170 | A | 5/2022 |
| WO | 2022091856 | A1 | 5/2022 |

* cited by examiner

| MODE | EXPOSURE TARGET | IN_SEL | CNT_SEL | EN_A | EN_B |
|---|---|---|---|---|---|
| LOW ILLUMINANCE MODE | A AND B | 1 (PLS_A) | 0 (PLS_B) | 0 (ENABLE) | 0 (ENABLE) |
| HIGH ILLUMINANCE MODE | ONLY A | 1 (PLS_A) | 1 (CF) | 0 (ENABLE) | 1 (DISABLE) |
| | ONLY B | 0 (PLS_B) | 1 (CF) | 1 (DISABLE) | 0 (ENABLE) |

FIG. 22

| COUNT INTERVAL | EXPOSURE TARGET | IN_SEL | CNT_SEL | EN_A | EN_B |
|---|---|---|---|---|---|
| LONG INTERVAL | A AND B | 1 (PLS_A) | 0 (PLS_B) | 0 (ENABLE) | 0 (ENABLE) |
| SHORT INTERVAL | ONLY A | 1 (PLS_A) | 1 (CF) | 0 (ENABLE) | 1 (DISABLE) |
| | ONLY B | 0 (PLS_B) | 1 (CF) | 1 (DISABLE) | 0 (ENABLE) |

FIG. 26

| GROUP | COUNT INTERVAL | EXPOSURE TARGET | IN_SEL | CNT_SEL | EN_A | EN_B |
|---|---|---|---|---|---|---|
| LONG INTERVAL GROUP | P1 (LONGEST) | A AND B | 1 (PLS_A) | 0 (PLS_B) | 0 (ENABLE) | 0 (ENABLE) |
| | P2(<P1) | A AND B | 1 (PLS_A) | 0 (PLS_B) | 0 (ENABLE) | 0 (ENABLE) |
| SHORT INTERVAL GROUP | P3(<P2) | ONLY A | 1 (PLS_A) | 1 (CF) | 0 (ENABLE) | 1 (DISABLE) |
| | | ONLY B | 0 (PLS_B) | 1 (CF) | 1 (DISABLE) | 0 (ENABLE) |
| | P4(<P3) | ONLY A | 1 (PLS_A) | 1 (CF) | 0 (ENABLE) | 1 (DISABLE) |
| | | ONLY B | 0 (PLS_B) | 1 (CF) | 1 (DISABLE) | 0 (ENABLE) |

FIG. 37

| MODE | EXPOSURE TARGET | IN_SEL | CNT_SEL | EN_A | EN_B |
|---|---|---|---|---|---|
| NON-ADDITION MODE | A AND B | 1 (PLS_A) | 0 (PLS_B) | 0 (ENABLED) | 0 (ENABLED) |
| ADDITION MODE | | 0 (LOGICAL SUM) | 1 (CF) | 0 (ENABLED) | 0 (ENABLED) |

FIG. 42

| MODE | IN_SEL1 | CNT_SEL1 | IN_SEL2 | CNT_SEL2 |
|---|---|---|---|---|
| NON-ADDITION MODE | 1 (PLS_A) | 0 (PLS_B) | 1 (PLS_C) | 0 (PLS_D) |
| 2-PIXEL ADDITION MODE | 0 (LOGICAL SUM OF A AND B) | 1 (CF_A) | 0 (LOGICAL SUM OF C AND D) | 1 (CF_C) |
| 4-PIXEL ADDITION MODE | 2 (LOGICAL SUM OF A TO D) | 1 (CF_A) | 2 (CF_B) | 1 (CF_C) |

FIG. 43

| MODE | EXPOSURE TARGET | IN_SEL | CNT_SEL | EN_A | EN_B |
|---|---|---|---|---|---|
| NON-ADDITION LOW ILLUMINANCE MODE | A AND B | 1 (PLS_A) | 0 (PLS_B) | 0 (ENABLE) | 0 (ENABLE) |
| NON-ADDITION HIGH ILLUMINANCE MODE | ONLY A | 1 (PLS_A) | 1 (CF) | 0 (ENABLE) | 1 (DISABLE) |
| | ONLY B | 0 (PLS_B) | 1 (CF) | 1 (DISABLE) | 0 (ENABLE) |
| ADDITION MODE | A AND B | 1 (LOGICAL SUM) | 1 (CF) | 0 (ENABLE) | 0 (ENABLE) |

PHOTODETECTION DEVICE

TECHNICAL FIELD

The present technology relates to a photodetection device. Specifically, the present invention relates to a photodetection device that counts the number of photons.

BACKGROUND ART

Conventionally, in an imaging device or the like, a solid-state imaging element in which a plurality of pixels is arranged is used to capture image data. For example, a photodetection device in which a single-photon avalanche diode (SPAD), a waveform shaper that generates a pulse signal, and a counter that counts the number of pulses are provided for each pixel has been proposed (see, for example, Patent Document 1). In this photodetection device, when one counter of two pixels is saturated, a combined signal of pulse signals of the two pixels is counted by the other counter.

CITATION LIST

Patent Document

Patent Document 1: Japanese Patent Application Laid-Open No. 2019-140537

SUMMARY OF THE INVENTION

Problems to be Solved by the Invention

In the above-described conventional technique, pixel addition is performed when one counter of two pixels is saturated, thereby securing linearity of a combined signal. However, in the photodetection device described above, the maximum count value of each pixel cannot be increased, and the dynamic range cannot be expanded. If the resolution of each counter of the pixel is increased, the dynamic range can be expanded and the image quality can be improved, but the circuit scale of the counter is increased, which is not preferable.

The present technology has been made in view of such a situation, and an object thereof is to improve image quality in a photodetection device that counts the number of pulses with a counter.

Solutions to Problems

The present technology has been made to solve the above-described problems, and a first aspect thereof is a photodetection device including: a first sensor unit that generates a first pulse signal in response to incidence of photons; a second sensor unit that generates a second pulse signal in response to incidence of photons; a first counter that counts a count value in synchronization with one of a plurality of signals including the first and second pulse signals, and outputs a first digital signal indicating the count value and a first carry flag indicating whether or not overflow has occurred; and a second counter that counts a count value in synchronization with one of the first carry flag and the second pulse signal and outputs a second digital signal indicating the count value. Therefore, this brings about an effect that the resolution of the counter is extended.

Furthermore, in the first aspect, the photodetection device may further include: a first multiplexer that selects one of the first and second pulse signals and outputs a selected signal to the first counter as a first output signal; and a second multiplexer that selects one of the first carry flag and the second pulse signal and outputs a selected one to the second counter as a second output signal. The first counter may count in synchronization with the first output signal. The second counter may count in synchronization with the second output signal. Therefore, this brings about an effect that the number of pulses is counted in synchronization with the output signal of the multiplexer.

Furthermore, in the first aspect, the first multiplexer may select the first pulse signal in a case where a low illuminance mode in which illuminance does not exceed a predetermined value is set, and may alternately select the first and second pulse signals in a case where a high illuminance mode in which illuminance is higher than the predetermined value is set. The second multiplexer may select the second pulse signal in a case where the low illuminance mode is set, and selects the first carry flag in a case where the high illuminance mode is set. Therefore, this brings about an effect that the resolution of the counter is extended at high illuminance.

Furthermore, in the first aspect, the photodetection device may further include: a determiner that determines whether or not illuminance is higher than the predetermined value on the basis of the first and second digital signals and sets one of the high illuminance mode and the low illuminance mode. Therefore, this brings about an effect that the illuminance is determined in the pixel.

Furthermore, in the first aspect, at least one of the first and second counters may output a specific bit of a digital signal to the determiner, and the determiner may set one of the high illuminance mode and the low illuminance mode on the basis of the specific bit. Therefore, this brings about an effect of simplifying the determiner.

Furthermore, in the first aspect, the first sensor unit may be arranged in one of first and second pixels of a same color among a plurality of pixels arranged in a pixel array unit, and the second sensor unit may be arranged in another pixel. Therefore, this brings about an effect that a difference in the count value for each pixel is suppressed.

Furthermore, in the first aspect, the photodetection device may further include: a microlens that guides incident light to a plurality of pixels of a same color including the first and second pixels. Therefore, this brings about an effect of facilitating detection of the phase difference.

Furthermore, in the first aspect, the photodetection device may further include: a control circuit that controls the first and second sensor units. Each of the first and second sensor units may include: an avalanche photodiode; and a recharge transistor that performs recharge to return a cathode potential of the avalanche photodiode to a predetermined potential. The control circuit may control a count interval, which is an interval at which the recharge is performed, to one of a plurality of intervals. The first multiplexer may select the first pulse signal in a case where the count interval is a long interval longer than a predetermined interval, and may alternately select the first and second pulse signals in a case where the count interval is a short interval shorter than the predetermined interval. The second multiplexer may select the second pulse signal in a case where the count interval is the long interval, and may select the first carry flag in a case where the count interval is the short interval. Therefore, this brings an effect that power consumption is reduced.

Furthermore, in the first aspect, the photodetection device may further include: a determiner that determines, on the basis of the first and second digital signals, whether or not counting of each of the first and second counters is set to be valid in a period in which a count interval is one of the long interval and the short interval. Each of the first and second sensor units may further include a logic gate that turns off the recharge transistor in a case where it is determined to set counting to be invalid. Therefore, this brings about an effect that the counting is controlled to be valid or invalid according to the illuminance.

Furthermore, in the first aspect, the first sensor unit may be arranged in one of a first pixel and a second pixel among a plurality of pixels arranged in a pixel array unit, and the second sensor unit may be arranged in another pixel. The control circuit may switch the count interval a plurality of times in a frame period for imaging one frame. The first and second multiplexers may switch a selection destination a plurality of times in the frame period. Therefore, this brings an effect that power consumption is reduced.

Furthermore, in the first aspect, the control circuit may sequentially select a plurality of rows of the pixel array unit and starts exposure. Therefore, this brings about an effect of improving the frame rate.

Furthermore, in the first aspect, the control circuit may select all pixels of the pixel array unit at a start of the frame period and simultaneously starts exposure, and may select all pixels immediately before an end of the frame period and simultaneously ends exposure. Therefore, this brings about an effect of suppressing rolling shutter distortion.

Furthermore, in the first aspect, the control circuit may sequentially select a plurality of rows of the pixel array unit in the frame period and starts exposure. Therefore, this brings about an effect of improving the frame rate.

Furthermore, in the first aspect, the control circuit may select all the pixels and simultaneously ends the exposure in the frame period, and may switch the count interval after completion of reading of all the pixels and then selects all the pixels and simultaneously starts exposure. Therefore, this brings about an effect of suppressing rolling shutter distortion.

Furthermore, in the first aspect, the control circuit may simultaneously select and expose one of first and second rows sharing a signal line for transmitting a digital signal, and may simultaneously select and expose another one of the first and second rows during reading of the one digital signal. Therefore, this brings about an effect of improving the frame rate.

Furthermore, in the first aspect, the photodetection device may further include: a first logic gate that outputs a result of a logic operation on the first and second pulse signals as a first operation result; a first multiplexer that selects one of a plurality of signals including the first pulse signal and the first operation result and outputs a selected one to the first counter as a first output signal; and a second multiplexer that selects one of the first carry flag and the second pulse signal and outputs a selected one to the second counter as a second output signal. The first counter may count in synchronization with the first output signal. The second counter may count in synchronization with the second output signal. Therefore, this brings about an effect of enabling pixel addition.

Furthermore, in the first aspect, the photodetection device may further include: a control circuit that controls the first and second sensor units. Each of the first and second sensor units may include: an avalanche photodiode; and a recharge transistor that performs recharge to return a cathode potential of the avalanche photodiode to a predetermined potential. The control circuit may control a count interval, which is an interval at which the recharge is performed, to one of a plurality of intervals. The first multiplexer may select the first pulse signal in a case where the count interval is a long interval longer than a predetermined interval, and may alternately select the first and second pulse signals in a case where the count interval is a short interval shorter than the predetermined interval. The second multiplexer may select the second pulse signal in a case where the count interval is the long interval, and may select the first carry flag in a case where the count interval is the short interval. Therefore, this brings an effect that power consumption is reduced.

Furthermore, in the first aspect, the photodetection device may further include: a third sensor unit that generates a third pulse signal in response to incidence of photons; a fourth sensor unit that generates a fourth pulse signal in response to incidence of photons; a second logic gate that outputs a result of a logic operation on the third and fourth pulse signals as a second operation result; a third logic gate that outputs a result of a logical operation on an output of each of the first and second logic gates as a third operation result; a third multiplexer that outputs one of a second carry flag indicating whether or not overflow has occurred, the third pulse signal, and the second operation result as a third output signal; a third counter that counts a count value in synchronization with the third output signal and outputs a third digital signal indicating the count value and a third carry flag indicating whether or not overflow has occurred; a fourth multiplexer that outputs one of the third carry flag or the fourth pulse signal as a fourth output signal; and a fourth counter that counts a count value in synchronization with the fourth output signal and outputs a fourth digital signal indicating the count value. The first multiplexer may select one of the first pulse signal, the first operation result, and the third operation result. The second counter may further generate the second carry flag. Therefore, this brings about an effect of enabling addition of four pixels or two pixels.

Furthermore, in the first aspect, the first multiplexer may select the first pulse signal in a case where a non-addition low illuminance mode in which illuminance does not exceed a predetermined value is set, may alternately select the first pulse signal and the first operation result in a case where a non-addition high illuminance mode in which illuminance is higher than the predetermined value is set, and may select the first operation result in a case where an addition mode is set. The second multiplexer may select the second pulse signal in a case where the non-addition low illuminance mode is set, may select the first carry flag in a case where the non-addition high illuminance mode is set, and may select the first carry flag in a case where the addition mode is set. Therefore, this brings about an effect that the resolution of the counter is extended at high illuminance or pixel addition.

Furthermore, in the first aspect, a part of the first sensor unit and a part of the second sensor unit may be arranged on a predetermined pixel chip. A rest of the first sensor unit, a rest of the second sensor unit, and the first and second counters may be arranged on a predetermined circuit chip. Therefore, this brings about an effect of facilitating the increase in the number of pixels.

Furthermore, in the first aspect, the photodetection device may further include: a control circuit that controls a plurality of pixels. The first sensor unit may be arranged in one of first and second pixels among the plurality of pixels, and the second sensor unit may be arranged in another pixel. The control circuit may control some of the plurality of pixels to generate a pulse signal. Therefore, this brings about an effect that the read time and the data amount are reduced.

BRIEF DESCRIPTION OF DRAWINGS

FIG. 22 is a diagram illustrating an example of operation of a control circuit in the sixth embodiment of the present technology.

FIG. 26 is a diagram illustrating an example of operation of a control circuit in a modification of the sixth embodiment of the present technology.

FIG. 37 is a diagram illustrating an example of operation of a control circuit in the thirteenth embodiment of the present technology.

FIG. 42 is a diagram illustrating an example of operation of a control circuit in the fifteenth embodiment of the present technology.

FIG. 43 is a diagram illustrating an example of operation of a control circuit in a sixteenth embodiment of the present technology.

MODE FOR CARRYING OUT THE INVENTION

A mode for carrying out the present technology (hereinafter, referred to as an embodiment) will be described below. The description will be given in the following order.

1. First embodiment (example of expanding counter at high illuminance)
2. Second embodiment (example of determining illuminance and extending counter)
3. Third embodiment (example of extending counter on the basis of specific bit)
4. Fourth embodiment (example of expanding counter when two pixels of same color are at high illuminance)
5. Fifth embodiment (example of extending counter when two pixels under microlens are at high illuminance)
6. Sixth embodiment (example of extending counter when count interval is short interval)
7. Seventh embodiment (example of extending counter in short interval and setting counting as valid or invalid)
8. Eighth embodiment (example of switching count interval within one frame and extending counter in short interval)
9. Ninth embodiment (example of extending counter in short interval using rolling shutter method)
10. Tenth embodiment (example of extending counter in short interval using global shutter method at start and end of frame)
11. Eleventh embodiment (example of extending counter in short interval using global shutter method)
12. Twelfth embodiment (example of reading during exposure using global shutter method and expanding counter in short interval)
13. Thirteenth embodiment (example of extending counter during pixel addition)
14. Fourteenth embodiment (example of extending counter during pixel addition or when counter interval is short interval)
15. Fifteenth embodiment (example of extending counter during pixel addition of four pixels)
16. Sixteenth embodiment (example of extending counter during pixel addition or during high illuminance)
17. Seventeenth embodiment (example of extending counter at high illuminance using laminated structure)
18. Eighteenth embodiment (example of controlling some pixels and expanding counter at high illuminance)
19. Application example to mobile body

1. First Embodiment

Configuration Example of Imaging Device

Figure 1:
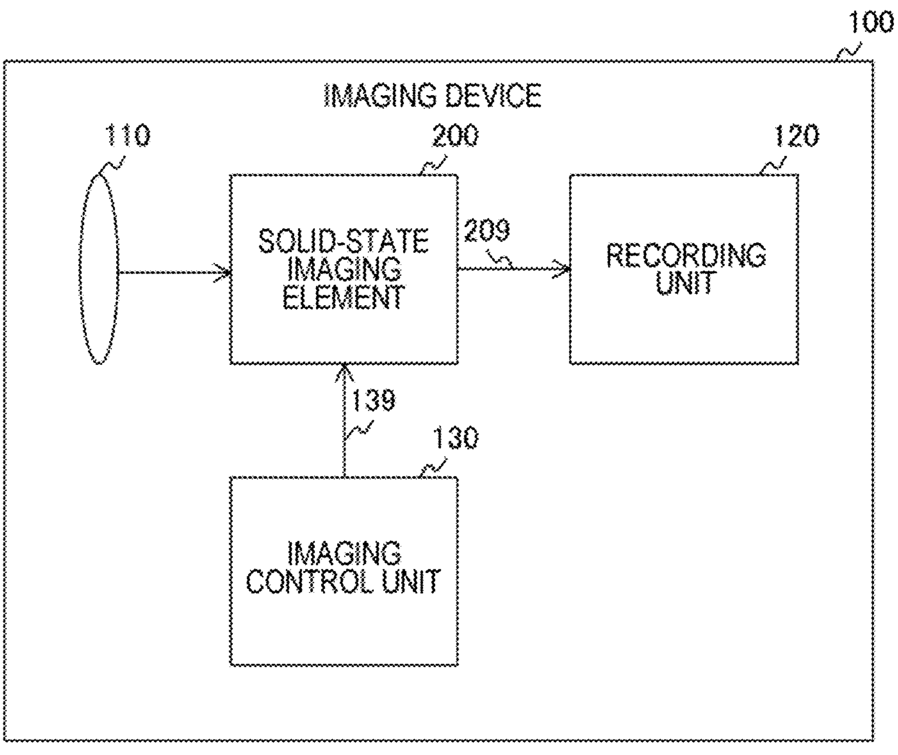
FIG. 1 is a block diagram illustrating a configuration example of an imaging device according to a first embodiment of the present technology.

FIG. 1 is a block diagram illustrating a configuration example of an imaging device 100 according to an embodiment of the present technology. The imaging device 100 captures image data, and includes an imaging lens 110, a solid-state imaging element 200, a recording unit 120, and an imaging control unit 130. As the imaging device 100, for example, a smartphone, a digital camera, a personal computer, or an in-vehicle camera is assumed. Note that the imaging device 100 is an example of a photodetection device recited in claims.

The imaging lens 110 condenses incident light and guides the light to the solid-state imaging element 200. The solid-state imaging element 200 captures the image data under control of the imaging control unit 130. The solid-state imaging element 200 supplies the captured image data to the recording unit 120 via a signal line 209. The recording unit 120 records the image data.

The imaging control unit 130 controls the solid-state imaging element 200 to capture the image data. The imaging control unit 130 supplies the solid-state imaging element 200 with, for example, a synchronization signal such as a vertical synchronization signal via a signal line 139.

Note that the imaging device 100 may further include an interface and transmit the image data to outside via the interface, or may further include a display unit and display the image data on the display unit.

Configuration Example of Solid-State Imaging Element

Figure 2:
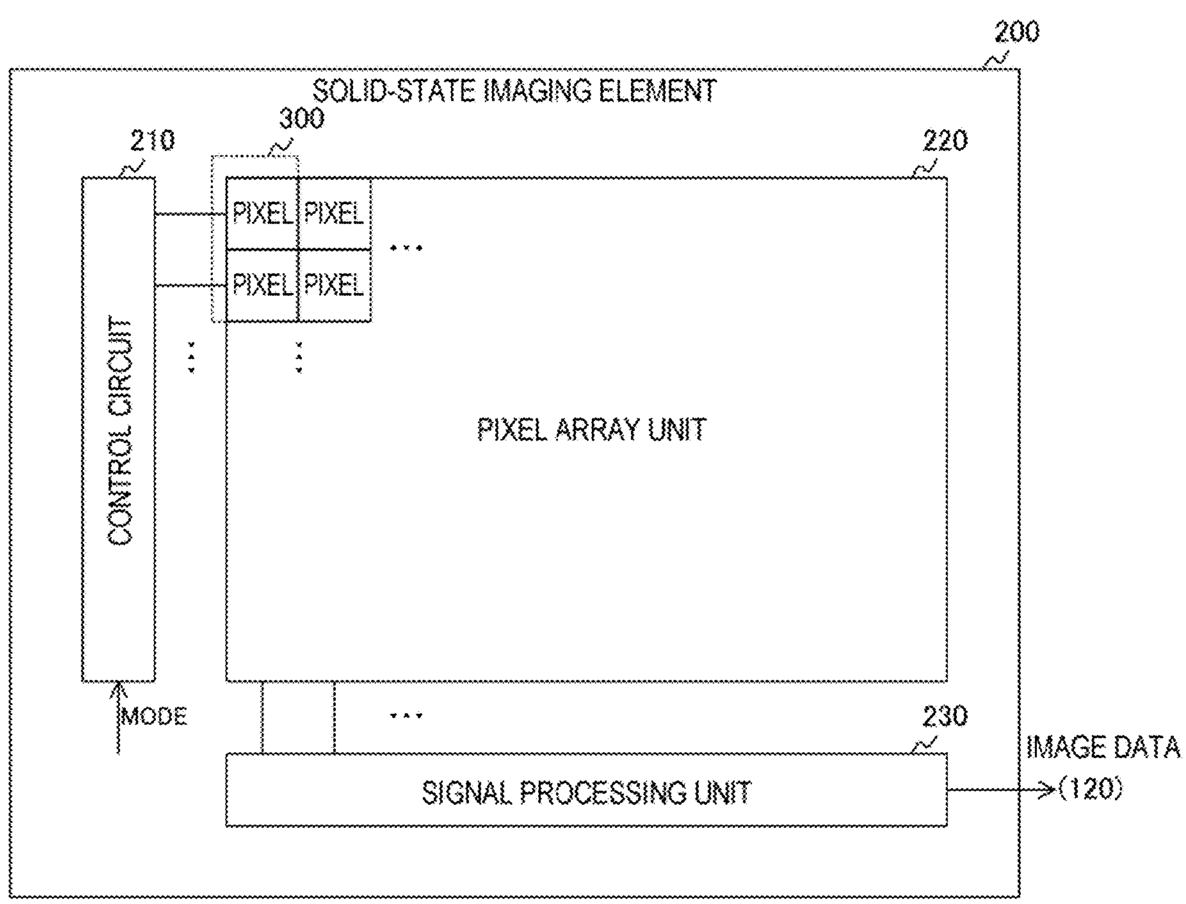
FIG. 2 is a block diagram illustrating a configuration example of a solid-state imaging element according to the first embodiment of the present technology.

FIG. 2 is a block diagram illustrating a configuration example of the solid-state imaging element 200 in the first embodiment of the present technology. The solid-state imaging element 200 includes a control circuit 210, a pixel array unit 220, and a signal processing unit 230. These circuits are arranged on a single semiconductor chip.

A plurality of pixels is arranged in a two-dimensional lattice in the pixel array unit 220. Hereinafter, a set of pixels arranged in a predetermined direction (such as horizontal direction) is referred to as a "row", and a set of pixels arranged in a direction perpendicular to the row is referred to as a column.

Furthermore, the pixel array unit 220 is divided into a plurality of pixel blocks 300. A plurality of pixels is arranged in each pixel block 300. For example, it is assumed that two pixels are arranged in the column direction in the pixel block 300. Note that each pixel in the pixel block 300 may be arranged in a row direction or an oblique direction.

The control circuit 210 sequentially selects the row in synchronization with the vertical synchronization signal. The pixel counts the number of times of incidence of photons in the exposure period, and outputs a digital signal indicating the count value to the signal processing unit 230 as a pixel signal.

Furthermore, a mode signal MODE for designating one of a plurality of modes including a high illuminance mode and a low illuminance mode is input to the control circuit 210.

The high illuminance mode is a mode set at high illuminance when the illuminance is higher than a predetermined value, and the low illuminance mode is a mode set at low illuminance when the illuminance is equal to or lower than a predetermined value. A determination circuit, which performs photometry to determine whether or not the illuminance is higher than a predetermined value and sets a mode, is arranged at a subsequent stage of the pixel array unit 220 (such as the signal processing unit 230) in the solid-state imaging element 200 or outside the solid-state imaging element 200.

Note that the high illuminance mode and the low illuminance mode can also be set by manual operation by the user. In this case, the determination circuit becomes unnecessary.

The signal processing unit 230 executes various types of signal processing on the image data (frame) in which the pixel signals are arranged. The signal processing unit 230 outputs the processed frame to the recording unit 120.

Configuration Example of Pixel

Figure 3:
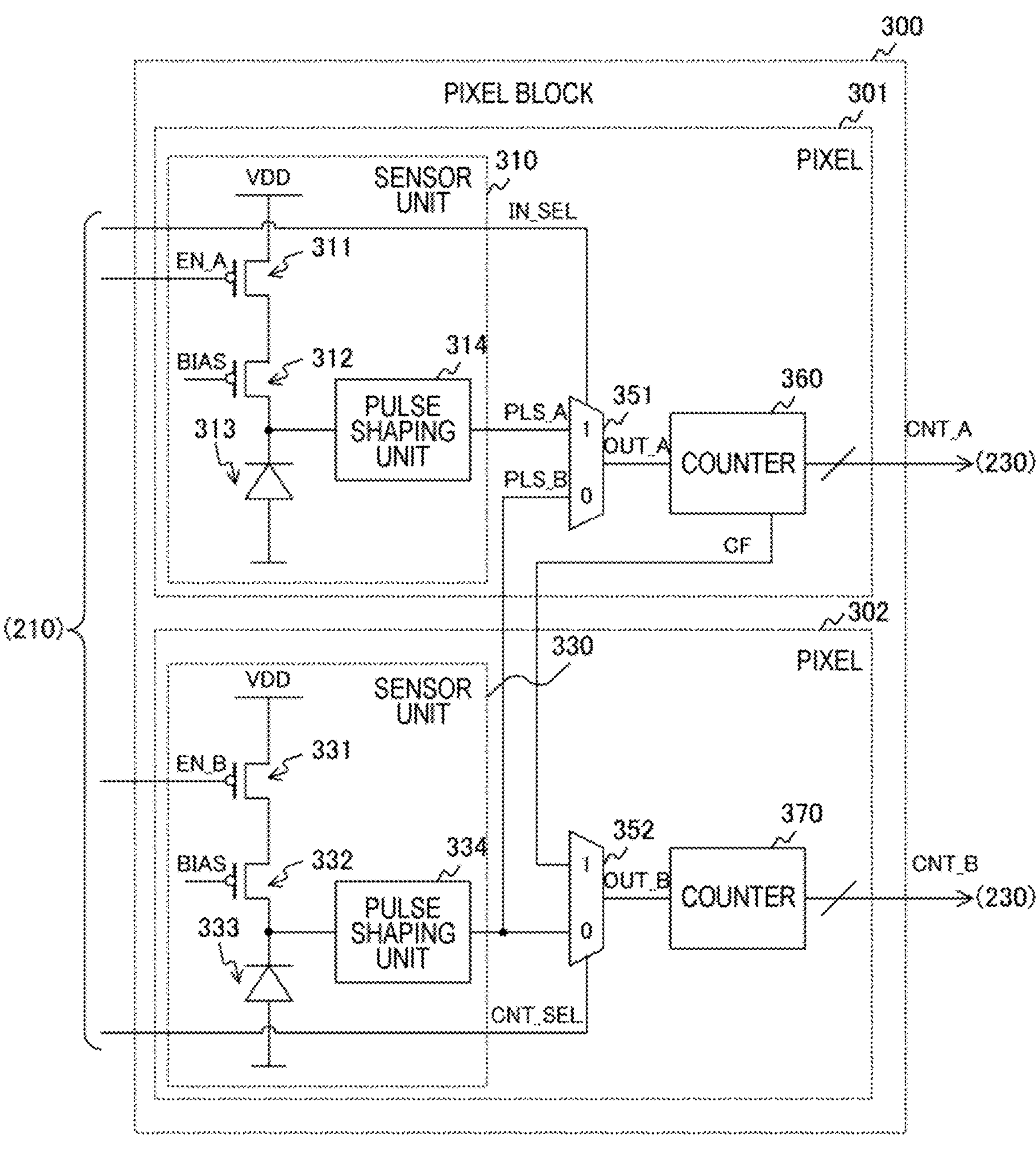
FIG. 3 is a circuit diagram illustrating a configuration example of a pixel block in the first embodiment of the present technology.

FIG. 3 is a circuit diagram illustrating a configuration example of the pixel block 300 in the first embodiment of the present technology. In the pixel block 300, pixels 301 and 302 are arranged. The pixel 301 includes a sensor unit 310, a multiplexer 351, and a counter 360. The pixel 302 includes a sensor unit 330, a multiplexer 352, and a counter 370.

The sensor unit 310 includes pMOS transistors 311 and 312, a SPAD 313, and a pulse shaping unit 314. The pMOS transistors 311 and 312 are connected in series between the cathode of the SPAD 313 and a power supply voltage VDD with the pMOS transistor 311 as a power supply side. An enable signal EN_A from the control circuit 210 is input to the gate of the pMOS transistor 311, and a predetermined bias voltage BIAS is applied to the gate of the pMOS transistor 312.

The pixel 301 is enabled in a case where the enable signal EN_A is at a low level, and the cathode potential of the SPAD 313 drops in response to incidence of photons. On the other hand, in a case where the enable signal EN_A is at a high level, the pixel 301 is disabled, and the cathode potential does not drop even if photons are incident.

The pulse shaping unit 314 detects the drop of the cathode potential of the SPAD 313, shapes the waveform, and generates a pulse signal PLS_A. The pulse shaping unit 314 supplies the pulse signal PLS_A to the multiplexer 351.

The sensor unit 330 includes pMOS transistors 331 and 332, a SPAD 333, and a pulse shaping unit 334, and the circuit configuration thereof is similar to that of the sensor unit 310. However, an enable signal EN_B from the control circuit 210 is input to the gate of the pMOS transistor 331, and the pulse shaping unit 334 generates a pulse signal PLS_B and supplies the pulse signal PLS_B to the multiplexers 351 and 352.

The multiplexer 351 selects one of the pulse signals PLS_A and PLS_B in accordance with a selection signal IN_SEL from the control circuit 210, and outputs the selected one as an output signal OUT_A to the counter 360. For example, the pulse signal PLS_A is selected in a case where the selection signal IN_SEL is "1", and the pulse signal PLS_B is selected in a case where the selection signal IN_SEL is "0".

The counter 360 counts a count value in synchronization with the output signal OUT_A and outputs a digital signal CNT_A indicating the count value to the signal processing unit 230. Furthermore, the counter 360 generates a carry flag CF indicating whether or not the counting result exceeds the range that can be expressed by the digital signal CNT_A (that is, overflow has occurred), and outputs the carry flag CF to the multiplexer 352.

The multiplexer 352 selects one of the pulse signal PLS_B and the carry flag CF according to a selection signal CNT_SEL from the control circuit 210, and outputs the selected one as an output signal OUT_B to the counter 370. For example, the carry flag CF is selected in a case where the selection signal CNT_SEL is "1", and the pulse signal PLS_B is selected in a case where the selection signal CNT_SEL is "0".

The counter 370 counts a count value in synchronization with the output signal OUT_B and outputs a digital signal CNT_B indicating the count value to the signal processing unit 230.

In summary, the sensor unit 310 generates the pulse signal PLS_A in response to incidence of photons. The sensor unit 330 generates the pulse signal PLS_B in response to incidence of photons. The multiplexer 351 selects one of the pulse signals PLS_A and PLS_B and outputs the selected one as the output signal OUT_A to the counter 360. The counter 360 counts a count value in synchronization with the output signal OUT_A, and outputs a digital signal CNT_A indicating the count value and a carry flag CF indicating whether or not the overflow has occurred.

Furthermore, the multiplexer 352 selects one of the pulse signal PLS_B and the carry flag CF, and outputs the selected one to the counter 370 as the output signal OUT_B. The counter 370 counts a count value in synchronization with the output signal OUT_B and outputs a digital signal CNT_B indicating the count value.

Note that the sensor units 310 and 330 are examples of first and second sensor units described in the claims. The multiplexers 351 and 352 are examples of first and second multiplexers described in the claims. Note that the counters 360 and 370 are examples of first and second counters described in the claims.

Furthermore, although two pixels are arranged in the pixel block 300, three or more pixels may be arranged. In this case, a sensor unit, a multiplexer, and a counter are added according to the number of pixels. Furthermore, when the number of pixels is M (M is an integer), the carry flag of the m_th (m is an integer from 0 to M−1) counter is input to the (m+1)_th counter via the (m+1)_th multiplexer.

Configuration Example of Counter

Figures 4, 5:
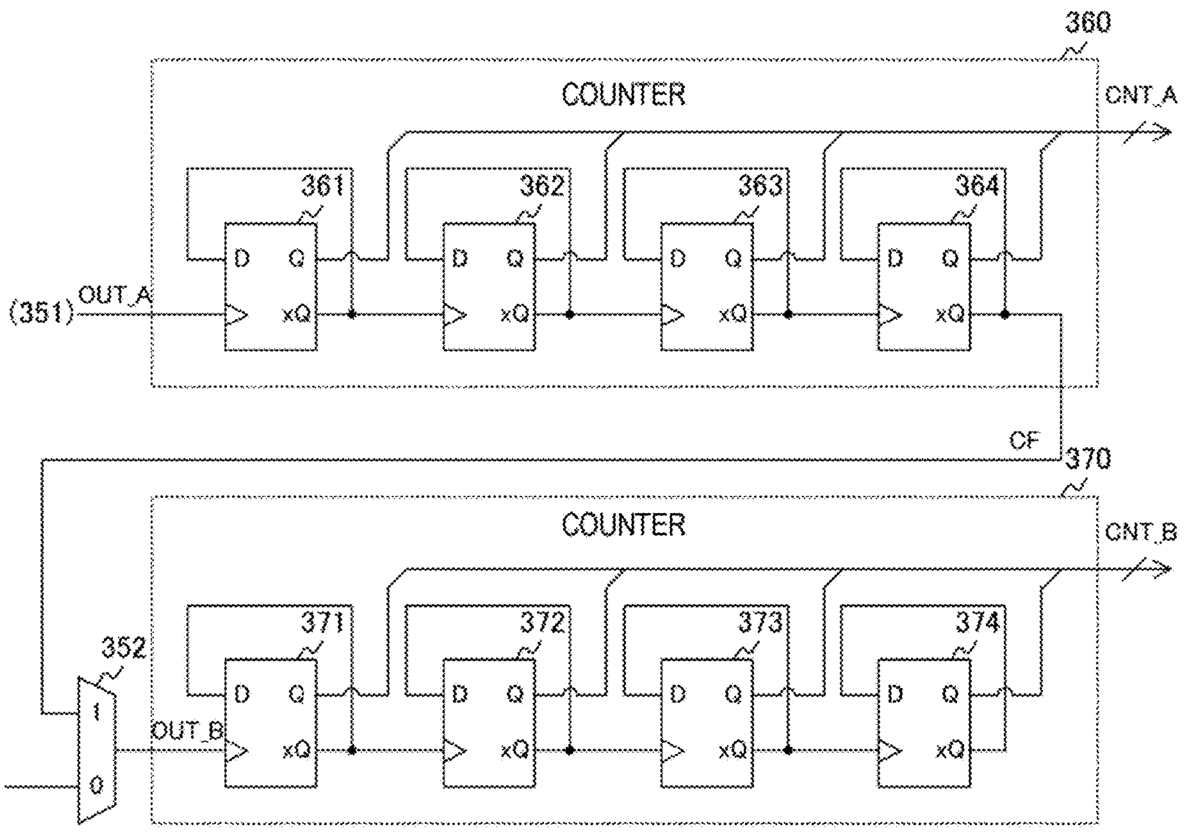
FIG. 4 is a circuit diagram illustrating a configuration example of a counter in the first embodiment of the present technology.
FIG. 5 is a diagram illustrating an example of operation of a control circuit in the first embodiment of the present technology.

FIG. 4 is a circuit diagram illustrating a configuration example of the counters 360 and 370 in the first embodiment of the present technology. The counter 360 includes flip-flops 361 to 364, and the counter 370 includes flip-flops 371 to 374.

Each of the flip-flops 361 to 364 holds the input signal input to the input terminal D in synchronization with the signal input to the clock terminal, and outputs the input signal from the output terminal Q.

The output signal OUT_A from the multiplexer 351 is input to the clock terminal of the flip-flop 361. Furthermore, an inverting output terminal xQ of the flip-flop 361 is connected to the input terminal D and the clock terminal of the flip-flop 362. The inverting output terminal xQ of the flip-flop 362 is connected to the input terminal D and the clock terminal of the flip-flop 363. The inverting output terminal xQ of the flip-flop 363 is connected to the input terminal D and the clock terminal of the flip-flop 364. The inverting output terminal xQ of the flip-flop 364 is connected to the input terminal D thereof. Furthermore, the carry flag CF is output from the inverting output terminal xQ of the flip-flop 364 to the multiplexer 352.

The bits from the output terminals Q of the flip-flops 361 to 364 are output as bits from the first digit to the fourth digit of the digital signal CNT_A.

The circuit configuration of the counter 370 is similar to that of the counter 360 except that the carry flag CF is not output.

Note that, although the resolutions of the counters 360 and 370 are 4 bits, the resolutions of these counters are not limited to 4 bits. Furthermore, the circuit configuration of each of the counters 360 and 370 is not limited to the circuit configuration exemplified in the drawing as long as it can be counted in synchronization with the signals from the multiplexers 351 and 352.

Operation Example of Solid-State Imaging Element

FIG. 5 is a diagram illustrating an example of operation of the control circuit 210 in the first embodiment of the present technology. One of two pixels (pixels 301 and 302) in the pixel block 300 is defined as a pixel A, and the other is defined as a pixel B.

In a case where the low illuminance mode is set, the control circuit 210 sets the selection signal IN_SEL to "1" and sets the selection signal CNT_SEL to "0". Therefore, the pulse signal PLS_A is selected in the pixel A, and the pulse signal PLS_B is selected in the pixel B. Furthermore, the control circuit 210 sets both the enable signals EN_A and EN_B to "0" (that is, enable). With these controls, both the pixels A and B are exposed.

On the other hand, in a case where the high illuminance mode is set, only one of the pixels A and B is exposed, and the exposure target is switched at regular time intervals. In the exposure period of the pixel A, the control circuit 210 sets the selection signal IN_SEL to "1" and sets the selection signal CNT_SEL to "1". Therefore, the pulse signal PLS_A is selected in the pixel A, and the carry flag CF is selected in the pixel B. Furthermore, the control circuit 210 sets the enable signal EN_A to "0" (enable) and sets the enable signal EN_B to "1" (that is, disable).

Furthermore, in the exposure period of the pixel B, the control circuit 210 sets the selection signal IN_SEL to "0" and sets the selection signal CNT_SEL to "1". Therefore, the pulse signal PLS_B is selected in the pixel A, and the carry flag CF is selected in the pixel B. Furthermore, the control circuit 210 sets the enable signal EN_A to "1" (disable) and sets the enable signal EN_B to "0" (enable).

Figure 6:
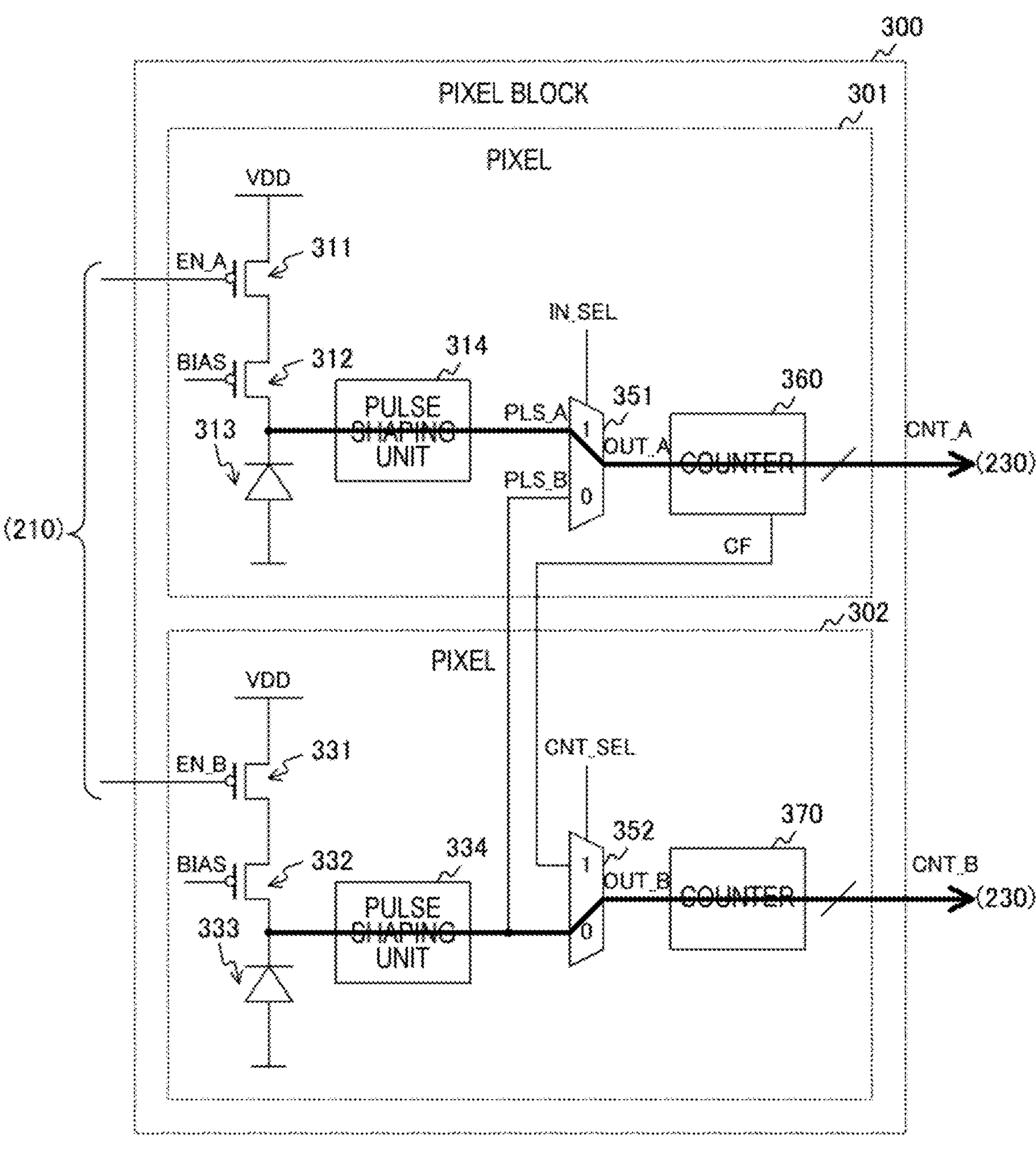
FIG. 6 is a diagram illustrating an example of a state of a pixel block in a low illuminance mode according to the first embodiment of the present technology.

FIG. 6 is a diagram illustrating an example of a state of the pixel block 300 in the low illuminance mode according to the first embodiment of the present technology. In a case where the low illuminance mode is set, the multiplexer 351 selects the pulse signal PLS_A, and the multiplexer 352 selects the pulse signal PLS_B. Furthermore, the counter 360 counts in synchronization with the output signal OUT_A (that is, pulse signal PLS_A), and the counter 370 counts in synchronization with the output signal OUT_B (that is, pulse signal PLS_B). As described above, in the low illuminance mode, the number of pulses of the pixel is counted for each pixel. When the resolution of the counter for each pixel is N (N is an integer) bits, the maximum value of each count value is $2^N$.

Figure 7:
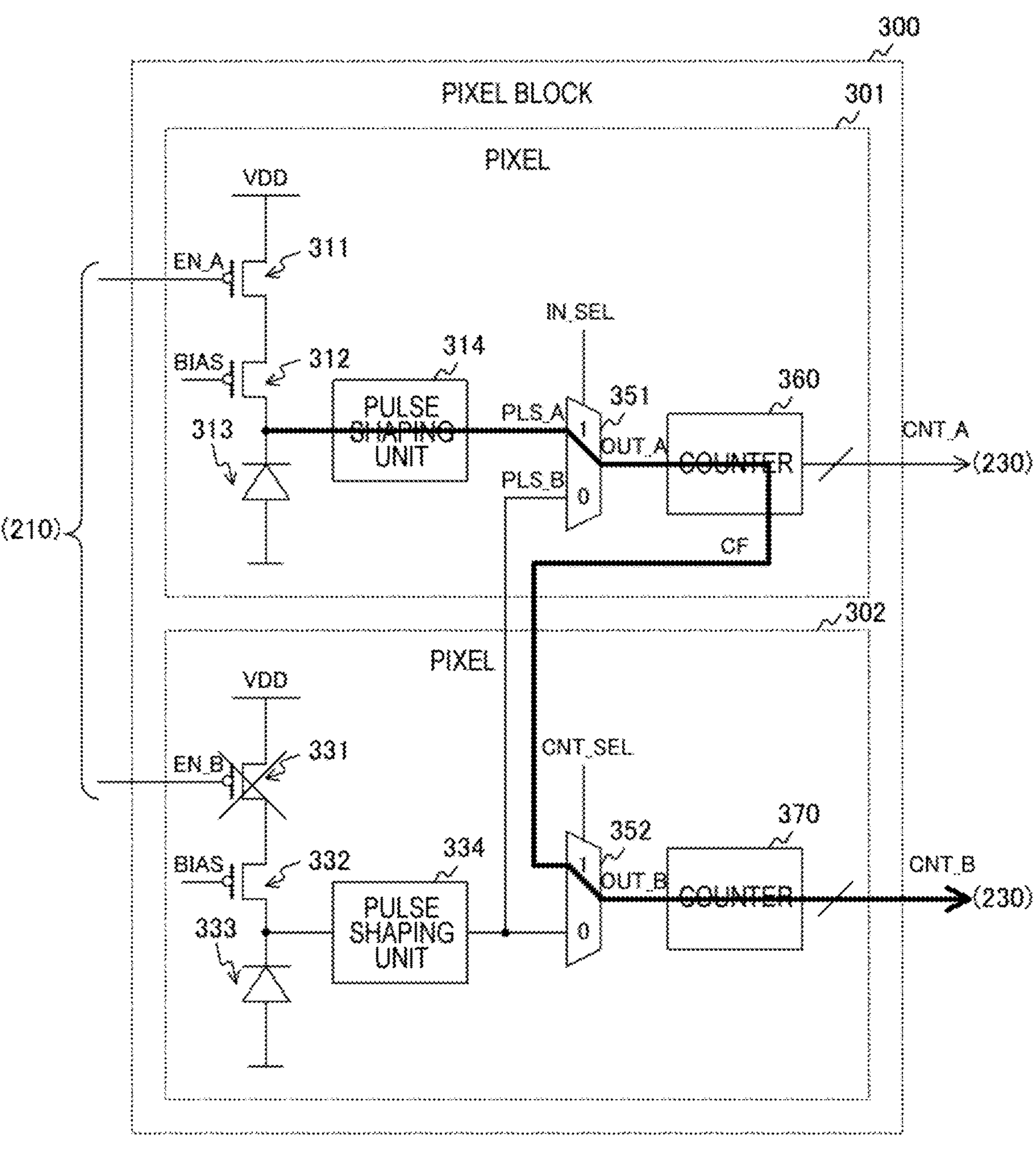
FIG. 7 is a diagram illustrating an example of a state of a pixel block at the time of exposing a pixel A in a high illuminance mode according to the first embodiment of the present technology.

FIG. 7 is a diagram illustrating an example of a state of a pixel block at the time of exposing the pixel A in the high illuminance mode according to the first embodiment of the present technology. In the high illuminance mode, the multiplexer 351 selects the pulse signal PLS_A in the exposure period of the pixel A, and the multiplexer 352 selects the carry flag CF from the counter 360. Furthermore, the counter 360 counts in synchronization with the output signal OUT_A (pulse signal PLS_A), and the counter 370 counts in synchronization with the output signal OUT_B (that is, carry flag CF).

Figure 8:
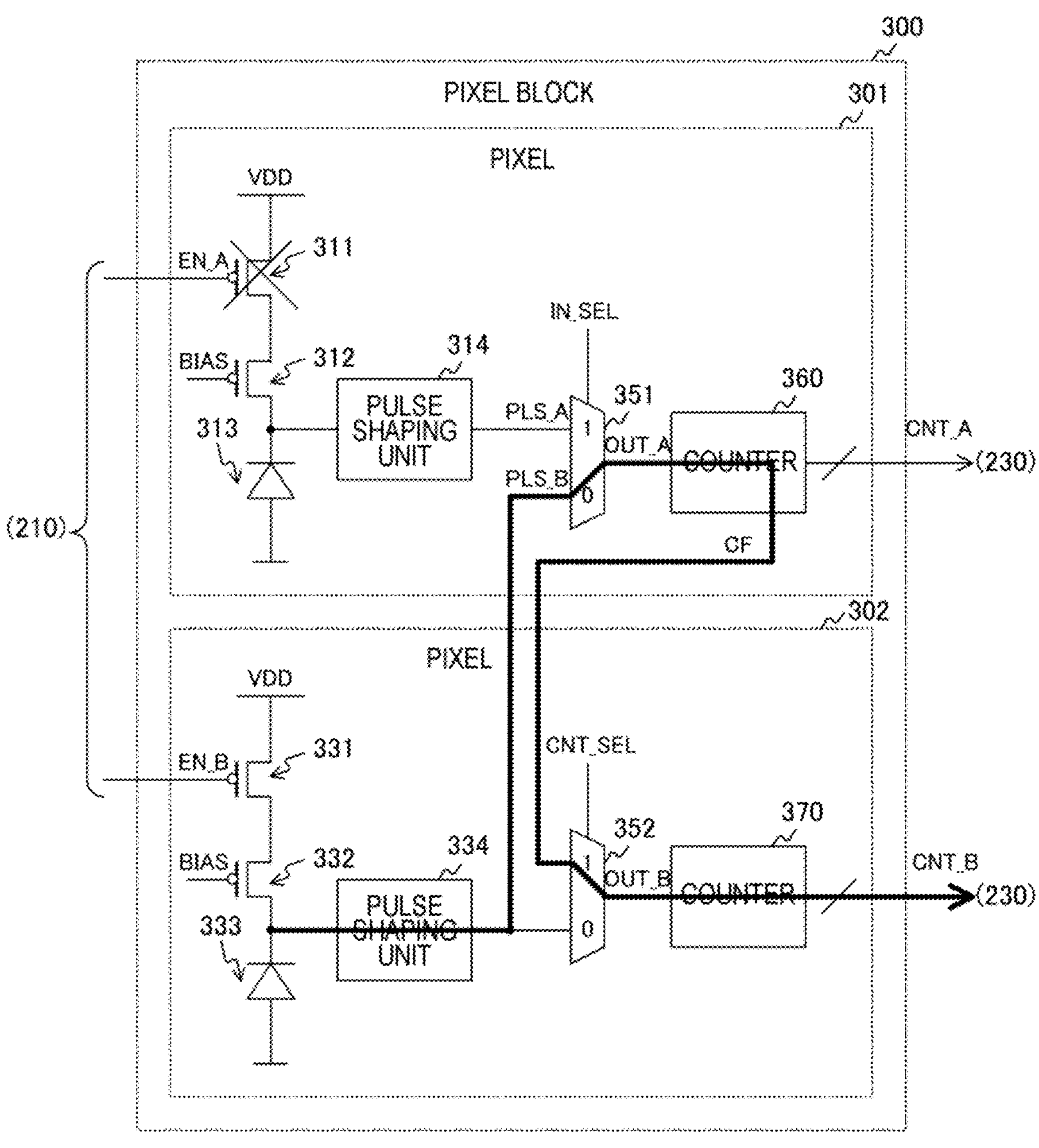
FIG. 8 is a diagram illustrating an example of a state of a pixel block at the time of exposing a pixel B in a high illuminance mode according to the first embodiment of the present technology.

FIG. 8 is a diagram illustrating an example of a state of a pixel block at the time of exposing the pixel B in the high illuminance mode according to the first embodiment of the present technology. In the high illuminance mode, the multiplexer 351 selects the pulse signal PLS_B in the exposure period of the pixel B, and the multiplexer 352 selects the carry flag CF from the counter 360. Furthermore, the counter 360 counts in synchronization with the output signal OUT_A (pulse signal PLS_B), and the counter 370 counts in synchronization with the output signal OUT_B (that is, the carry flag CF).

As illustrated in FIGS. 6 and 7, when the high illuminance mode is set, the counters 360 and 370 are connected in series, and when overflow occurs in the counter 360 in the preceding stage, the counter 370 in the subsequent stage performs counting. In this manner, at high illuminance, the counters 360 and 370 are shared by two pixels in the pixel block 300.

At high illuminance, the signal processing unit 230 acquires, for each of the pixels A and B, a 2N-bit digital signal in which the output (digital signal CNT_A) of the counter 360 is set as a higher bit string and the output (digital signal CNT_B) of the counter 370 is set as a lower bit string. At high illuminance when the count frequency is high, the resolution of the counter for each pixel is extended to 2N bits, and the maximum value of each count value is extended to 22N. Therefore, the dynamic range can be expanded at high illuminance, and the image quality of the image data can be improved.

Figure 9:
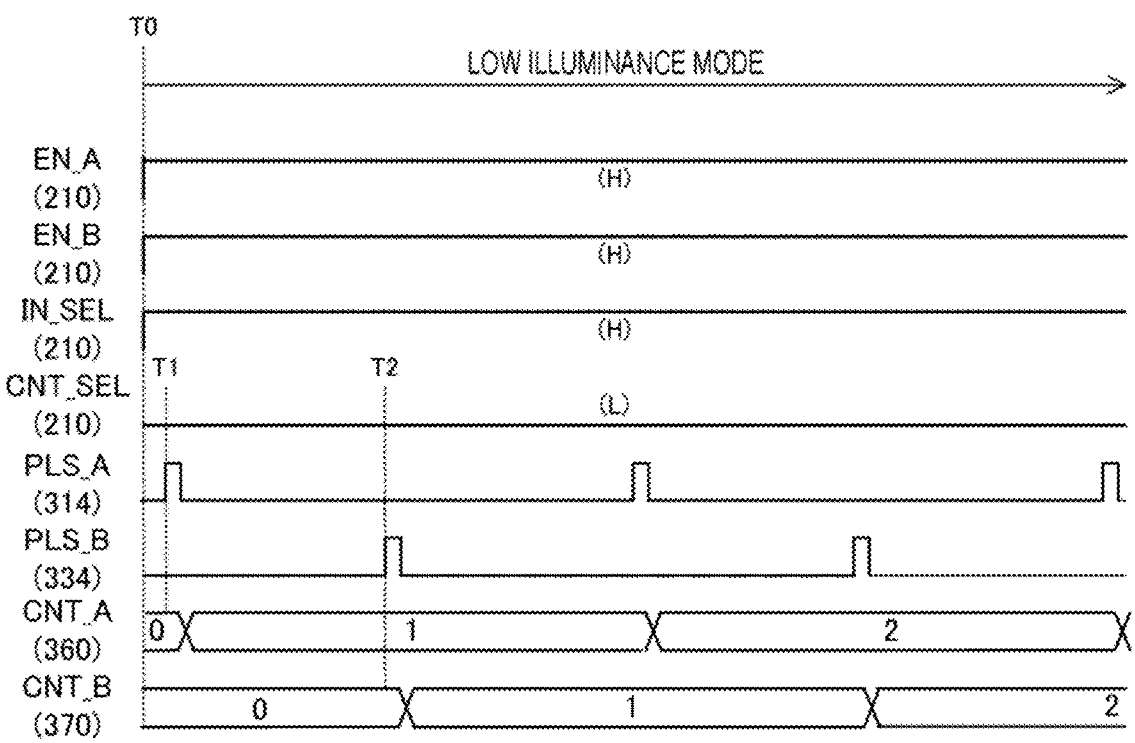
FIG. 9 is a timing chart illustrating an example of operation of the solid-state imaging element in a low illuminance mode according to the first embodiment of the present technology.

FIG. 9 is a timing chart illustrating an example of operation of the solid-state imaging element 200 in a low illuminance mode according to the first embodiment of the present technology. It is assumed that the low illuminance mode is set at timing TO.

The control circuit 210 sets the enable signals EN_A and EN_B to the high level, sets the selection signal IN_SEL to the high level, and sets the selection signal CNT_SEL to the low level. A pulse signal PLS_A is generated at timing T1 or the like, and the counter 360 counts up the digital signal CNT_A in synchronization with the pulse signal. A pulse signal PLS_B is generated at timing T2 or the like, and the counter 370 counts up the digital signal CNT_B in synchronization with the pulse signal. As illustrated in the drawing, in the low illuminance mode, two pixels are simultaneously exposed, and the number of pulses is counted in parallel in each pixel.

Figure 10:
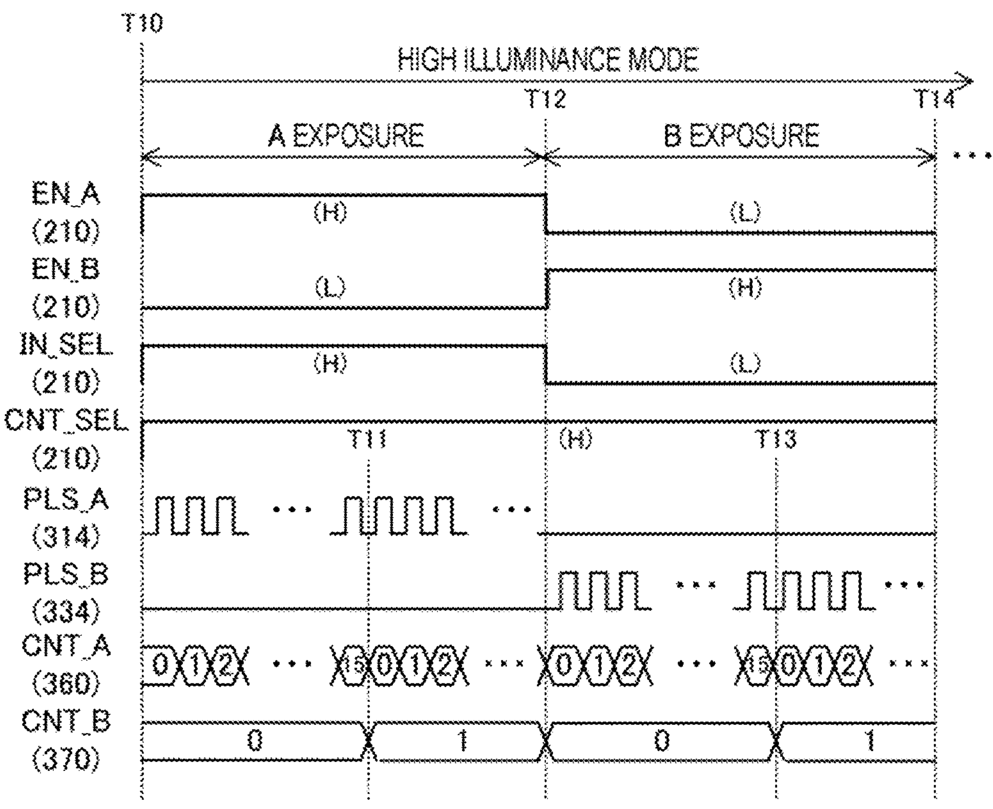
FIG. 10 is a timing chart illustrating an example of operation of the solid-state imaging element in a high illuminance mode according to the first embodiment of the present technology.

FIG. 10 is a timing chart illustrating an example of operation of the solid-state imaging element in a high illuminance mode according to the first embodiment of the present technology. It is assumed that the high illuminance mode is set at timing T10. It is assumed that the pixel A is exposed in a period from timing T10 to timing T12, and that the pixel B is exposed in a period from timing T12 to timing T14. Similarly, after timing T14, the pixels A and B are alternately exposed.

In a period from timing T10 to timing T12, the control circuit 210 sets the enable signal EN_A to the high level and sets the enable signal EN_B to the low level. Furthermore, the control circuit 210 sets the selection signals IN_SEL and CNT_SEL to the high level. A pulse signal PLS_A is generated after timing T10, and the counter 360 counts up the digital signal CNT_A in synchronization with the pulse signal.

Then, when the digital signal CNT_A overflows at timing T11, the counter 370 counts up the digital signal CNT_B in synchronization with the carry flag.

Then, in a period from timing T12 to timing T14, the control circuit 210 sets the enable signal EN_A to the low level and sets the enable signal EN_B to the high level. Furthermore, the control circuit 210 sets the selection signal IN_SEL to the low level and sets the selection signal CNT_SEL to the high level. A pulse signal PLS_B is generated after timing T12, and the counter 360 counts up the digital signal CNT_A in synchronization with the pulse signal.

Then, when the digital signal CNT_A overflows at timing T13, the counter 370 counts up the digital signal CNT_B in synchronization with the carry flag.

Figure 11:
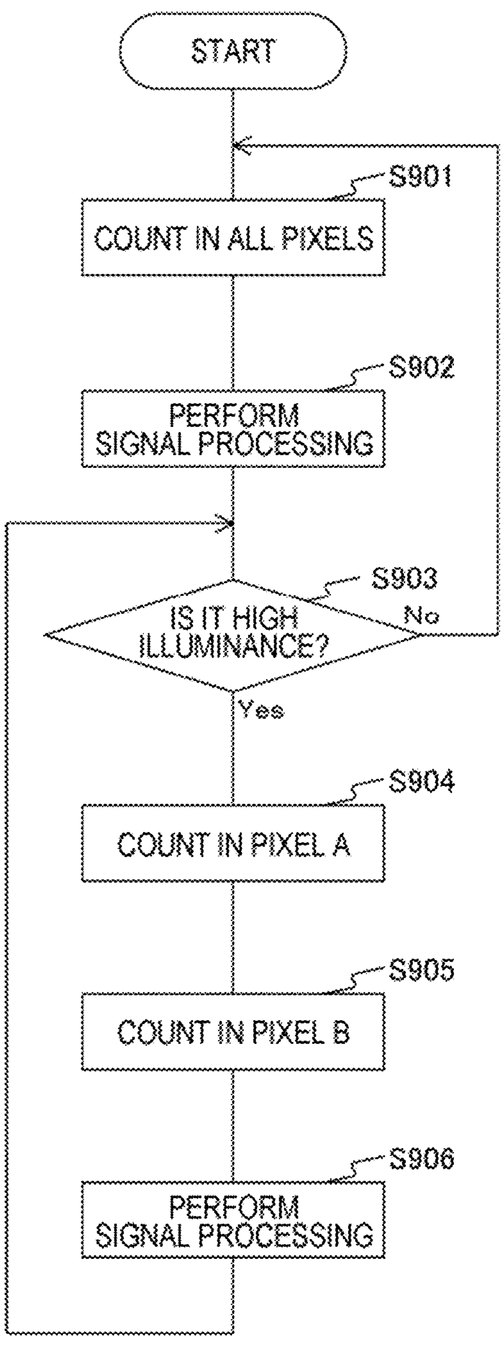
FIG. 11 is a flowchart depicting an example of operation of the solid-state imaging element according to the first embodiment of the present technology.

FIG. 11 is a flowchart depicting an example of operation of the solid-state imaging element 200 according to the first embodiment of the present technology. This operation is started, for example, when the low illuminance mode is set.

In all the pixels, the counter in the pixel counts the number of pulses (step S901). The signal processing unit 230 performs signal processing to generate a frame (step S902).

A circuit (such as the signal processing unit 230) outside the pixel determines whether or not the illuminance is high on the basis of the frame (step S903). For example, in a case where the total value or the average value of the count values of all the pixels is equal to or greater than the threshold, it is determined that the illuminance is high.

In a case where the illuminance is not high (step S903: No), the solid-state imaging element 200 sets the low illuminance mode and executes step S901 and subsequent steps.

On the other hand, in a case where the illuminance is high (step S903: Yes), the solid-state imaging element 200 sets the high illuminance mode, and the counter in the pixel A counts the number of pulses in the pixel A (step S904). Next, in the pixel B, the counter in the pixel counts the number of pulses (step S905). The signal processing unit 230 performs signal processing to generate a frame (step S906). After step S906, the solid-state imaging element 200 repeatedly executes step S903 and subsequent steps.

Note that the solid-state imaging element 200 determines whether or not the illuminance is high for each frame, but is not limited to this configuration, and it is also possible to determine whether or not the illuminance is high when two or more frames are imaged after the mode is switched.

As described above, according to the first embodiment of the present technology, since the counter 370 counts in synchronization with the carry flag from the counter 360 in the high illuminance mode, the dynamic range can be expanded at high illuminance.

2. Second Embodiment

In the first embodiment described above, whether or not the circuit outside the pixel has high illuminance is determined, but the determination may be performed in the pixel. A solid-state imaging element 200 according to a second embodiment is different from that of the first embodiment in that a determiner for determining whether or not the illuminance is high is arranged in a pixel block 300.

Figure 12:
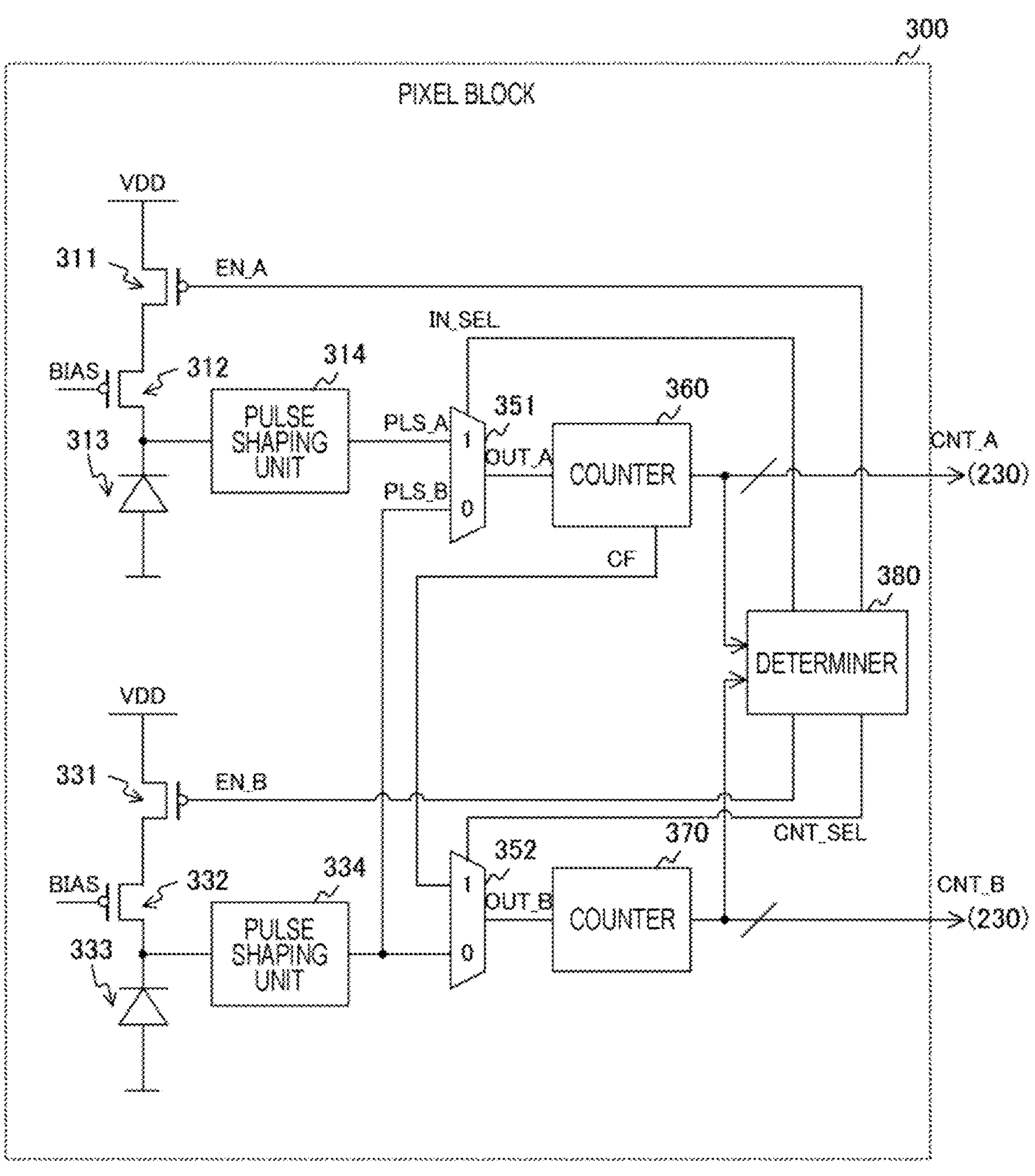
FIG. 12 is a circuit diagram illustrating a configuration example of a pixel block in a second embodiment of the present technology.

FIG. 12 is a circuit diagram illustrating a configuration example of the pixel block 300 in the second embodiment of the present technology. The pixel block 300 of the second embodiment is different from the first embodiment in that a determiner 380 is further provided. The determiner 380 is shared by two pixels in the pixel block 300.

The digital signals CNT_A and CNT_B from the counters 360 and 370 are input to the determiner 380. The determiner 380 determines whether or not the illuminance is high on the basis of the digital signals.

(1) For example, the determiner 380 calculates a total value or an average value of the count values of all the pixels in the pixel block 300 or some representative pixels (pixels in the vicinity of the center or the like), determines that illuminance is high in a case where the total value or the average value is equal to or more than a threshold, and determines that illuminance is low in a case where the total value or the average value is less than the threshold.

(2) Alternatively, the determiner 380 determines, for each pixel, whether or not the count value is equal to or larger than a threshold, and determines the illuminance on the basis of the results.

(2-1) In determination method (2), for example, when the number of pixels whose count value is equal to or larger than the threshold is equal to or larger than the number of pixels whose count value is less than the threshold, the determiner 380 determines that the illuminance is high.

(2-2) Alternatively, when the number of pixels whose count value is less than the threshold is equal to or greater than the number of pixels whose count value is equal to or greater than the threshold, the determiner 380 determines that the illuminance is low.

(2-3) Alternatively, when the number of pixels whose count value is equal to or larger than the threshold is one or more, the determiner 380 determines that the illuminance is high.

(2-4) Alternatively, when the number of pixels whose count value is less than the threshold is one or more, the determiner 380 determines that the illuminance is low.

The determiner 380 controls the enable signals EN_A and EN_B and the selection signals IN_SEL and CNT_SEL on the basis of the determination result. A control method of these signals is similar to that of the first embodiment.

As illustrated in the drawing, since it is determined whether or not each of the pixel blocks 300 has high illuminance, appropriate control according to the illuminance of each pixel can be performed.

Figure 13:
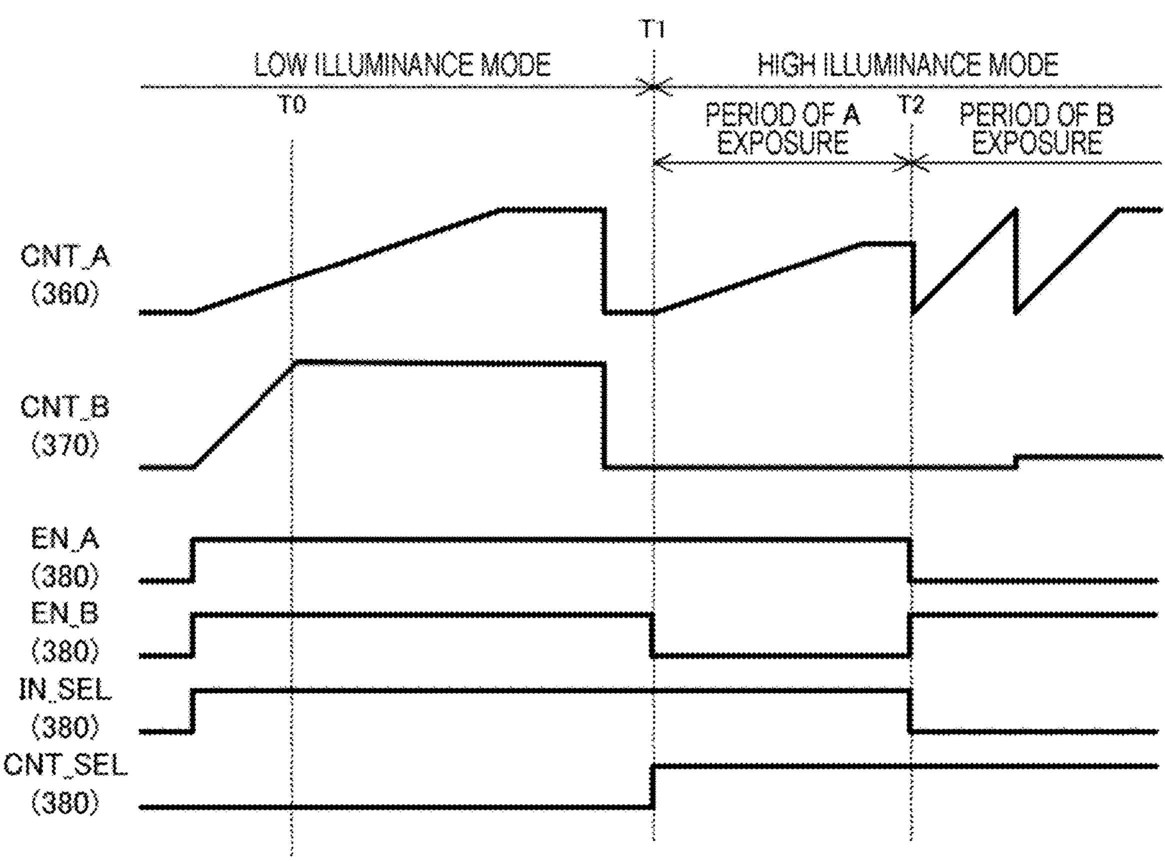
FIG. 13 is an example of a timing chart at the time of switching from the low illuminance mode to the high illuminance mode in the second embodiment of the present technology.

FIG. 13 is an example of a timing chart at the time of switching from the low illuminance mode to the high illuminance mode in the second embodiment of the present technology. It is assumed that the above-described (2-3) is used as a method of determining whether or not the illuminance is high. It is assumed that the low illuminance mode is set for the focused pixel block 300, and the count value (CNT_B) of the pixel B becomes equal to or larger than the threshold at timing TO.

The determiner 380 determines that the illuminance is high, and switches to the high illuminance mode at timing T1 after reading the count value. In the high illuminance mode, the pixel A is exposed from timing T1 to timing T2, and the pixel B is exposed after timing T2. Note that the illuminance is also individually determined for each of the pixel blocks other than the focused pixel block.

Figure 14:
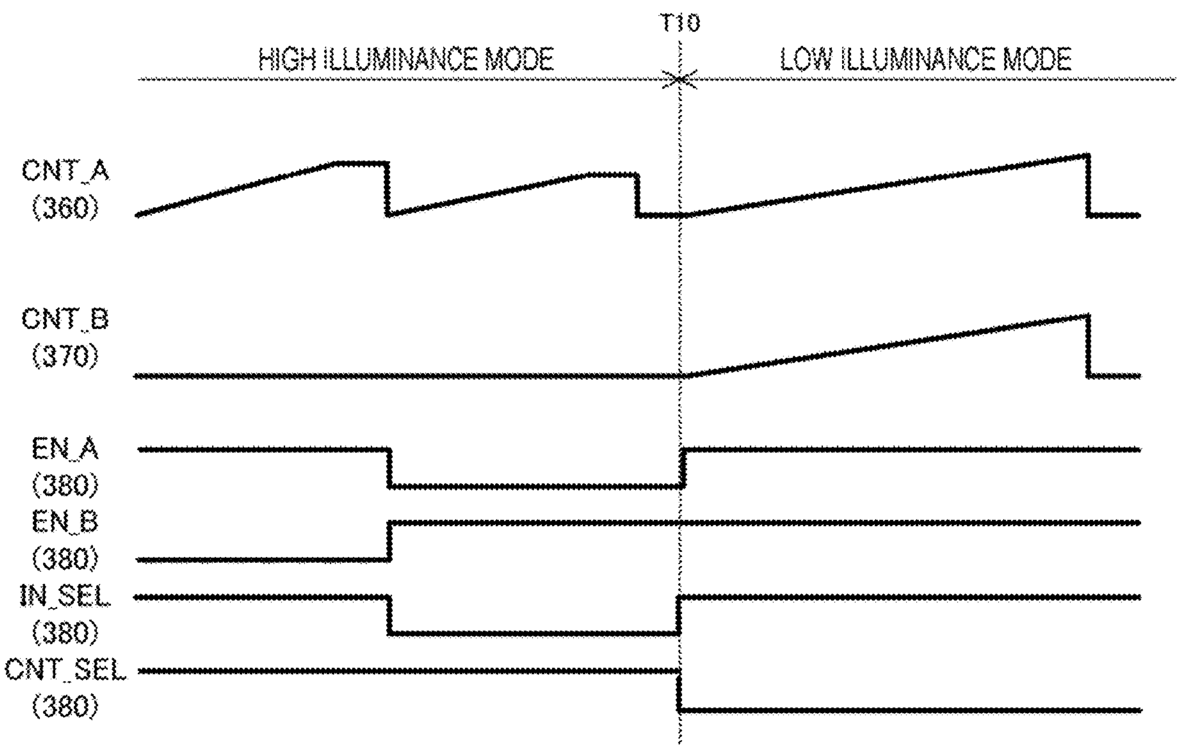
FIG. 14 is an example of a timing chart at the time of switching from the high illuminance mode to the low illuminance mode in the second embodiment of the present technology.

FIG. 14 is an example of a timing chart at the time of switching from the high illuminance mode to the low illuminance mode in the second embodiment of the present technology. It is assumed that the high illuminance mode is set for the focused pixel block 300, and the respective count values (CNT_A and CNT_B) of the pixels A and B are both less than the threshold. The determiner 380 determines that the illuminance is low, and switches to the low illuminance mode at timing T10.

As described above, according to the second embodiment of the present technology, since the determiner 380 in the pixel block 300 determines whether or not the illuminance is high, it is possible to perform appropriate control according to the illuminance for each pixel block 300.

3. Third Embodiment

In the second embodiment described above, the determiner 380 compares the count value with the threshold. However, in this configuration, as the resolutions of the counters 360 and 370 are higher, the circuit scale of the determiner 380 may increase. A solid-state imaging element 200 according to the third embodiment is different from that of the second embodiment in that the determiner 380 determines whether or not the illuminance is high on the basis of a specific bit of a digital signal.

Figure 15:
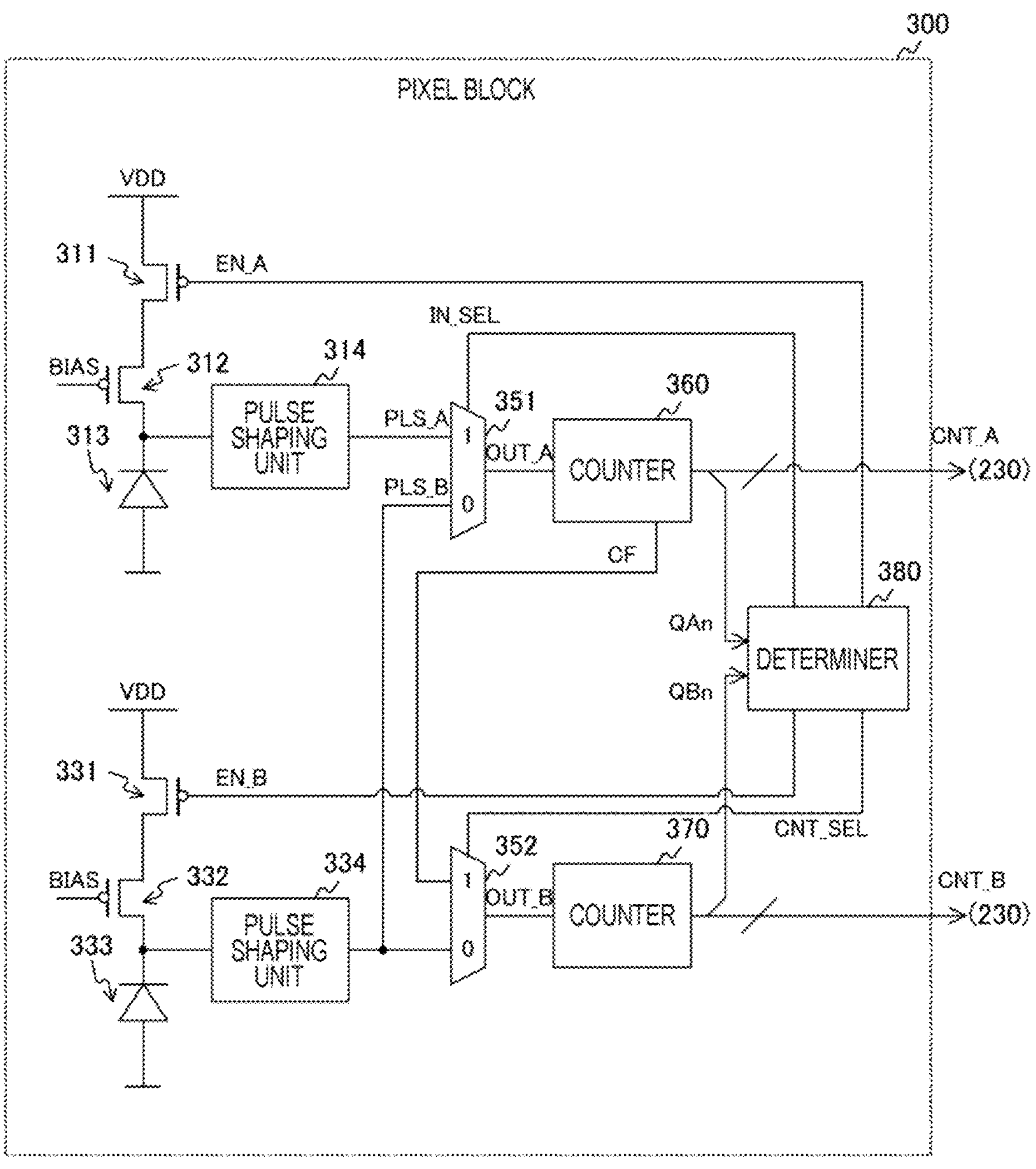
FIG. 15 is a circuit diagram illustrating a configuration example of a pixel block in a third embodiment of the present technology.

FIG. 15 is a circuit diagram illustrating a configuration example of the pixel block 300 in the third embodiment of the present technology. The pixel block 300 of the third embodiment is different from that of the second embodiment in that counters 360 and 370 supply specific bits of a digital signal to the determiner 380.

When the threshold to be compared with the count value is $2^n$ (n is an integer) and the counters 360 and 370 are binary counters, bits QAn and QBn of the n-th digit are output. The determiner 380 determines whether or not the illuminance is high on the basis of the bits. It is determined whether or not the count value is equal to or larger than the threshold $2^n$ on the basis of whether or not each of QAn and QBn is "1".

Since it is sufficient to determine whether or not the bits QAn and QBn are "1", the circuit scale of the determiner 380 can be reduced as compared with the first embodiment. Furthermore, the number of wirings from the counters 360 and 370 to the determiner 380 can be reduced as compared with the second embodiment.

Note that the counters 360 and 370 may supply high-order bits (such as high-order 2 bits of 4 bits) to the determiner 380 instead of specific bits, and the determiner 380 may make a determination on the basis of these bits.

Figure 16:
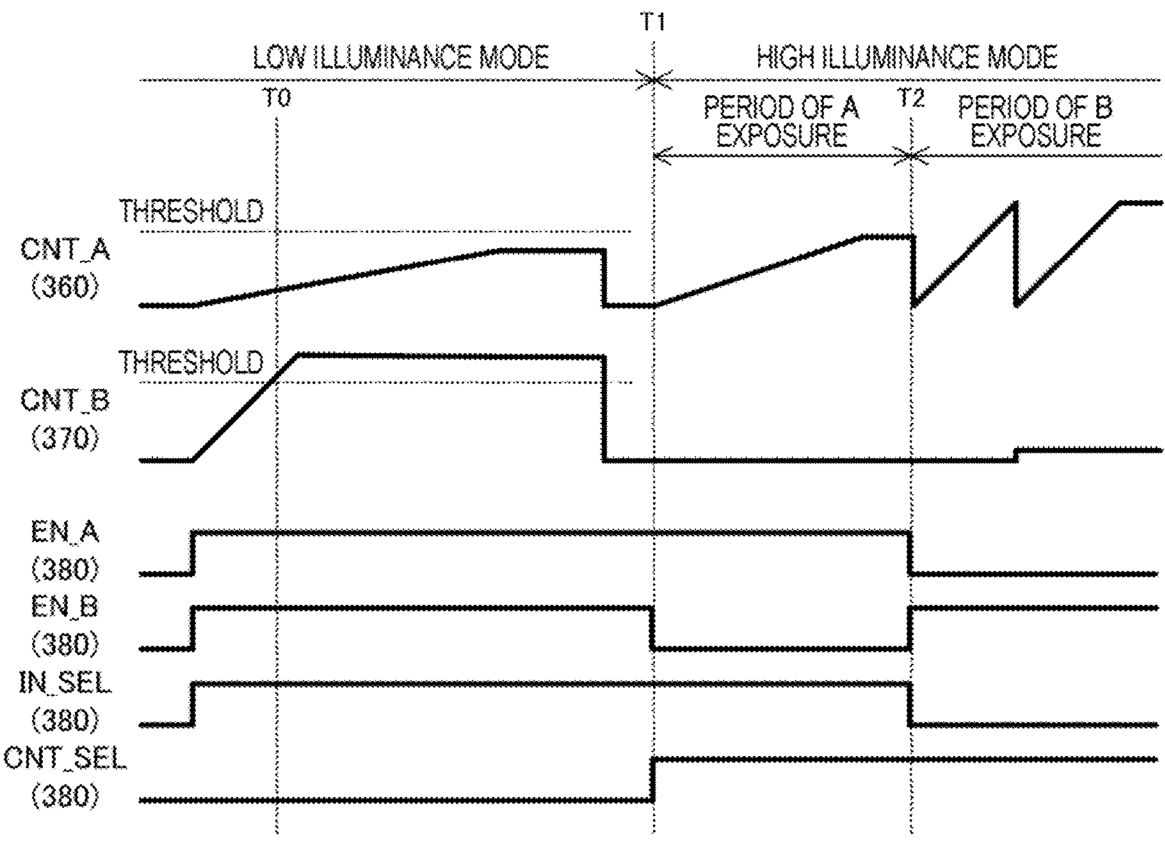
FIG. 16 is an example of a timing chart at the time of switching from the low illuminance mode to the high illuminance mode in the third embodiment of the present technology.

FIG. 16 is an example of a timing chart at the time of switching from the low illuminance mode to the high illuminance mode in the third embodiment of the present technology. It is assumed that the above-described (2-3) is used as a method of determining whether or not the illuminance is high. It is assumed that the low illuminance mode is set for the focused pixel block 300, and QAn becomes "1" at timing TO for the count value (CNT_B) of the pixel B.

Since the count value has become equal to or greater than the threshold $2^n$, the determiner 380 determines that the illuminance is high, and switches to the high illuminance mode at timing T1 after reading the count value. In the high illuminance mode, the pixel A is exposed from timing T1 to timing T2, and the pixel B is exposed after timing T2.

Figure 17:
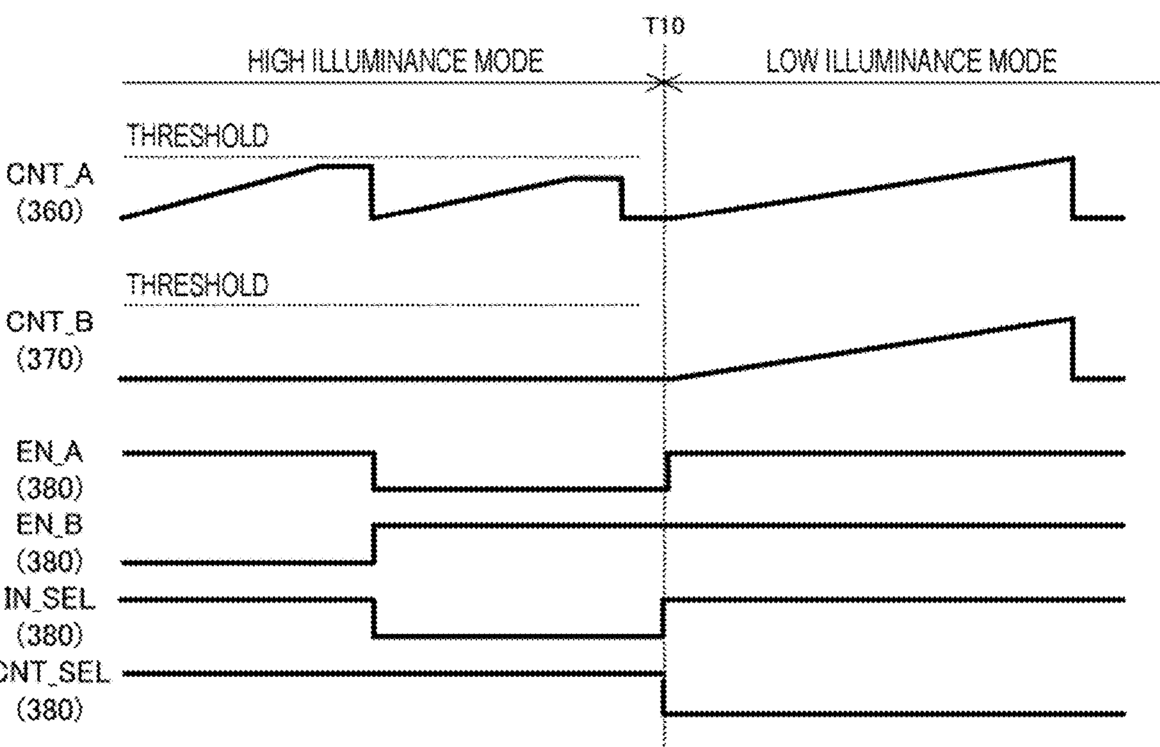
FIG. 17 is an example of a timing chart at the time of switching from the high illuminance mode to the low illuminance mode in the third embodiment of the present technology.

FIG. 17 is an example of a timing chart at the time of switching from the high illuminance mode to the low illuminance mode in the third embodiment of the present technology. It is assumed that the high illuminance mode is set for the focused pixel block 300, and both QAn and QBn are "0". Since all the count values are less than the threshold $2^n$, the determiner 380 determines that the illuminance is low, and switches to the low illuminance mode at timing T10.

As described above, according to the third embodiment of the present technology, since the determiner 380 determines whether or not the illuminance is high on the basis of the specific bits from the counters 360 and 370, the circuit scale of the determiner 380 can be reduced as compared with the second embodiment.

4. Fourth Embodiment

In the first embodiment described above, two pixels sharing the counters 360 and 370 are arranged adjacent to each other in the column direction. However, in a case where the two pixels are arranged in the Bayer array, colors of color filters of the two pixels adjacent to each other in the column direction are different from each other. However, since the transmittance differs for each color of the color filter, in a case where the counters 360 and 370 are shared, it is preferable that two pixels in the pixel block 300 have the same color. A solid-state imaging element 200 according to a fourth embodiment is different from that of the first embodiment in that pixels of the same color are arranged in a pixel block 300.

Figure 18:
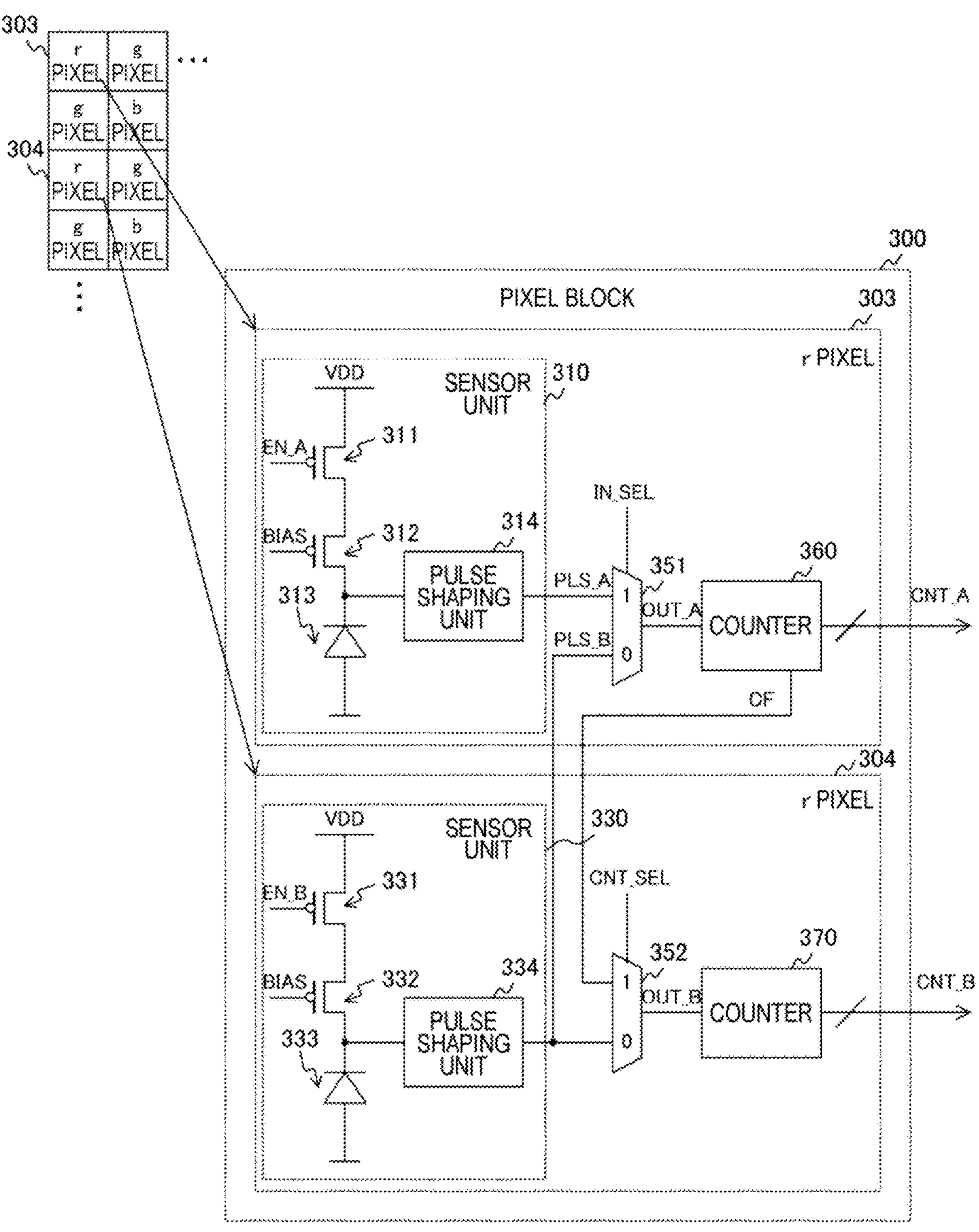
FIG. 18 is a diagram illustrating an arrangement example of each pixel in a pixel block according to a fourth embodiment of the present technology.

FIG. 18 is a circuit diagram illustrating an arrangement example of each pixel in the pixel block 300 according to the fourth embodiment of the present technology. In the pixel array unit 220, a plurality of pixels is arranged in a Bayer array. Furthermore, a color filter (not illustrated) and a microlens (not illustrated) are arranged for each pixel. The color filter transmits any color of red, green, and blue. The pixels in which the color filters of the respective colors are arranged are referred to as an r pixel, a g pixel, and a b pixel, respectively. In the Bayer array, in 2 rows×2 columns, two g pixels are arranged in an oblique direction, and the r pixel and the b pixel are arranged in the rest.

For example, an r pixel 303, a g pixel, an r pixel 304, and a g pixel are arranged in the column direction. The sensor unit 310, the multiplexer 351, and the counter 360 are arranged in the r pixel 303, and the sensor unit 330, the multiplexer 352, and the counter 370 are arranged in the r pixel 304.

As illustrated in the drawing, since two pixels of the same color are arranged in the pixel block 300, the count value of each pixel can be set to the same level.

Figure 19:
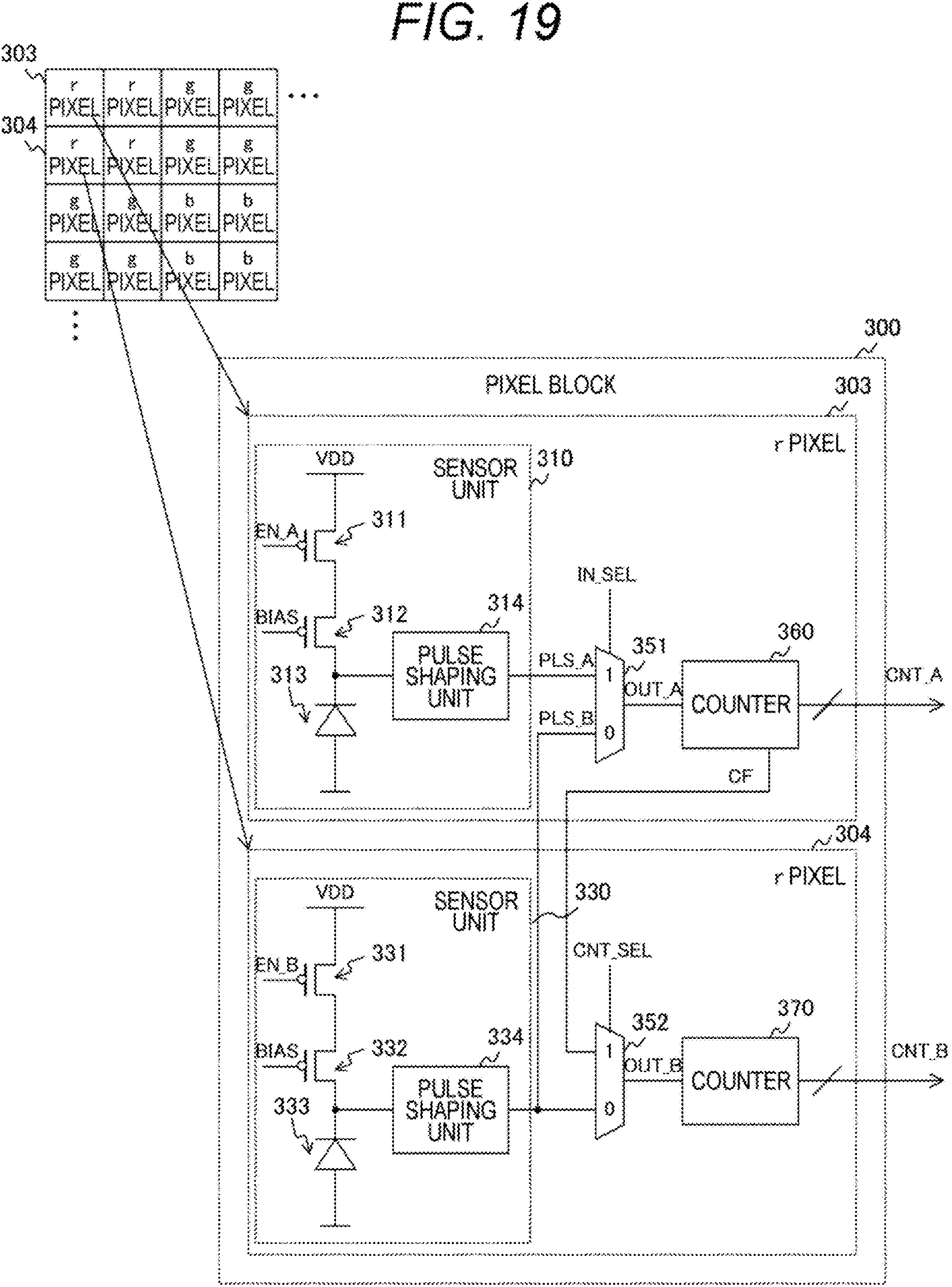
FIG. 19 is a diagram illustrating an arrangement example of each pixel of the quad Bayer array according to the fourth embodiment of the present technology.

Note that, as illustrated in FIG. 19, in the quad Bayer array, two pixels of the same color can be arranged in the pixel block 300.

Note that the second or third embodiment can be applied to the fourth embodiment. In this case, since the count value of each pixel can be made similar, the determiner 380 can accurately determine the illuminance.

As described above, according to the fourth embodiment of the present technology, since the two pixels have the same color in the pixel block 300, it is possible to set the count value of each pixel to the same level.

5. Fifth Embodiment

In the fourth embodiment described above, the microlens is arranged for each pixel. However, in order to realize the image plane phase difference auto focus (AF) in this configuration, it is necessary to further arrange a pixel for phase difference detection in addition to the r pixel, the g pixel, and the b pixel. A solid-state imaging element 200 in the fifth embodiment is different from that in the fourth embodiment in that a plurality of pixels is arranged immediately below a microlens.

Figure 20:
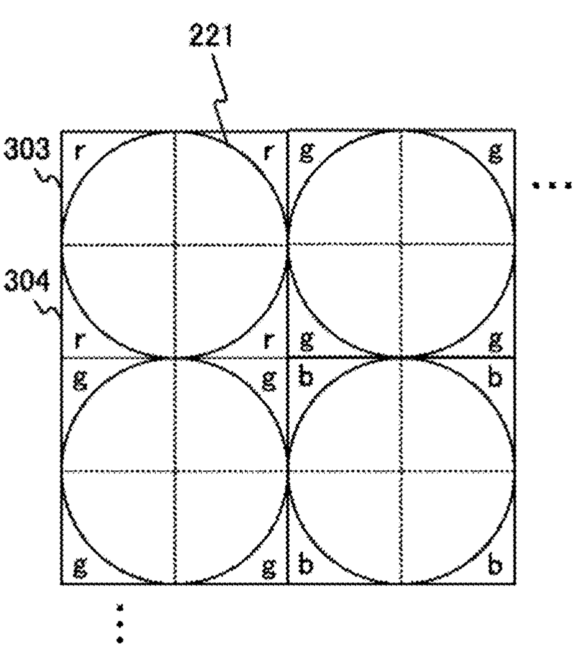
FIG. 20 is a diagram illustrating an arrangement example of each pixel in a pixel block according to a fifth embodiment of the present technology.

FIG. 20 is a diagram illustrating an arrangement example of pixels in the pixel block 300 in the fifth embodiment of the present technology. In the fifth embodiment, pixels are arranged in a quad Bayer array. Furthermore, for every four adjacent pixels of the same color, a microlens 221 that guides incident light to those pixels is arranged. A plurality of pixels (such as r pixels 303 and 304) below the microlens 221 shares the counters 360 and 370.

A circuit (such as the signal processing unit 230) at the subsequent stage to the pixel detects, as a phase difference, a distance between respective peaks of an image in which pixel signals on the left side (or upper side) of each of the microlenses 221 are arranged and an image in which pixel signals on the right side (or lower side) of each of the microlenses are arranged. A focus lens (not illustrated) is driven according to the phase difference. Therefore, it is possible to realize the image plane phase difference AF without arranging the pixels for phase difference detection.

Note that the second or third embodiment can be applied to the fifth embodiment.

As described above, according to the fifth embodiment of the present technology, since the two pixels sharing the counters 360 and 370 are arranged below the microlens 221, the image plane phase difference AF can be easily realized.

6. Sixth Embodiment

In the first embodiment described above, the count interval of the pulse signal is constant, but this count interval can be switched during imaging. A solid-state imaging element 200 according to a sixth embodiment is different from that of the first embodiment in that a count interval is switched during imaging.

Figure 21:
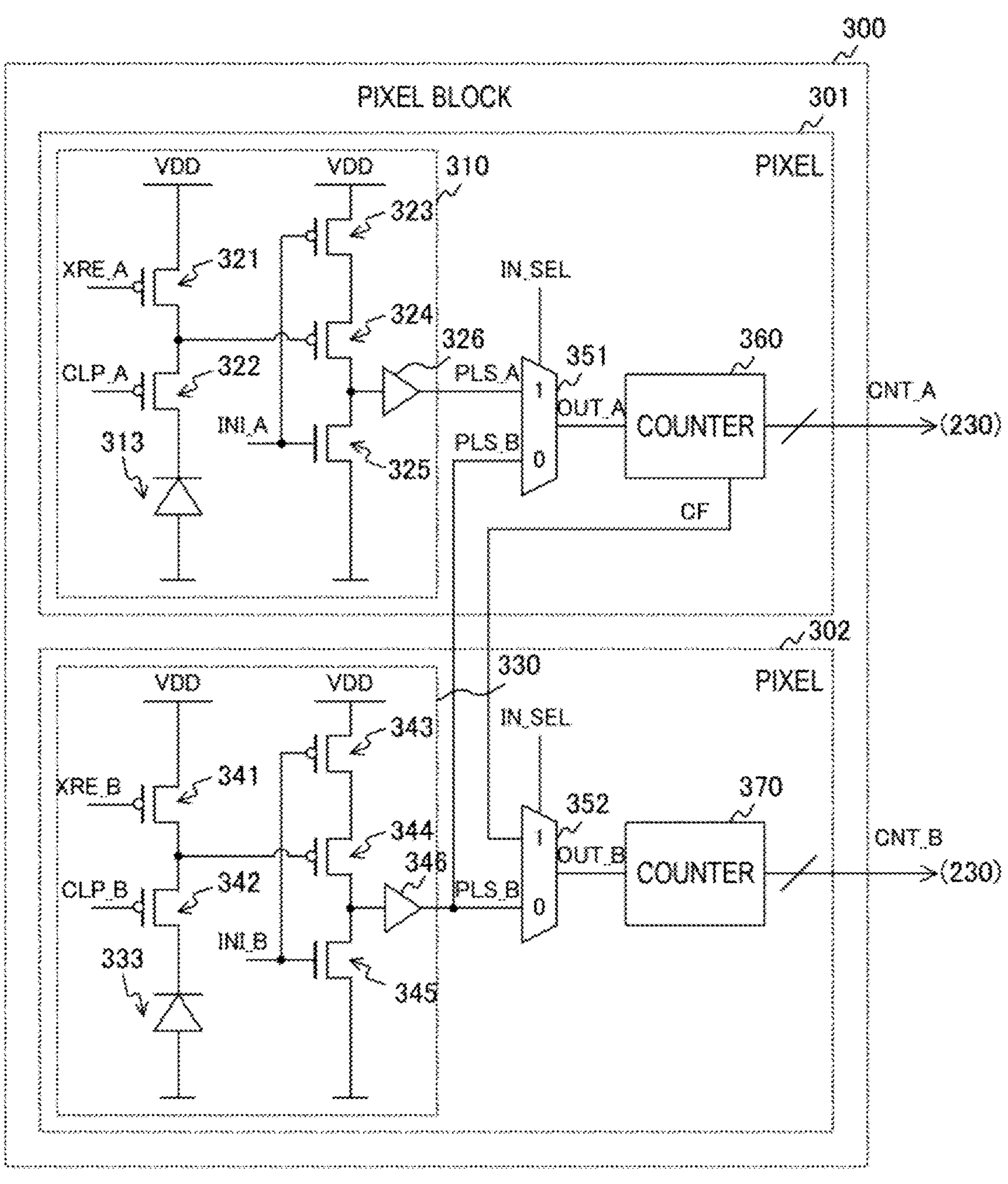
FIG. 21 is a circuit diagram illustrating a configuration example of a pixel block in a sixth embodiment of the present technology.

FIG. 21 is a circuit diagram illustrating a configuration example of a pixel block 300 in the sixth embodiment of the present technology. In the sixth embodiment, the sensor unit 310 includes a recharge transistor 321, a clip transistor 322, a SPAD 313, pMOS transistors 323 and 324, an nMOS transistor 325, and a buffer 326.

Furthermore, the sensor unit 330 includes a recharge transistor 341, a clip transistor 342, a SPAD 333, pMOS transistors 343 and 344, an nMOS transistor 345, and a buffer 346.

The recharge transistor 321 and the clip transistor 322 are connected in series between the cathode of the SPAD 313 and the power supply voltage VDD with the recharge transistor 321 as a power supply side.

The recharge transistor 321 performs recharge to return the cathode potential of the SPAD 313 to the power supply voltage VDD in accordance with a control signal XRE_A from the control circuit 210. A count interval, which is an interval at which recharge is performed, is controlled by the control circuit 210. In a case where there is incidence of one or more photons within this count interval, one pulse is generated.

The clip transistor 322 disconnects the SPAD 313 from the connection node of the recharge transistor 321 and the clip transistor 322 in accordance with a control signal CLP A from the control circuit 210. The SPAD 313 is disconnected from the connection node immediately before starting the recharge, and the SPAD 313 is connected to the node in the recharge period. The clip transistor 322 can reduce the cathode capacitance.

The pMOS transistors 323 and 324 and the nMOS transistor 325 are connected in series between the power supply voltage VDD and the ground node with the pMOS transistor 323 as a power supply side and the nMOS transistor 325 as a ground side. A control signal INI_A from the control circuit 210 is input to the gates of the pMOS transistor 323 and the nMOS transistor 325. Furthermore, the gate of the pMOS transistor 324 is connected to a connection node between the recharge transistor 321 and the clip transistor 322.

The buffer 326 outputs a signal of the potential of the connection node of the pMOS transistor 324 and the nMOS transistor 325 to the multiplexer 351 as the pulse signal PLS_A. Note that a two-stage inverter can be inserted instead of the buffer 326.

The circuit configuration of the sensor unit 330 is similar to that of the sensor unit 310. However, control signals XRE_B, CLP_B, and INI_B are input.

The control circuit 210 controls the count interval to either a long interval longer than a predetermined time or a short interval equal to or shorter than the predetermined time. By switching the count interval during imaging, the number of pulses can be counted even in a case where the frequency of light is higher than that in the first embodiment. Furthermore, when the frequencies are the same, the count value can be made smaller than that in the first embodiment. Therefore, the bit depth and power consumption of the digital signal can be reduced.

FIG. 22 is a diagram illustrating an example of operation of the control circuit 210 in the sixth embodiment of the present technology. In a case where the count interval is set to a long interval, the control circuit 210 sets the selection signal IN_SEL to "1" and sets the selection signal CNT_SEL to "0". Therefore, the pulse signal PLS_A is selected in the pixel A, and the pulse signal PLS_B is selected in the pixel B. Furthermore, the control circuit 210 sets both the enable signals EN_A and EN_B to "0" (enable). With these controls, both the pixels A and B are exposed.

On the other hand, in a case where the count interval is set to a short interval, only one of the pixels A and B is exposed, and the exposure target is switched at regular time intervals. In the exposure period of the pixel A, the control circuit 210 sets the selection signal IN_SEL to "1" and sets the selection signal CNT_SEL to "1". Therefore, the pulse signal PLS_A is selected in the pixel A, and the carry flag CF is selected in the pixel B. Furthermore, the control circuit 210 sets the enable signal EN_A to "0" (enable) and sets the enable signal EN_B to "1" (disable).

Furthermore, in the exposure period of the pixel B, the control circuit 210 sets the selection signal IN_SEL to "0" and sets the selection signal CNT_SEL to "1". Therefore, the pulse signal PLS_B is selected in the pixel A, and the carry flag CF is selected in the pixel B. Furthermore, the control circuit 210 sets the enable signal EN_A to "1" (disable) and sets the enable signal EN_B to "0" (enable).

Figure 23:
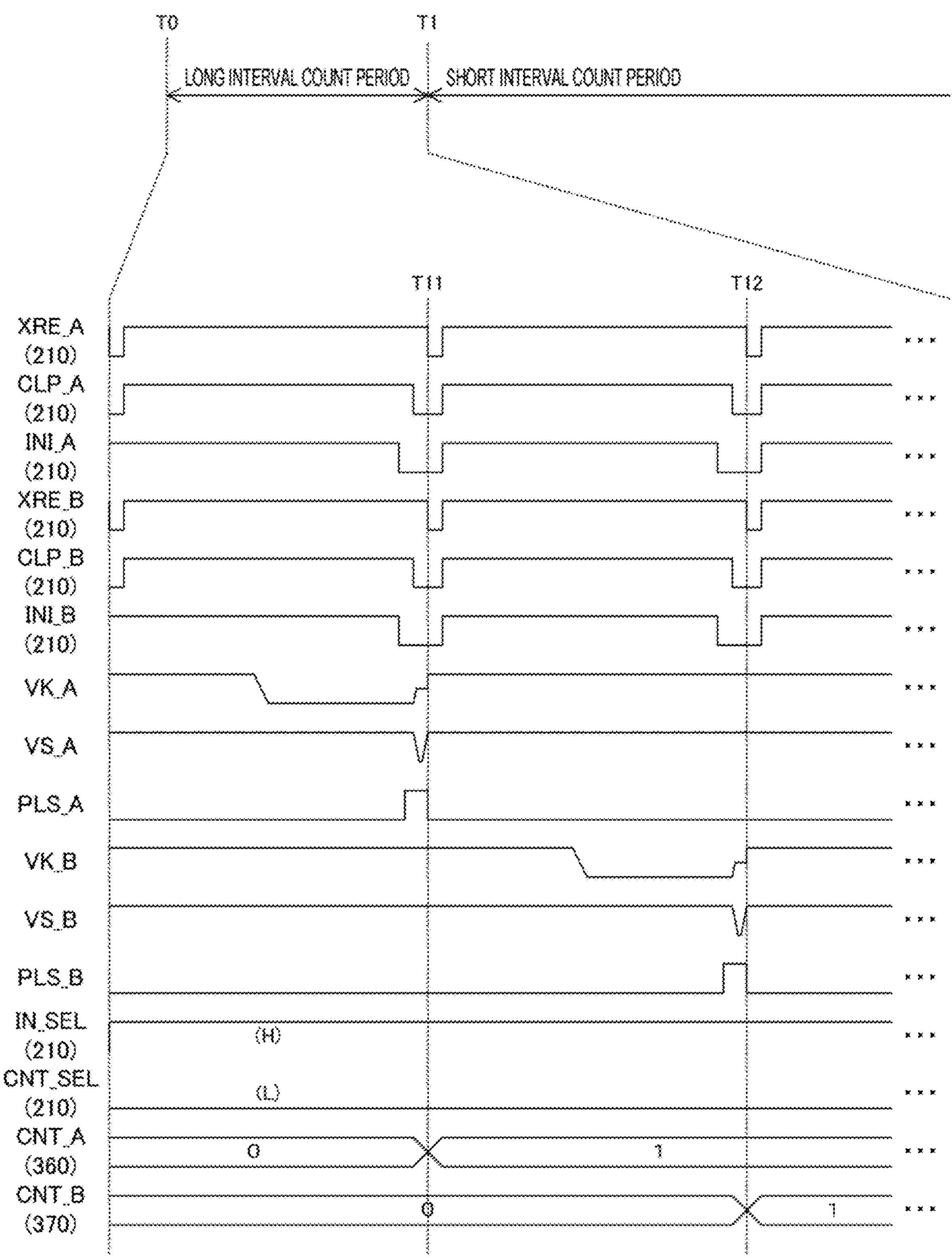
FIG. 23 is a timing chart illustrating an example of operation of the solid-state imaging element in a long interval count period according to the sixth embodiment of the present technology.

FIG. 23 is a timing chart illustrating an example of operation of the solid-state imaging element 200 in a long interval count period according to the sixth embodiment of the present technology. The count interval is controlled to be a long interval in a period from timing T0 to timing T1. In a predetermined period from timing T0, the control signal XRE_A is controlled to a low level, and the first recharge is performed. Furthermore, the second and third recharges are performed at timings T11 and T12. Thereafter, the recharge is periodically repeated. The recharge interval (that is, count interval) is controlled to a long interval.

In a period from timing T0 to timing T1, the control circuit 210 sets the selection signal IN_SEL to the high level and sets the selection signal CNT_SEL to the low level. Therefore, the digital signals CNT_A and CNT_B count up when photons are incident in each count interval.

Figure 24:
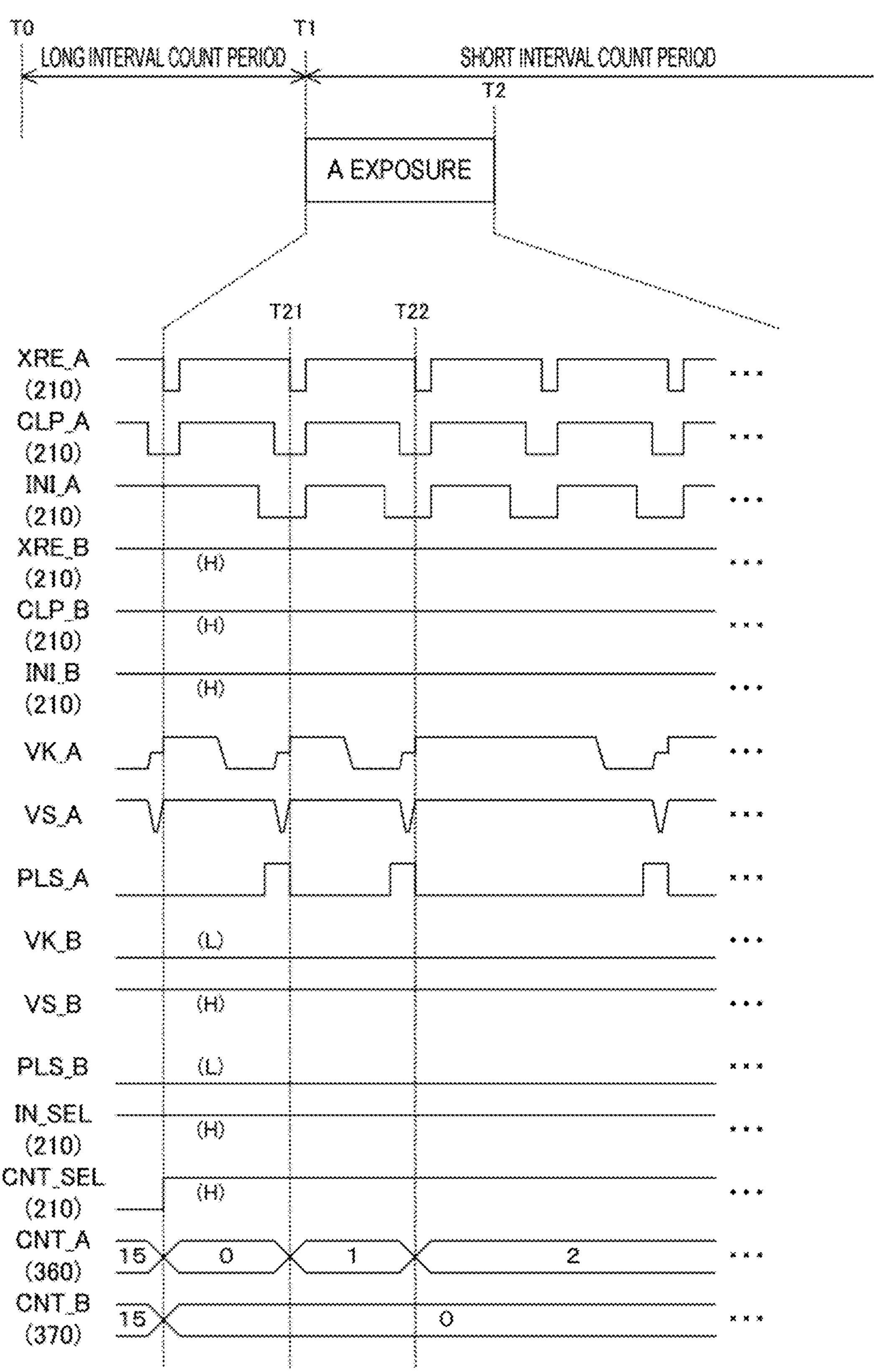
FIG. 24 is a timing chart illustrating an example of operation of the solid-state imaging element in the exposure period of a pixel A in a short interval count period according to the sixth embodiment of the present technology.

FIG. 24 is a timing chart illustrating an example of operation of the solid-state imaging element in the exposure period of the pixel A in the short interval count period according to the sixth embodiment of the present technology. After timing T1, the count interval is controlled to be a short interval. Note that the short interval count period is controlled to be, for example, 10% or less of the entire period.

In a period from timing T1 to timing T2, the control circuit 210 sets the selection signal IN_SEL to the high level, sets the selection signal CNT_SEL to the high level, and enables only the pixel A by the enable signal. Therefore, the digital signal CNT_A counts up when photons are incident in each count interval.

Figure 25:
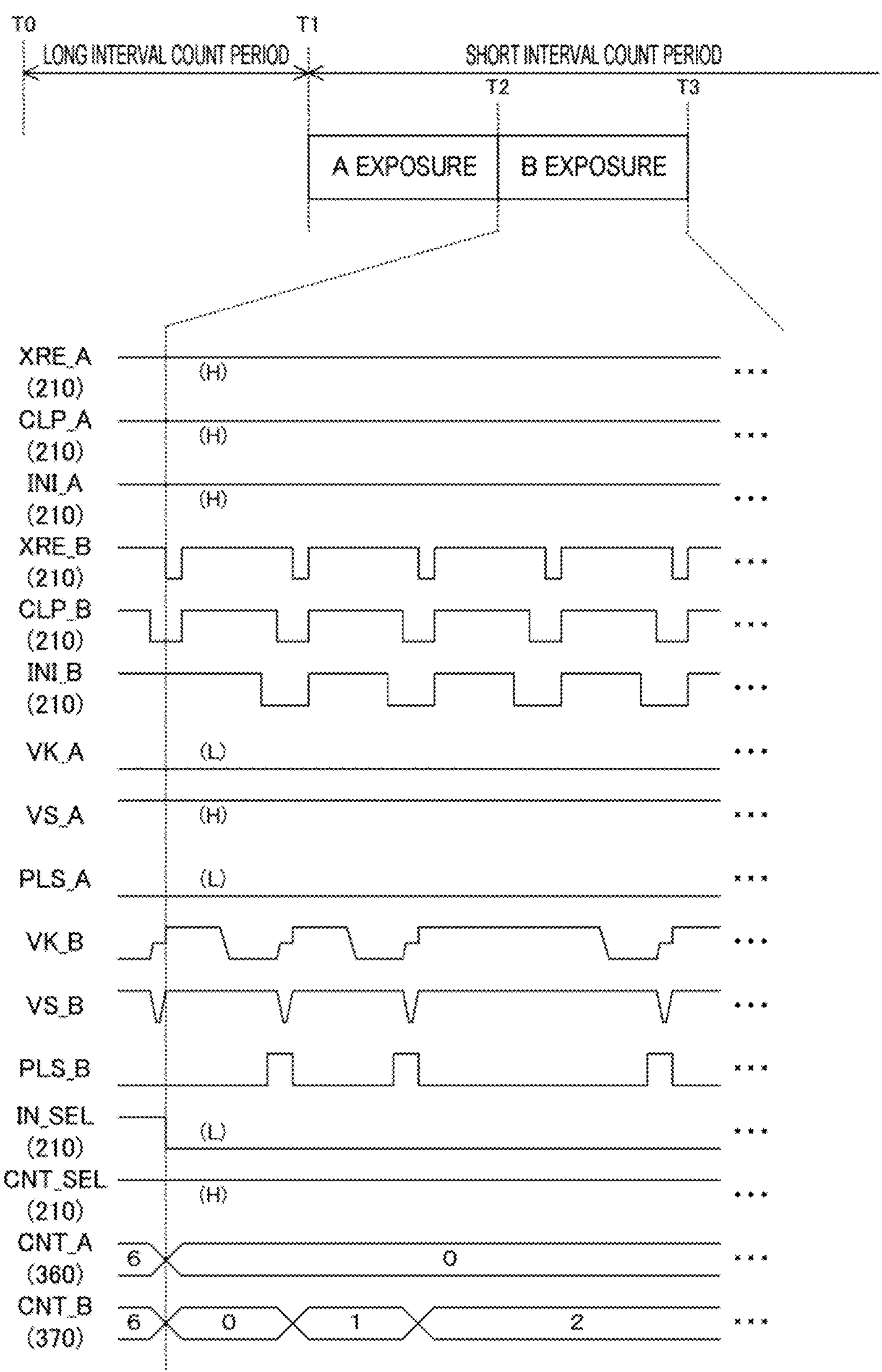
FIG. 25 is a timing chart illustrating an example of operation of the solid-state imaging element in the exposure period of a pixel B in a short interval count period according to the sixth embodiment of the present technology.

FIG. 25 is a timing chart illustrating an example of operation of the solid-state imaging element in the exposure period of the pixel B in the short interval count period according to the sixth embodiment of the present technology. After timing T2, the control circuit 210 sets the selection signal IN_SEL to the low level, sets the selection signal CNT_SEL to the high level, and enables only the pixel B by the enable signal. Therefore, the digital signal CNT_B counts up when photons are incident in each count interval.

Note that the fourth or fifth embodiment can be applied to the sixth embodiment.

As described above, according to the sixth embodiment of the present technology, since the count interval is switched, the bit depth and power consumption of the digital signal can be reduced as compared with a case where the count interval is not switched.

Modifications

In the sixth embodiment described above, the solid-state imaging element 200 switches the count interval to one of the two intervals, but can switch the count interval to one of three or more intervals. A solid-state imaging element 200 in a modification of the sixth embodiment is different from that of the sixth embodiment in that a count interval is switched to one of three or more intervals.

FIG. 26 is a diagram illustrating an example of operation of a control circuit 210 in the modification of the sixth embodiment of the present technology. In the modification of the sixth embodiment, the count interval is switched to one of three or more intervals. For example, the count interval is switched to one of intervals P1, P2, P3, and P4. It is assumed that P1 is the longest, P2 is shorter than P1, P3 is shorter than P2, and P4 is the shortest.

These four are divided into a long interval group longer than a predetermined interval and a short interval group shorter than the predetermined interval. The number of intervals in each group is one or more. For example, P1 and P2 are a long interval group, and P3 and P4 are a short interval group. Note that P1 may be a long interval group, and P2, P3, and P4 may be a short interval group.

In a case where the count interval is switched to one of the long interval groups, the control circuit 210 sets the selection signal IN_SEL to "1" and sets the selection signal CNT_SEL to "0". Furthermore, the control circuit 210 exposes both the pixels A and B. On the other hand, in a case where the count interval is switched to one of the short interval groups, the control circuit 210 sets the selection signal IN_SEL to "1" and sets the selection signal CNT_SEL to "1". Furthermore, the control circuit 210 exposes only one of the pixels A and B, and switches the exposure target at regular time intervals.

As described above, according to the modification of the sixth embodiment of the present technology, the count interval can be switched to one of three or more intervals.

7. Seventh Embodiment

In the sixth embodiment described above, the control circuit 210 controls the count interval to either the long interval or the short interval. However, when the number of pulses is counted in the long interval in a case where the illuminance is high, the count value may be saturated. A solid-state imaging element 200 in the seventh embodiment is different from that in the sixth embodiment in that counting when the count interval is a long interval is set to be valid or invalid on the basis of digital signals of the pixels A and B.

Figure 27:
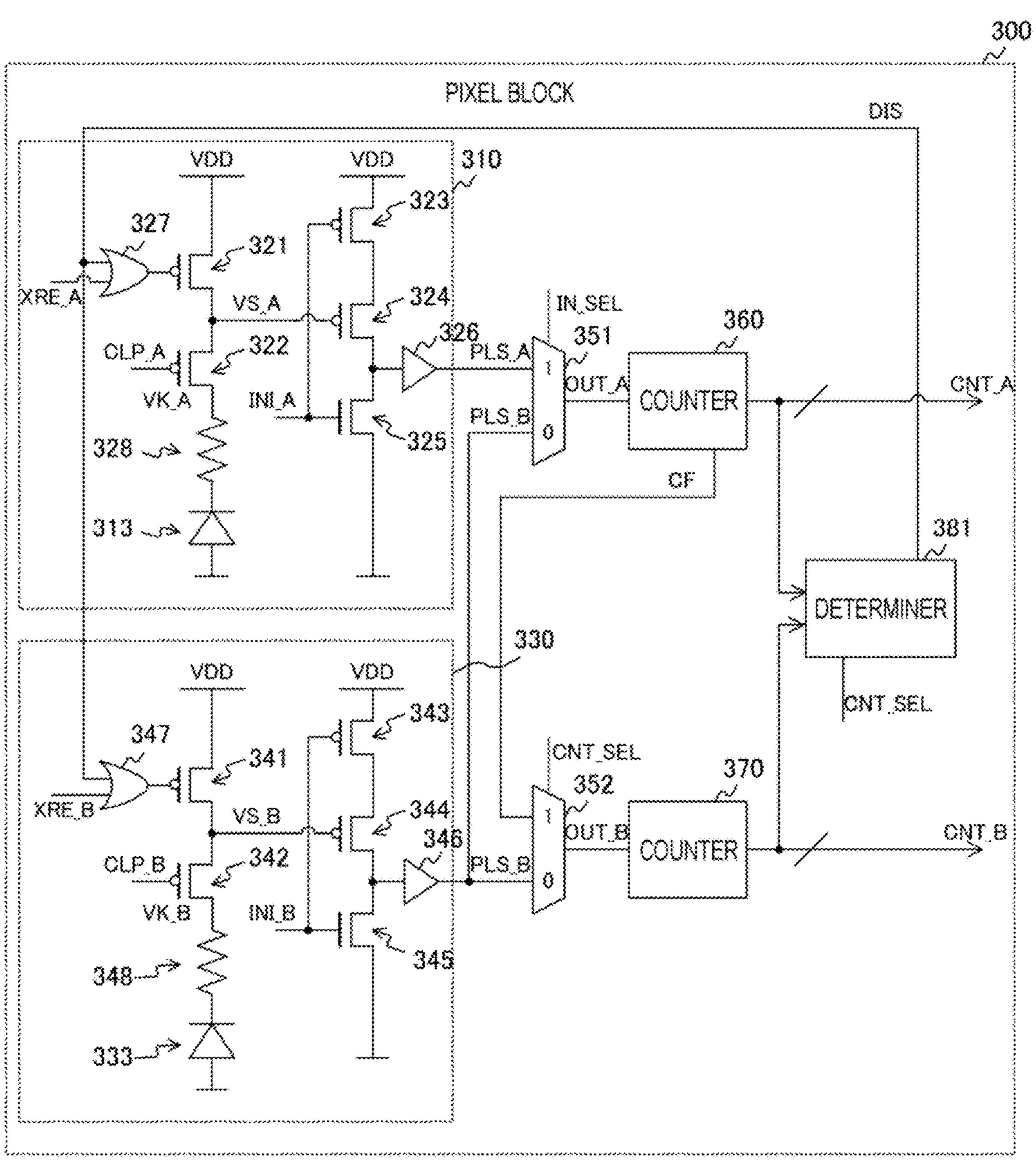
FIG. 27 is a circuit diagram illustrating a configuration example of a pixel block in a seventh embodiment of the present technology.

FIG. 27 is a circuit diagram illustrating a configuration example of the pixel block 300 in the seventh embodiment of the present technology. The pixel block 300 of the seventh embodiment is different from that of the sixth embodiment in further including resistive elements 328 and 348, OR (logical sum) gates 327 and 347, and a determiner 381.

The resistive element 328 is inserted between the SPAD 313 and the clip transistor 322, and the resistive element 348 is inserted between the SPAD 333 and the clip transistor 342. These resistive elements are inserted as necessary.

The determiner 381 determines whether or not to set the counting of each of the counters 360 and 370 to be valid in a period of a long count interval on the basis of the digital signals CNT_A and CNT_B in a period of a short count interval.

The selection signal CNT_SEL from the control circuit 210 and the digital signals CNT_A and CNT_B from the counters 360 and 370 are input to the determiner 381. The determiner 381 acquires the digital signals CNT_A and CNT_B generated in the period in which the selection signal CNT_SEL is at the high level (that is, the count interval is a short interval). Then, the determiner 381 determines whether or not the illuminance is high on the basis of these digital signals.

For example, the determiner 381 determines the illuminance by one of the determination methods (1), (2-1), and (2-3) described above.

(3) Alternatively, the determiner 381 determines that the illuminance is high in a case where there is one or more pixels in which the value of the high-order bit of the digital signal is equal to or greater than the threshold.

(4) Alternatively, the determiner 381 determines that the illuminance is high in a case where there is one or more pixels in which the value of the most significant bit (MSB) of the digital signal becomes the high level.

Furthermore, the determiner 381 supplies an enable signal DIS to the OR gates 327 and 347. The enable signal DIS is controlled to a low level (enable) in a period in which the count interval is a short interval. Therefore, this sets the counting of the counters 360 and 370 to be valid.

In a case where it is determined that the illuminance is high, the determiner 381 sets the enable signal DIS to the high level (disable) in a period in which the selection signal CNT_SEL is at the high level (that is, the count interval is a short interval). Therefore, the counting of the counters 360 and 370 in the period in which the count interval is the long interval becomes invalid. On the other hand, in a case where it is determined that the illuminance is low, the determiner 381 keeps the enable signal DIS at a low level and sets the counting of the counters 360 and 370 to be valid.

Figure 28:
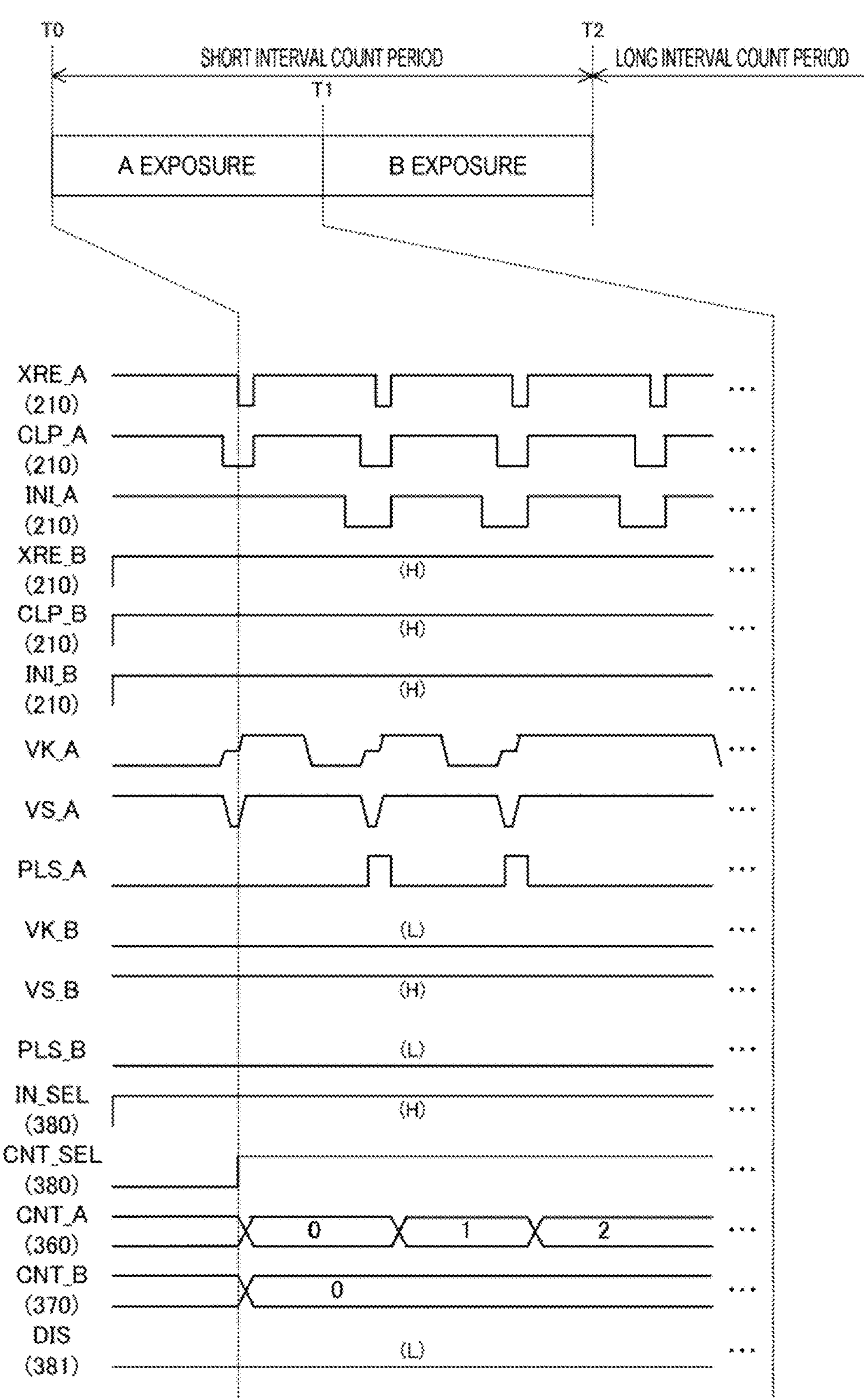
FIG. 28 is a timing chart illustrating an example of operation of the solid-state imaging element in the exposure period of a pixel A in a short interval count period according to the seventh embodiment of the present technology.

FIG. 28 is a timing chart illustrating an example of operation of the solid-state imaging element 200 in the exposure period of the pixel A in the short interval count period according to the seventh embodiment of the present technology.

Figure 29:
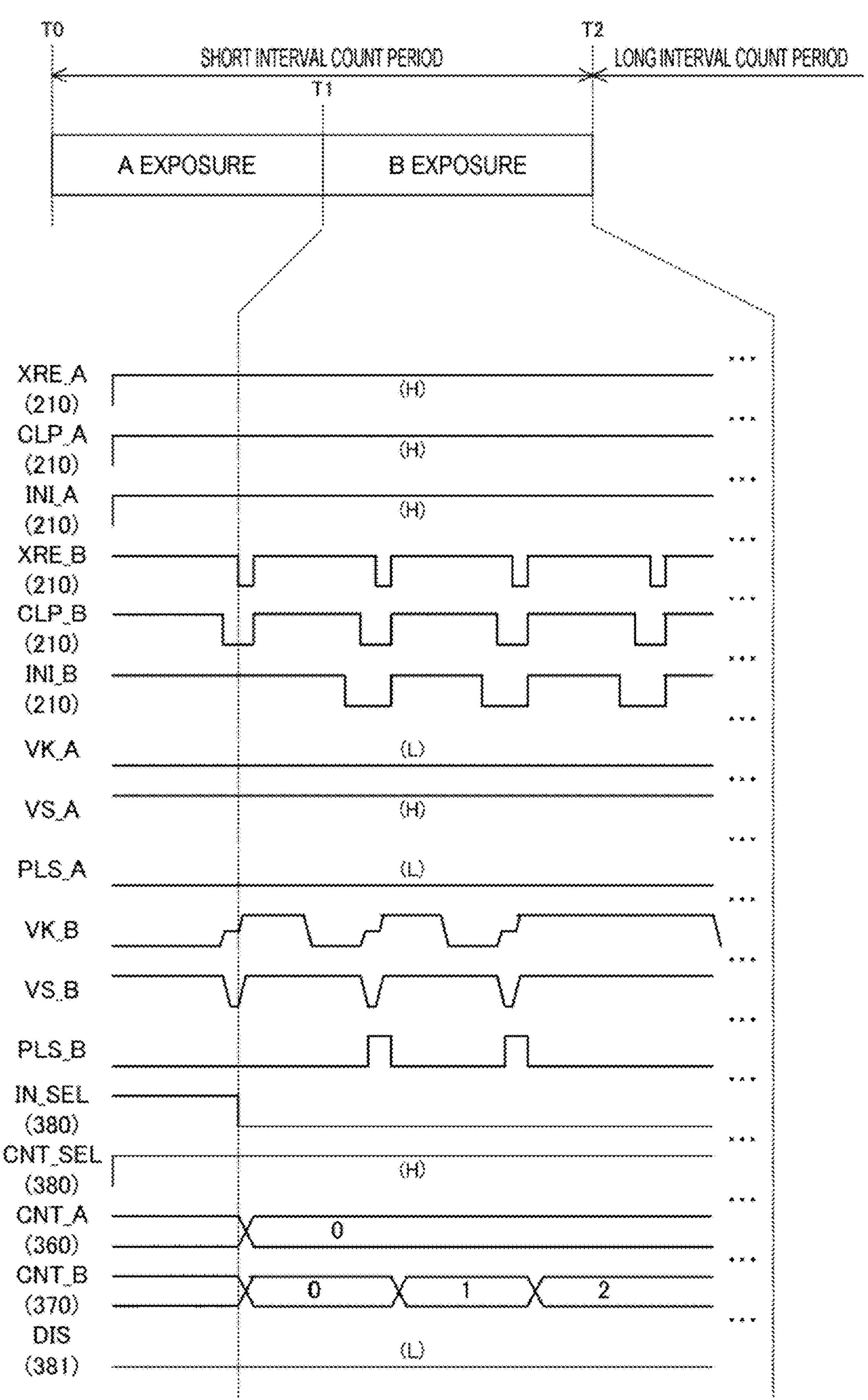
FIG. 29 is a timing chart illustrating an example of operation of the solid-state imaging element in the exposure period of the pixel B in a short interval count period according to the seventh embodiment of the present technology.

FIG. 29 is a timing chart illustrating an example of operation of the solid-state imaging element 200 in the exposure period of the pixel B in the short interval count period according to the seventh embodiment of the present technology.

As illustrated in FIGS. 28 and 29, in the seventh embodiment, control similar to that in the sixth embodiment is performed. Furthermore, in a period in which the count interval is a short interval, the counting of the counters 360 and 370 is controlled to be valid by the enable signal DIS at a low level (enable).

Figure 30:
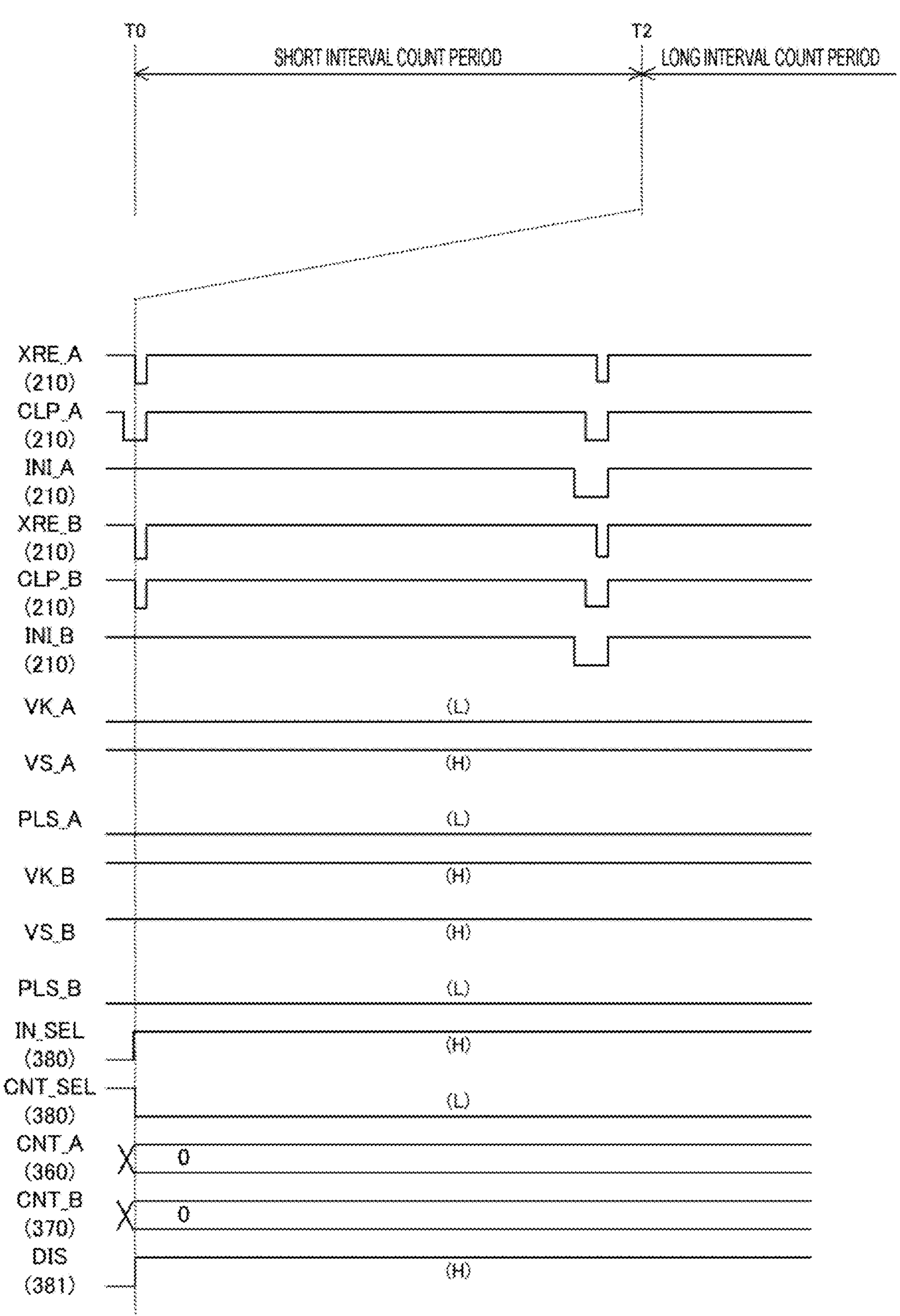
FIG. 30 is a timing chart illustrating an example of operation of the solid-state imaging element in a long interval count period according to the seventh embodiment of the present technology.

FIG. 30 is a timing chart illustrating an example of operation of the solid-state imaging element in a long interval count period according to the seventh embodiment of the present technology. It is assumed that the determiner 381 determines that the illuminance is high on the basis of the digital signal within the period of the short interval. In this case, the determiner 381 sets the enable signal DIS to the high level (disable). Therefore, as illustrated in the drawing, the counting of the counters 360 and 370 in the period in which the count interval is the long interval becomes invalid.

As illustrated in the drawing, by setting counting in a long interval to be invalid at the time of high illuminance, it is possible to prevent saturation of the count value when the resolution is not extended.

Note that the determiner 381 can also determine whether or not to set the counting of each of the counters 360 and 370 to be valid in a period of a short count interval on the basis of the digital signals CNT_A and CNT_B in a period of a long count interval. In this case, the counting in the period of the short interval is controlled to be invalid at low illuminance. Whether or not the illuminance is low is determined by one of the determination methods (1), (2-2), and (2-4) described above.

(5) Alternatively, the determiner 381 determines that the illuminance is low in a case where there is one or more pixels in which the value of the high-order bit of the digital signal in the period in which the count interval is the long interval is less than the threshold.

(6) Alternatively, the determiner 381 determines that the illuminance is low in a case where there is one or more pixels in which the MSB value of the digital signal in the period in which the count interval is the long interval becomes the low level.

Furthermore, the fourth or fifth embodiment can be applied to the seventh embodiment. Furthermore, the modification of the sixth embodiment can be applied to the seventh embodiment.

As described above, according to the seventh embodiment of the present technology, the determiner 381 sets counting in the period in which the count interval is the long interval to be valid or invalid on the basis of the digital signals CNT_A and CNT_B, so that saturation of the count value can be prevented.

8. Eighth Embodiment

In the sixth embodiment described above, the control circuit 210 controls the count interval to either the long interval or the short interval, but the count interval may be switched in a 1V period for imaging one frame. A solid-state imaging element 200 in the eighth embodiment is different from that in the sixth embodiment in that a count interval is switched in a 1V period. Note that the 1V period is an example of a frame period described in the claims.

Figure 31:
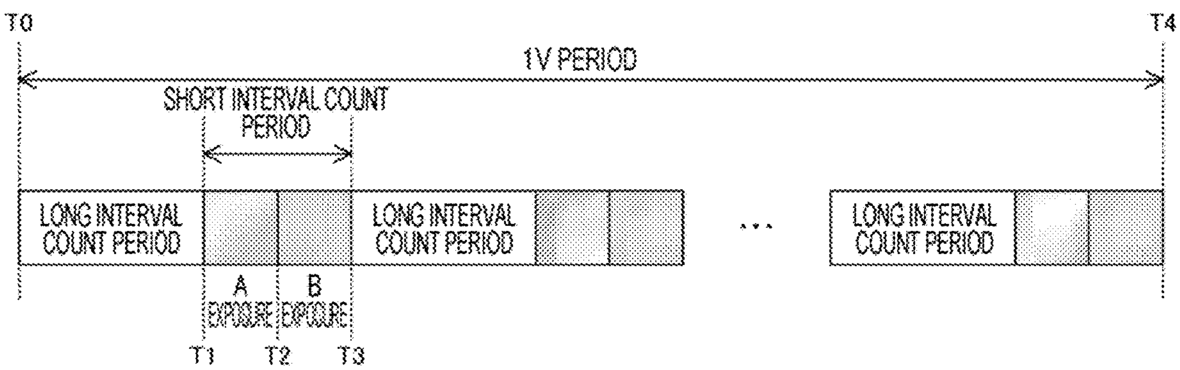
FIG. 31 is a diagram illustrating an example of a count interval in a 1V period of a predetermined row according to an eighth embodiment of the present technology.

FIG. 31 is a diagram illustrating an example of a count interval in a 1V period of a predetermined row according to the eighth embodiment of the present technology. In the eighth embodiment, the control circuit 210 switches the count interval in a 1V period from timing T0 to timing T4.

For example, the count interval is controlled to be a long interval in a period from timing T0 to timing T1. Then, the control circuit 210 switches the count interval to a short interval at timing T1. The pixel A is exposed in the period from timing T1 to timing T2, and the pixel B is exposed in the period from timing T2 to timing T3. The control circuit 210 switches the count interval to a long interval at timing T3. Hereinafter, the similar control is repeatedly executed until timing T4.

The signal processing unit 230 acquires a long-interval digital signal and a short-interval digital signal in a 1V period for each pixel. The signal processing unit 230 calculates a statistic (average value or total value) of the digital signals in each period as a pixel signal for each pixel, and outputs a frame in which the pixel signals are arranged.

As illustrated in the drawing, by switching the count interval in the 1V period, occurrence of blur can be suppressed when a moving subject is imaged.

Note that each of the fourth, fifth, and seventh embodiments can also be applied to the eighth embodiment. Furthermore, the modification of the sixth embodiment can be applied to the eighth embodiment.

As described above, according to the eighth embodiment of the present technology, since the control circuit 210 switches the count interval in the 1V period, blur can be suppressed.

9. Ninth Embodiment

In the eighth embodiment described above, the control circuit 210 switches the count interval in the 1V period, but at that time, exposure control can be performed by a rolling shutter method. A solid-state imaging element 200 in the ninth embodiment is different from that in the eighth embodiment in that exposure control is performed by a rolling shutter method.

Figure 32:
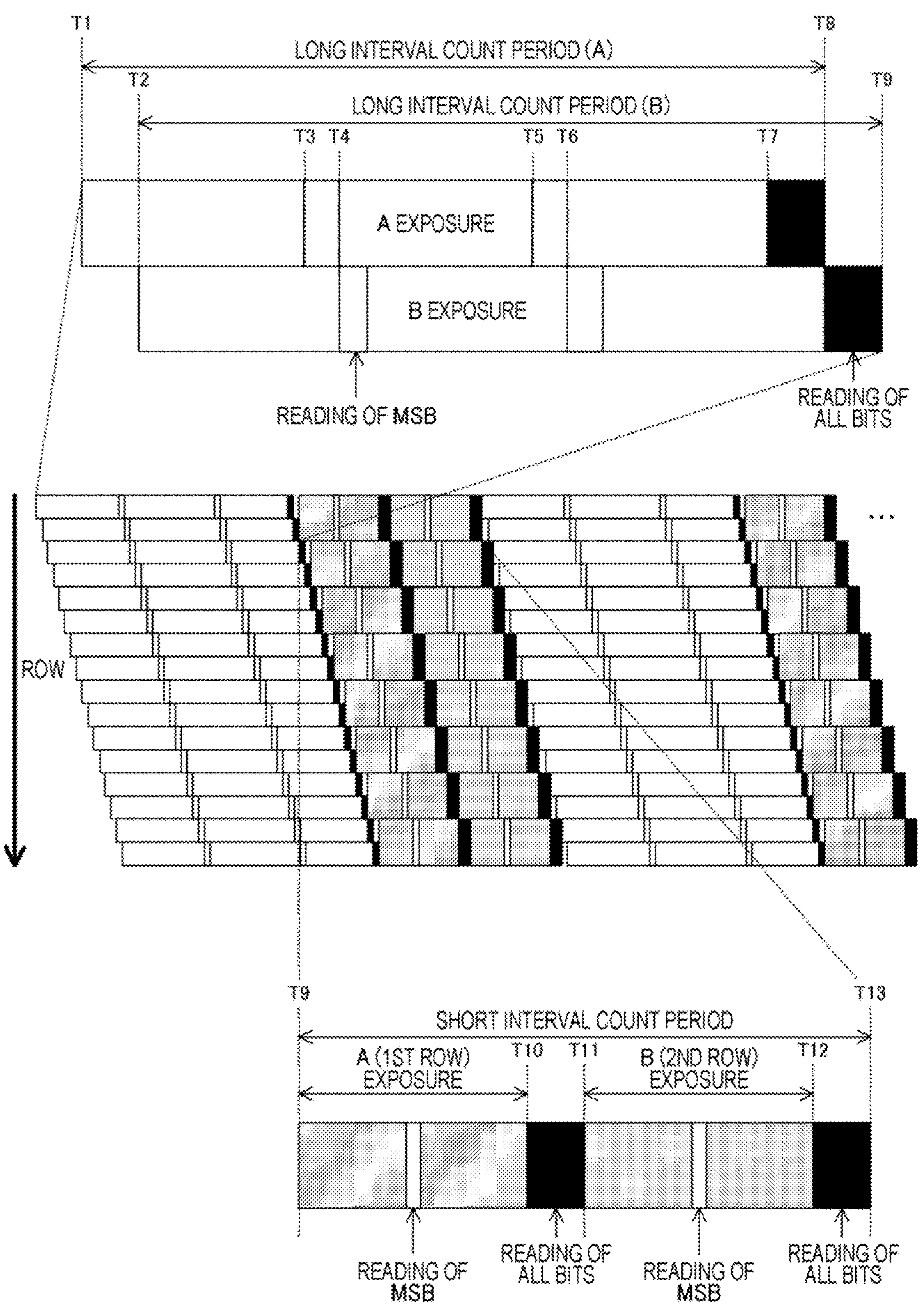
FIG. 32 is a timing chart illustrating an example of an exposure and read operation of a solid-state imaging element in a ninth embodiment of the present technology.

FIG. 32 is a timing chart illustrating an example of an exposure and read operation of the solid-state imaging element 200 in the ninth embodiment of the present technology. Two pixels sharing the counters 360 and 370 are arranged in the column direction, for example.

The control circuit 210 sequentially selects a plurality of rows in the pixel array unit 220 and resets the counter to start exposure. During exposure, the signal processing unit 230 reads only the most significant bit (MSB) of the digital signal of the selected row a predetermined number of times during exposure.

Then, the control circuit 210 sequentially selects a plurality of rows in the pixel array unit 220 and ends the exposure by stopping the counter. The signal processing unit 230 sequentially reads the digital signals of the plurality of rows. Furthermore, the control circuit 210 switches the count interval in the 1V period.

For example, in the drawing, the count interval of the first row is controlled to be a long interval in the period from timing T1 to timing T8, and the count interval of the second row is controlled to be a long interval in the period from timing T2 to timing T9 immediately after timing T1. The first row is exposed from timing T1 to timing T7. Next, the second row is exposed from timing T2 to timing T8. In this manner, a rolling shutter method is used in which exposure is sequentially performed in units of rows.

The MSB of the first row is read at timings T3 to T4 and timings T5 to T6 during exposure. The MSB of the second row is read in a predetermined period from timing T4 and in a predetermined period from timing T6. All the bits of the digital signals of the first row are read in the period from timing T7 to timing T8, and all the bits of the digital signals of the second row are read in the period from timing T8 to timing T9.

Then, at timing T9, the control circuit 210 switches the counter intervals of the first row and the second row to a short interval. The pixel A (in other words, the first row) is exposed in a period from timing T9 to timing T10, and all bits of the row are read in a period from timing T10 to timing T11. Furthermore, the MSB of the first row is read during exposure. The pixel B (in other words, the second row) is exposed in the period from timing T11 to timing T12, and all bits of the row are read in the period from timing T12 to timing T13. Furthermore, during exposure, the MSB of the second row is read a predetermined number of times.

The signal processing unit 230 acquires, as high-order bits, a bit string indicating the number of times (that is, the number of times of overflow) the MSB has changed from "1" to "0" on the basis of each read MSB. Then, the signal processing unit 230 acquires a digital signal including upper bits and lower bits for each pixel using the bit string acquired by reading all bits as lower bits. Therefore, the bit depth of the digital signal can be extended.

As illustrated in the drawing, by performing exposure control by the rolling shutter method, the frame rate can be improved as compared with the case of the global shutter method to be described later.

Note that, each of the fourth, fifth, and seventh embodiments may be applied to the ninth embodiment. Furthermore, the modification of the sixth embodiment can be applied to the ninth embodiment.

As described above, according to the ninth embodiment of the present technology, since the control circuit 210 performs exposure control by the rolling shutter method, the frame rate can be improved as compared with the case of the global shutter method.

10. Tenth Embodiment

In the ninth embodiment described above, the control circuit 210 performs exposure control by the rolling shutter method, but in this control, rolling shutter distortion may occur. A solid-state imaging element 200 according to a tenth embodiment is different from that of the ninth embodiment in that exposure is controlled by a global shutter method.

Figure 33:
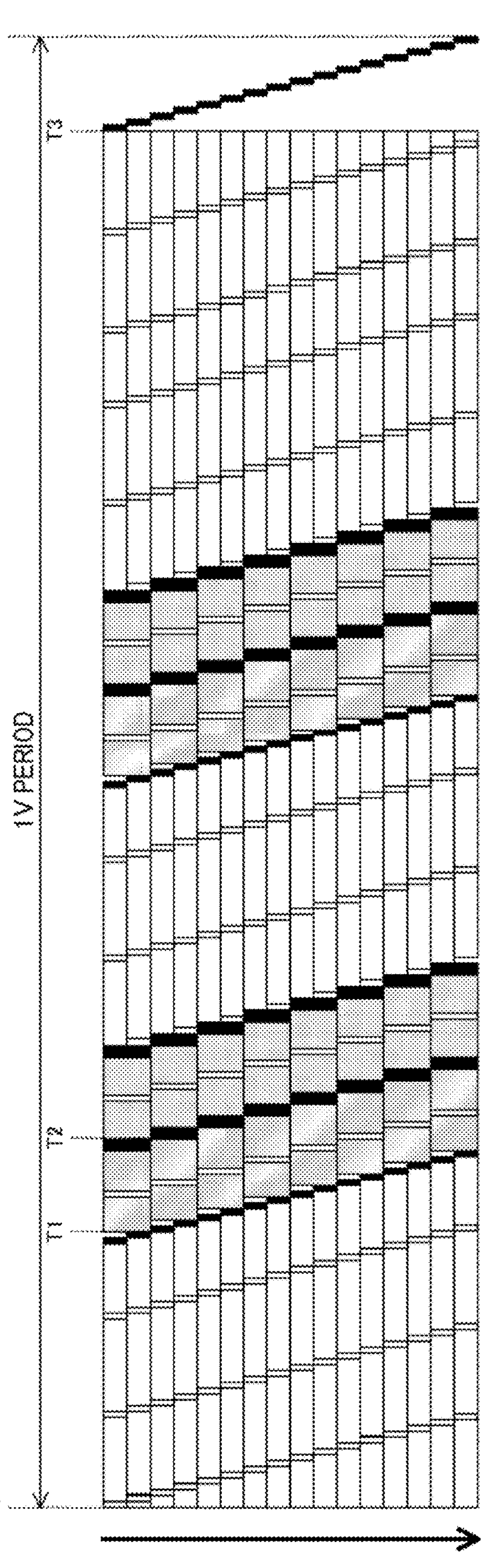
FIG. 33 is a timing chart illustrating an example of an exposure and read operation of a solid-state imaging element in a tenth embodiment of the present technology.

FIG. 33 is a timing chart illustrating an example of an exposure and read operation of the solid-state imaging element 200 in the tenth embodiment of the present technology.

At timing TO of the start of the 1V period, the control circuit 210 simultaneously selects all rows (that is, all pixels) and starts exposure. Then, at timing T3 immediately before the end of the 1V period, the control circuit 210 simultaneously selects all the rows and ends the exposure. Between timing T3 and the end of the 1V period, the signal processing unit 230 sequentially reads all bits of the digital signals of each of the plurality of rows.

Furthermore, the control circuit 210 switches the count interval in the 1V period. At the time of switching, the control circuit 210 performs exposure control by a rolling shutter method. For example, the count interval is switched to a short interval at timing T1, and the rows including the pixels A are sequentially exposed. After timing T2, the rows including the pixels B are sequentially exposed.

Furthermore, during exposure, the signal processing unit 230 sequentially reads the MSB of each row over a predetermined number of times. At the end of the exposure, the signal processing unit 230 sequentially reads the digital signals of each row.

As illustrated in the drawing, since exposure control is performed by the global shutter method at the start and end of the 1V period, rolling shutter distortion is suppressed.

Note that, each of the fourth, fifth, and seventh embodiments may be applied to the tenth embodiment. Furthermore, the modification of the sixth embodiment can be applied to the tenth embodiment.

As described above, according to the tenth embodiment of the present technology, since the control circuit 210 performs exposure control by the global shutter method at the start and end of the 1V period, it is possible to suppress rolling shutter distortion.

11. Eleventh Embodiment

In the tenth embodiment described above, the control circuit 210 performs exposure control by the rolling shutter method in the middle of the 1V period, but in this control, rolling shutter distortion may occur. A solid-state imaging element 200 according to an eleventh embodiment is different from that of the tenth embodiment in that exposure control is performed by a global shutter method even in a 1V period.

Figure 34:
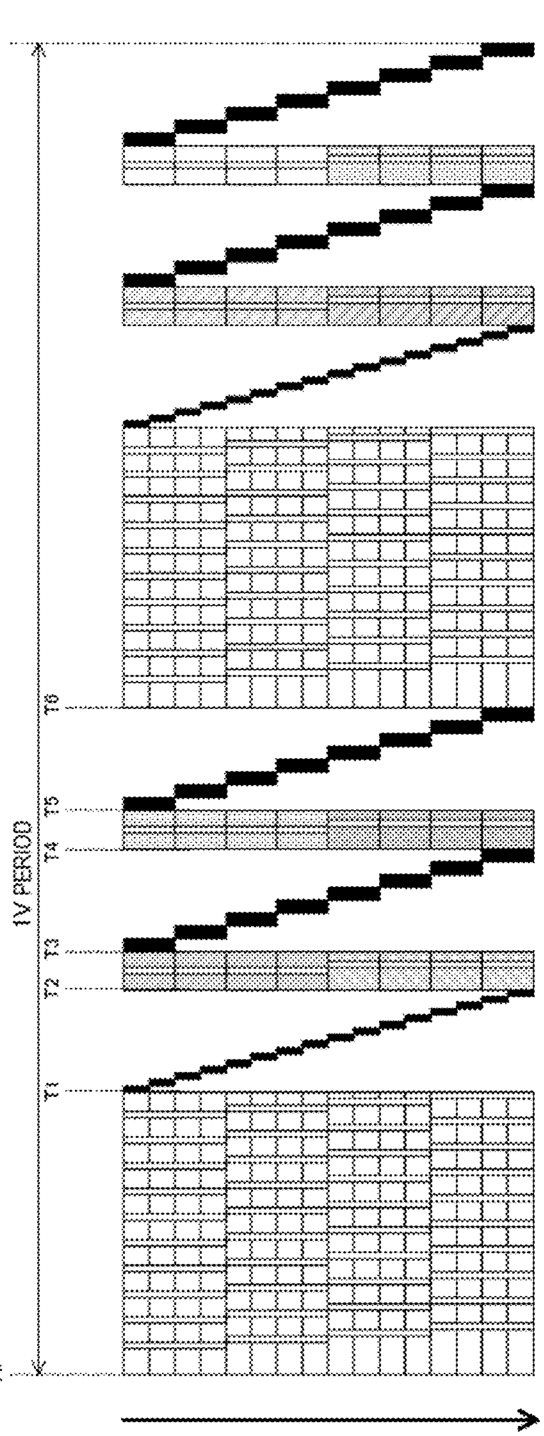
FIG. 34 is a timing chart illustrating an example of an exposure and read operation of a solid-state imaging element in an eleventh embodiment of the present technology.

FIG. 34 is a timing chart illustrating an example of an exposure and read operation of the solid-state imaging element 200 in the eleventh embodiment of the present technology.

At timing TO of the start of the 1V period, the control circuit 210 simultaneously selects all rows (all pixels) and causes the exposure to start, and simultaneously selects all pixels and causes the exposure to end at timing T1 in the 1V period. During this exposure, the signal processing unit 230 sequentially reads the MSB of each row over a predetermined number of times. Then, between timing T1 and timing T2, the signal processing unit 230 sequentially reads the digital signals of each row.

The control circuit 210 switches the count interval to a short interval at timing T2, selects all the rows including the pixels A (that is, odd-numbered rows), and simultaneously starts the exposure, and simultaneously selects the rows and ends the exposure at timing T3. During this exposure, the signal processing unit 230 sequentially reads the MSB of each row over a predetermined number of times. Then, between timing T3 and timing T4, the signal processing unit 230 sequentially reads the digital signals of each row.

Next, the control circuit 210 selects all the rows including the pixel B (that is, even-numbered rows) at timing T4 and simultaneously starts the exposure, and simultaneously selects these rows and ends the exposure at timing T5. During this exposure, the signal processing unit 230 sequentially reads the MSB of each row over a predetermined number of times. Then, between timing T5 and timing T6, the signal processing unit 230 sequentially reads the digital signals of each row. After timing T6, similar control is repeatedly executed.

As illustrated in the drawing, since the exposure control is performed by the global shutter method even in the middle of the 1V period, the rolling shutter distortion is further suppressed.

Note that, each of the fourth, fifth, and seventh embodiments may be applied to the eleventh embodiment. Furthermore, the modification of the sixth embodiment can be applied to the eleventh embodiment.

As described above, according to the eleventh embodiment of the present technology, since the control circuit 210 performs exposure control by the global shutter method even in the middle of the 1V period, rolling shutter distortion can be further suppressed.

12. Twelfth Embodiment

In the eleventh embodiment described above, the control circuit 210 starts the next exposure after the reading of all the rows is completed, but in this configuration, it is difficult to further improve the frame rate. A solid-state imaging element 200 in a twelfth embodiment is different from that in the eleventh embodiment in that exposure and reading in a short interval count period are complementarily performed.

Figure 35:
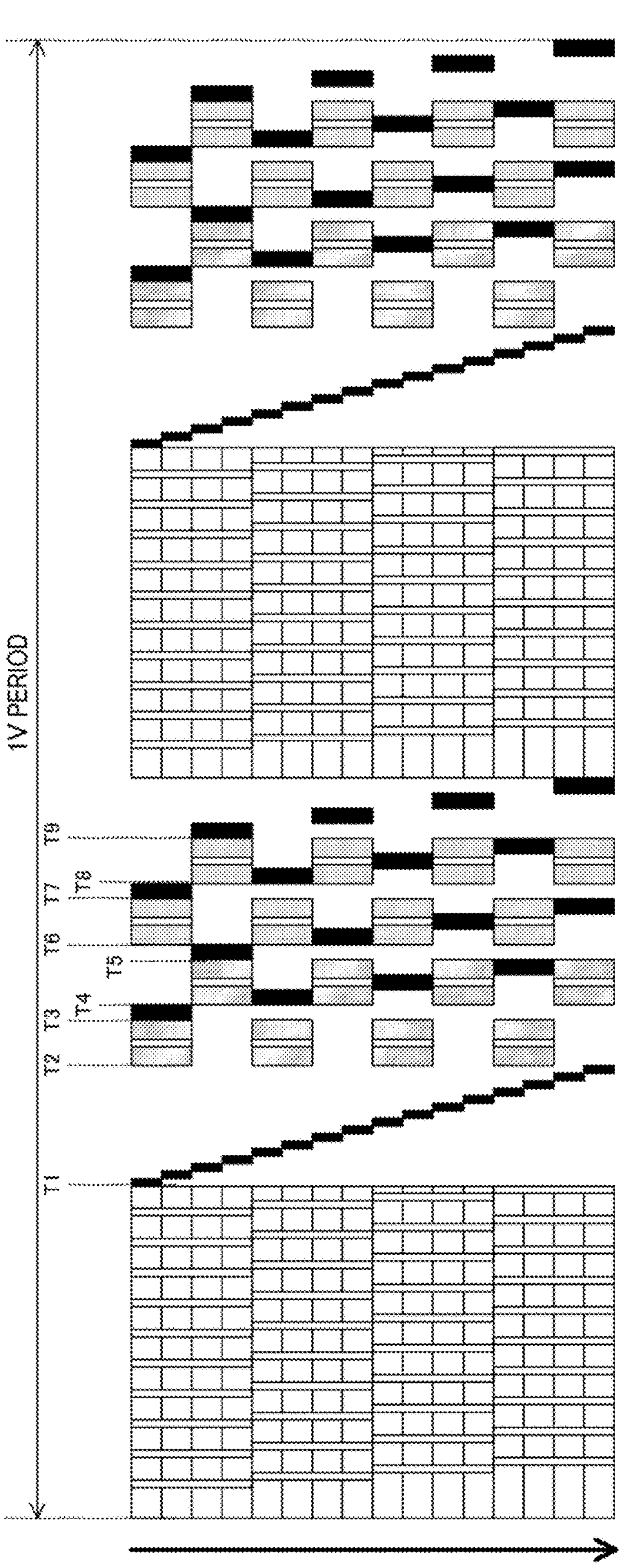
FIG. 35 is a timing chart illustrating an example of an exposure and read operation of a solid-state imaging element in a twelfth embodiment of the present technology.

FIG. 35 is a timing chart illustrating an example of an exposure and read operation of the solid-state imaging element 200 in the twelfth embodiment of the present technology.

In the twelfth embodiment, the control up to timing T2 at which the count period is switched to a short interval is similar to that in the eleventh embodiment. Here, a signal line (not illustrated) for transmitting a digital signal to the signal processing unit 230 is wired in the column direction. Furthermore, each pixel A (or pixel B) in the column that shares this signal line is exposed by half.

For example, in the period from timing T2 to timing T3, the control circuit 210 simultaneously exposes half of the pixels A. Since the pixels A are arranged in the odd-numbered rows, half of the odd-numbered rows (such as the first row and the fifth row) are exposed simultaneously. Then, in the period from timing T4 to timing T5, the control circuit 210 simultaneously exposes the remaining half (the third row, the seventh row, or the like) of the pixels A.

Next, in the period from timing T6 to timing T7, the control circuit 210 simultaneously exposes half of the pixels B. Since the pixels B are arranged in the even-numbered rows, half of the even-numbered rows (the second row, the sixth row, and the like) are exposed. Then, in the period from timing T8 to timing T9, the control circuit 210 exposes the remaining half (the fourth row, the eighth row, or the like) of the pixels B.

During these exposures, the signal processing unit 230 sequentially reads the MSB of each row over a predetermined number of times. Furthermore, in the period from timing T3 to timing T5, the signal processing unit 230 sequentially reads half of the pixels A in units of rows. The remaining half of the pixels A can be exposed in these readout periods.

Furthermore, in the period from timing T5 to timing T7, the signal processing unit 230 sequentially reads the remaining half of the pixels A in units of rows. In these readout periods, half of the pixels B can be exposed.

Then, in the period from timing T7 to timing T9, the signal processing unit 230 sequentially reads half of the pixels B in units of rows. The remaining half of the pixels B can be exposed in these readout periods. After timing T9, the signal processing unit 230 sequentially reads the remaining half of the pixels B in units of rows.

As illustrated in the drawing, the frame rate can be further improved by exposing the other half of the pixels A (or the pixels B) during the reading of the other half.

Note that, each of the fourth, fifth, and seventh embodiments may be applied to the twelfth embodiment. Furthermore, the modification of the sixth embodiment can be applied to the twelfth embodiment.

As described above, according to the twelfth embodiment of the present technology, the control circuit 210 exposes the other half of the pixels A (or the pixels B) during the reading of the other half, so that the frame rate can be further improved.

13. Thirteenth Embodiment

In the first embodiment described above, the digital signal is generated for each pixel, but in this configuration, it is difficult to further improve the sensitivity. A solid-state imaging element 200 of a thirteenth embodiment is different from that of the first embodiment in that pixel addition is performed.

Figure 36:
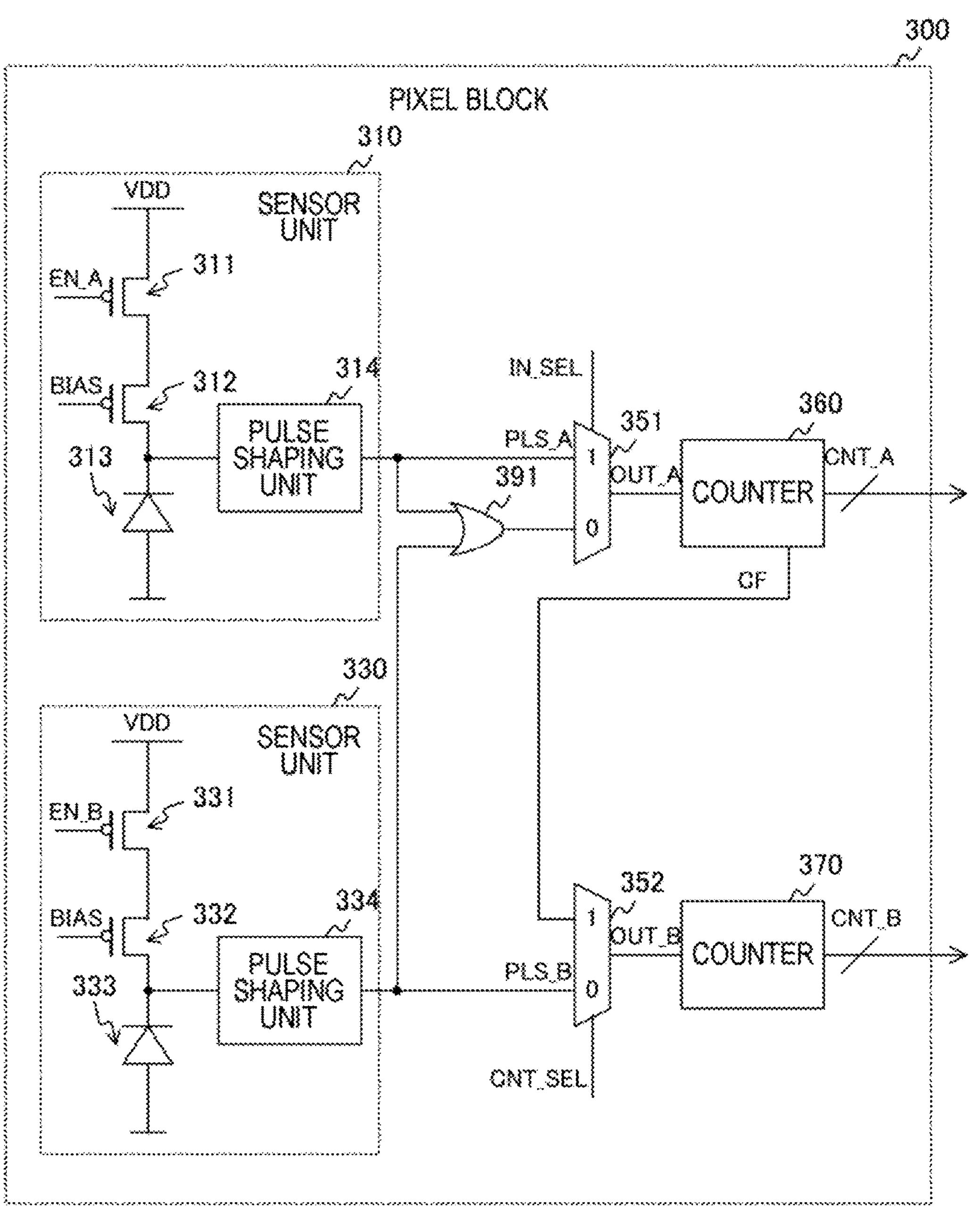
FIG. 36 is a circuit diagram illustrating a configuration example of a pixel block in a thirteenth embodiment of the present technology.

FIG. 36 is a circuit diagram illustrating a configuration example of the pixel block 300 in the thirteenth embodiment of the present technology. The pixel block 300 of the thirteenth embodiment is different from that of the first embodiment in further including a logic gate that performs a logic operation for pixel addition. In a case where the pulse signal rises in response to incidence of photons, an OR gate 391 is used as a logic gate.

The OR gate 391 outputs the logical sum of the pulse signals PLS_A and PLS_B to the multiplexer 351. Note that the logic operation on the two pulse signals is not limited to the logical sum. In a case where the pulse signal falls in response to incidence of photons, an AND (logical product) gate is inserted instead of the OR gate 391. Alternatively, the logical difference can be operated using a NOT (negation) gate instead of the OR gate 391.

Note that the OR gate 391 is an example of a first logical gate described in the claims.

FIG. 37 is a diagram illustrating an example of operation of the control circuit 210 in the thirteenth embodiment of the present technology. In the thirteenth embodiment, one of a plurality of modes including an addition mode and a non-addition mode is set. The addition mode is a mode of adding the respective pulse signals of the two pixels in the pixel block 300, and the non-addition mode is a mode of not adding the signals.

In a case where the non-addition mode is set, the control circuit 210 sets the selection signal IN_SEL to "1" and sets the selection signal CNT_SEL to "0". Therefore, the pulse signal PLS_A is selected in the pixel A, and the pulse signal PLS_B is selected in the pixel B. Furthermore, the control circuit 210 sets the enable signals EN_A and EN_B to "0" (enable).

On the other hand, in a case where the addition mode is set, the control circuit 210 sets the selection signal IN_SEL to "0" and sets the selection signal CNT_SEL to "1". Therefore, the logical sum of the pulse signals PLS_A and PLS_B is selected in the pixel A, and the carry flag is selected in the pixel B. Furthermore, the control circuit 210 sets the enable signals EN_A and EN_B to "0" (enable).

As illustrated in the drawing, by adding the pulse signals PLS_A and PLS_B in the addition mode, the number of pixels is reduced as compared with the case of non-addition, but the sensitivity can be improved.

Note that, although two pixels are added, three or more pixels may be arranged in the pixel block 300 and three or more pixels may be added as described later.

Furthermore, each of the fourth and fifth embodiments can be applied to the thirteenth embodiment. Furthermore, the modification of the sixth embodiment can be applied to the thirteenth embodiment.

As described above, according to the thirteenth embodiment of the present technology, since the pixel block 300 adds the pulse signals PLS_A and PLS_B in the addition mode, sensitivity can be improved as compared with the case of non-addition.

14. Fourteenth Embodiment

In the thirteenth embodiment described above, the count interval of the pulse signal is constant, but this count interval can be switched during imaging. A solid-state imaging element 200 according to a fourteenth embodiment is different from that of the thirteenth embodiment in that a count interval is switched during imaging.

Figure 38:
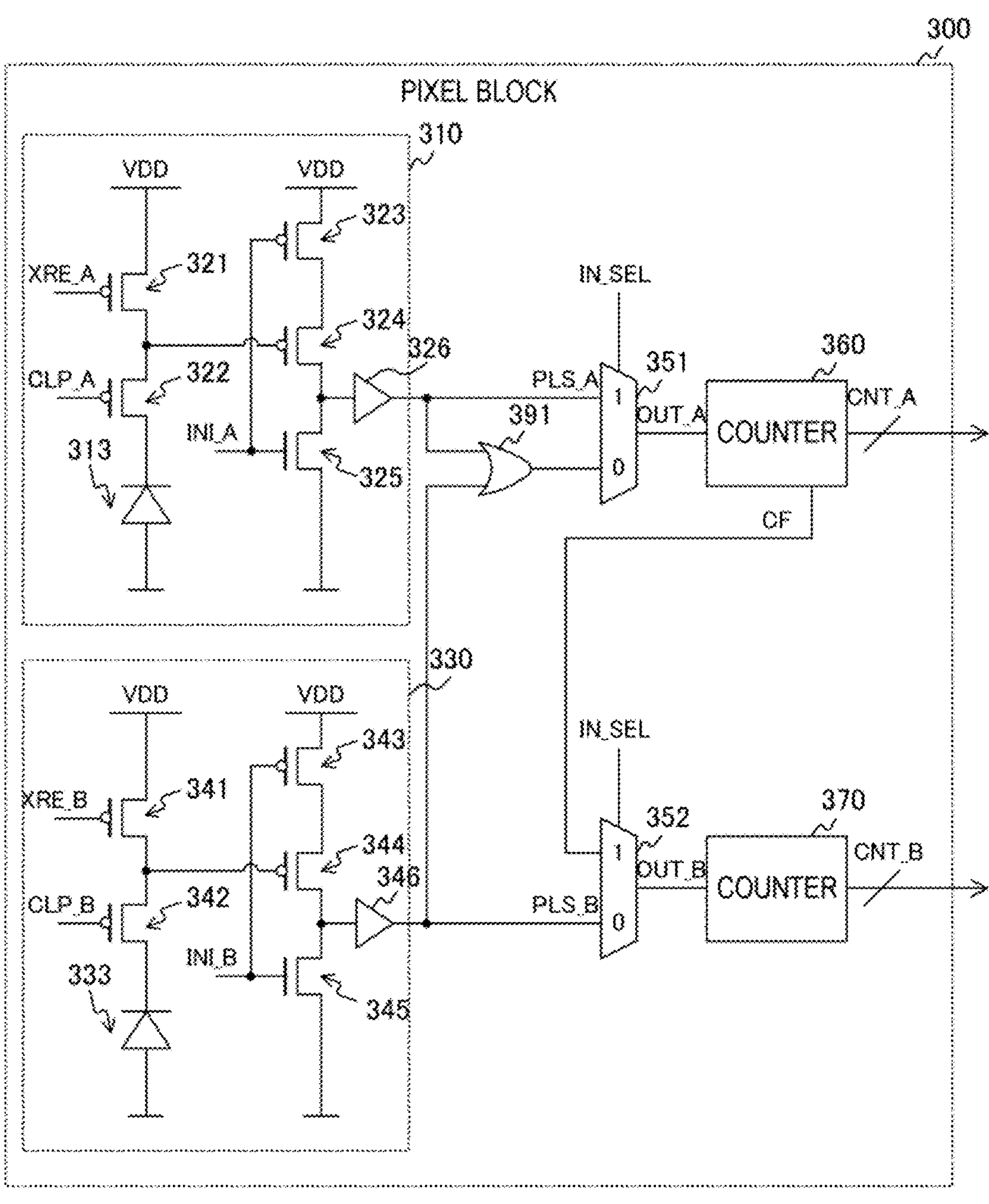
FIG. 38 is a circuit diagram illustrating a configuration example of a pixel block in a fourteenth embodiment of the present technology.

FIG. 38 is a circuit diagram illustrating a configuration example of the pixel block 300 in the fourteenth embodiment of the present technology. In the fourteenth embodiment, the sensor unit 310 includes a recharge transistor 321, a clip transistor 322, a SPAD 313, pMOS transistors 323 and 324, an nMOS transistor 325, and a buffer 326.

Furthermore, the sensor unit 330 includes a recharge transistor 341, a clip transistor 342, a SPAD 333, pMOS transistors 343 and 344, an nMOS transistor 345, and a buffer 346.

The circuit configurations of these sensor units 310 and 330 are similar to those of the sixth embodiment exemplified in FIG. 21.

Furthermore, in the fourteenth embodiment, the control circuit 210 can switch the count interval in the non-addition mode. In a case where the count interval is a short interval in the non-addition mode, the counters are connected in series similarly to the sixth embodiment, and the resolution of the counters is extended.

Figure 39:
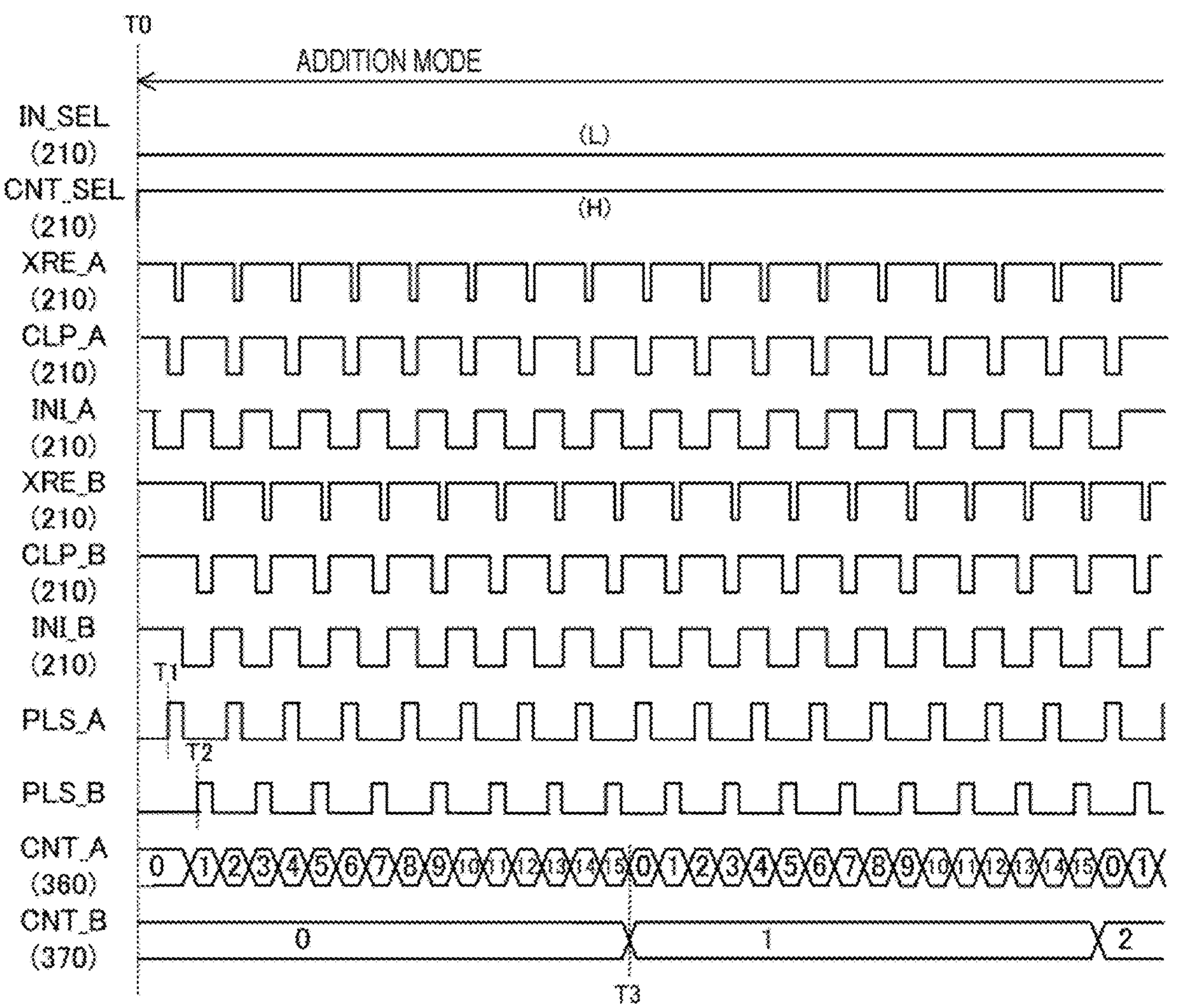
FIG. 39 is a timing chart illustrating an example of operation of a solid-state imaging element in an addition mode according to the fourteenth embodiment of the present technology.

FIG. 39 is a timing chart illustrating an example of operation of a solid-state imaging element 200 in an addition mode according to the fourteenth embodiment of the present technology.

When the addition mode is set at timing TO, the control circuit 210 sets the selection signal IN_SEL to the low level and sets the selection signal CNT_SEL to the high level. Therefore, the logical sum is selected in the pixel A, and the carry flag is selected in the pixel B.

The digital signal CNT_A counts up when the pulse signals PLS_A and PLS_B are generated at the timings T1 and T2, and the digital signal CNT_B counts up when the digital signal CNT_A is saturated at timing T3.

Note that each of the fourth, fifth, and seventh to twelfth embodiments can also be applied to the fourteenth embodiment. Furthermore, the modification of the sixth embodiment can be applied to the fourteenth embodiment.

As described above, according to the fourteenth embodiment of the present technology, since the count interval is switched in the non-addition mode, the bit depth and power consumption of the digital signal can be reduced as compared with a case where the count interval is not switched.

15. Fifteenth Embodiment

In the thirteenth embodiment described above, the solid-state imaging element 200 adds two pixels, but may add three or more pixels. A solid-state imaging element 200 of a fifteenth embodiment is different from that of the thirteenth embodiment in that four pixels are added.

Figure 40:
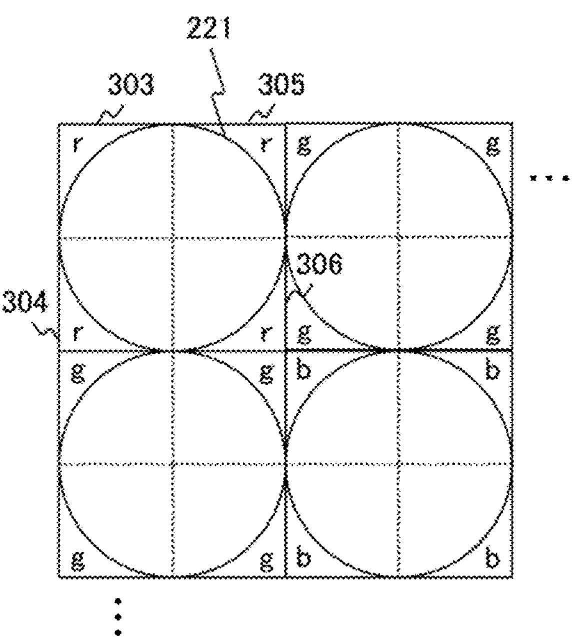
FIG. 40 is a diagram illustrating an arrangement example of each pixel in a pixel block according to a fifteenth embodiment of the present technology.

FIG. 40 is a diagram illustrating an arrangement example of pixels in the pixel block 300 in the fifteenth embodiment of the present technology. In the fifteenth embodiment, pixels are arranged in a quad Bayer array. Furthermore, for every four adjacent pixels of the same color, a microlens 221 that guides incident light to those pixels is arranged. The lower 4 pixels (r pixels 303, 304, 305, 306, etc) of the microlens 221 share a counter.

Figure 41:
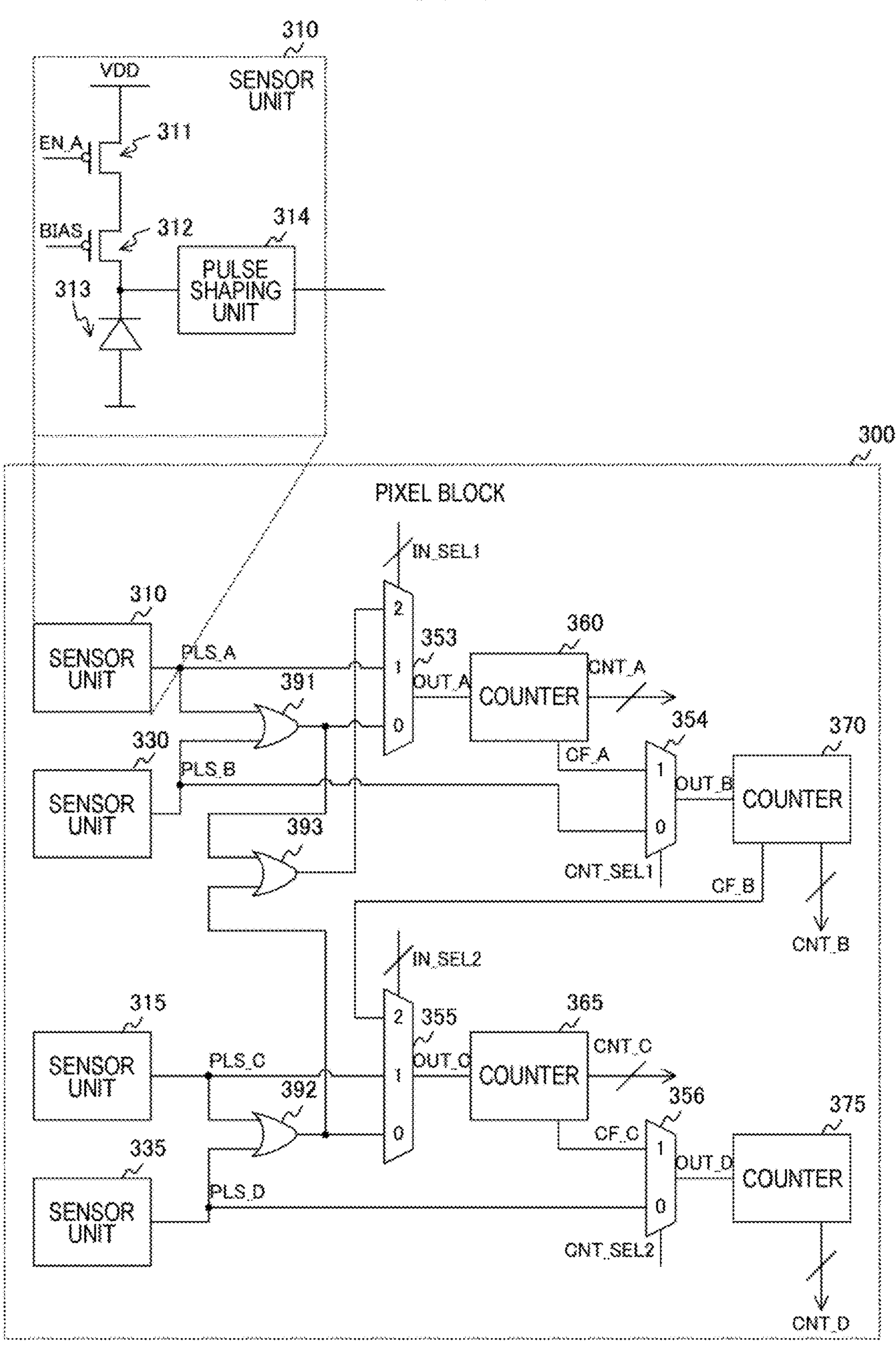
FIG. 41 is a circuit diagram illustrating a configuration example of a pixel block in the fifteenth embodiment of the present technology.

FIG. 41 is a circuit diagram illustrating a configuration example of the pixel block 300 in the fifteenth embodiment of the present technology. The pixel block 300 of the fifteenth embodiment includes multiplexers 353 to 356 instead of the multiplexers 351 and 352, and further includes sensor units 315 and 335, OR gates 392 and 393, and counters 365 and 375.

The sensor unit 315 generates a pulse signal PLS_C in response to incidence of photons. The sensor unit 335 generates a pulse signal PLS_D in response to incidence of photons. The circuit configuration of these sensor units is similar to that of the sensor unit 310. Note that the sensor units 315 and 335 are examples of third and fourth sensor units described in the claims.

The OR gate 392 outputs the logical sum of the pulse signals PLS_C and PLC_D to the multiplexer 355 and the OR gate 393. The OR gate 393 outputs the logical sum of the outputs of the OR gates 391 and 392 to the multiplexer 353. Note that the logic operation on the two pulse signals is not limited to the logical sum. In a case where the pulse signal falls in response to incidence of photons, AND gates are inserted instead of the OR gates 391 to 393. Alternatively, the logical difference can be operated using a NOT (negation) gate instead of the OR gate.

Note that the OR gates 392 and 393 are an example of second and third logical gates described in the claims.

The multiplexer 353 selects one of the logical sum of the OR gate 393, the pulse signal PLS_A, and the logical sum of the OR gate 391 according to the selection signal IN_SEL1 from the control circuit 210, and outputs the selected one to the counter 360 as the output signal OUT_A. For example, the logical sum of the OR gate 393 is selected in a case where the selection signal IN_SEL1 is "2", the pulse signal PLS_A is selected in a case where the selection signal IN_SEL1 is "1", and the logical sum of the OR gate 391 is selected in a case where the selection signal IN_SEL1 is "0". Note that the multiplexer 353 is an example of a first multiplexer described in the claims.

Furthermore, the counter 360 according to the fifteenth embodiment supplies the carry flag to the multiplexer 354 as CF_A.

The multiplexer 354 selects either the carry flag CF_A or the pulse signal PLS_B according to the selection signal CNT_SEL1 from the control circuit 210, and outputs the selected one to the counter 370 as the output signal OUT_B. For example, in a case where the selection signal CNT_SEL1 is "1", the carry flag CF_A is selected, and in a case where the selection signal CNT_SEL1 is "0", the pulse signal PLS_B is selected. Note that the multiplexer 354 is an example of a second multiplexer described in the claims.

Furthermore, the counter 370 according to the fifteenth embodiment further generates a carry flag and supplies the carry flag as CF_B to the multiplexer 355.

The multiplexer 355 selects one of the carry flag CF_B, the pulse signal PLS_C, and the logical sum of the OR gate 392 according to a selection signal IN_SEL2 from the control circuit 210, and outputs the selected one to the counter 365 as the output signal OUT_C. For example, the carry flag CF_B is selected in a case where the selection signal IN_SEL2 is "2", the pulse signal PLS_C is selected in a case where the selection signal IN_SEL2 is "1", and the logical sum of the OR gate 392 is selected in a case where the selection signal IN_SEL2 is "0". Note that the multiplexer 355 is an example of a third multiplexer described in the claims.

The counter 365 counts a count value in synchronization with the output signal OUT_C and outputs a digital signal CNT_C indicating the count value to the signal processing unit 230. Furthermore, the counter 365 generates a carry flag CF_C indicating whether or not overflow has occurred, and outputs the carry flag CF_C to the multiplexer 356. Note that the counter 365 is an example of a third counter described in the claims.

The multiplexer 356 selects either the carry flag CF_C or the pulse signal PLS_D according to the selection signal CNT_SEL2 from the control circuit 210, and outputs the selected one to the counter 375 as the output signal OUT_D. For example, in a case where the selection signal CNT_SEL2 is "1", the carry flag CF_C is selected, and in a case where the selection signal CNT_SEL2 is "0", the pulse signal PLS_D is selected. Note that the multiplexer 356 is an example of a fourth multiplexer described in the claims.

The counter 375 counts a count value in synchronization with the output signal OUT_D and outputs a digital signal CNT_D indicating the count value to the signal processing unit 230. Note that the counter 375 is an example of a fourth counter described in the claims.

The pixel block 300 in the drawing functions as the r pixels 303 to 306 illustrated in FIG. 40.

FIG. 42 is a diagram illustrating an example of operation of the control circuit 210 in the fifteenth embodiment of the present technology. In the fifteenth embodiment, one of a plurality of modes including a non-addition mode, a 2-pixel addition mode, and a 4-pixel addition mode is set. The 2-pixel addition mode is a mode for adding two pixels at a time among the four pixels in the pixel block 300, and the 4-pixel addition mode is a mode for adding all the four pixels. The non-addition mode is a mode in which each pixel is not added. Note that one of the 2-pixel addition mode and the 4-pixel addition mode, and the addition mode may be switched.

In a case where the non-addition mode is set, the control circuit 210 sets the selection signal IN_SEL1 to "1", sets the selection signal CNT_SEL1 to "0", sets the selection signal IN_SEL2 to "1", and sets the selection signal CNT_SEL2 to "0". Therefore, the pulse signal PLS_A is selected in the multiplexer 353, the pulse signal PLS_B is selected in the multiplexer 354, the pulse signal PLS_C is selected in the multiplexer 355, and the pulse signal PLS_D is selected in the multiplexer 356. Furthermore, the control circuit 210 sets the enable signals of all the pixels to "0" (enable).

Furthermore, in a case where the 2-pixel addition mode is set, the control circuit 210 sets the selection signal IN_SEL1 to "0", sets the selection signal CNT_SEL1 to "1", sets the selection signal IN_SEL2 to "0", and sets the selection signal CNT_SEL2 to "1". Therefore, the logical sum of the pulse signals PLS_A and PLS_B is selected in the multiplexer 353, and the carry flag CF_A is selected in the multiplexer 354. The logical sum of the pulse signals PLS_C and PLS_D is selected in the multiplexer 355, and the carry flag CF_C is selected in the multiplexer 356. Furthermore, the control circuit 210 sets the enable signals of all the pixels to "0" (enable).

Furthermore, in a case where the 4-pixel addition mode is set, the control circuit 210 sets the selection signal IN_SEL1 to "2", sets the selection signal CNT_SEL1 to "1", sets the selection signal IN_SEL2 to "2", and sets the selection signal CNT_SEL2 to "1". Therefore, the logical sum of the pulse signals PLS_A, PLS_B, PLS_C, and PLS_D is selected in the multiplexer 353, and the carry flag CF_A is selected in the multiplexer 354. The carry flag CF_B is selected in the multiplexer 355, and the carry flag CF_C is selected in the multiplexer 356. Furthermore, the control circuit 210 sets the enable signals of all the pixels to "0" (enable).

In the 2-pixel addition mode, a circuit (such as the signal processing unit 230) at the subsequent stage to the pixel detects, as a phase difference, a distance between respective peaks of an image in which pixel signals on the left side (or upper side) of each of the microlenses 221 are arranged and an image in which pixel signals on the right side (or lower side) of each of the microlenses are arranged. A focus lens (not illustrated) is driven according to the phase difference. Therefore, image plane phase difference AF can be realized.

As described above, according to the fifteenth embodiment of the present technology, since the pixel block 300 adds the pulse signals PLS_A, PLS_B, PLS_C, and PLS_D in the 4-pixel addition mode, the sensitivity can be further improved.

16. Sixteenth Embodiment

In the thirteenth embodiment described above, the resolution of the counter is made constant in the non-addition mode, but in this configuration, the resolution of the counter may be insufficient in the case of high illuminance. A solid-state imaging element 200 according to a sixteenth embodiment is different from that of the thirteenth embodiment in that the resolution of the counter is extended at high illuminance in the non-addition mode.

The circuit configuration of the pixel block 300 in the sixteenth embodiment is similar to that of the thirteenth embodiment illustrated in FIG. 36.

FIG. 43 is a diagram illustrating an example of operation of the control circuit 210 in the thirteenth embodiment of the present technology. In the thirteenth embodiment, one of a plurality of modes including a non-addition low illuminance mode, a non-addition high illuminance mode, and an addition mode is set. The addition mode is a mode for adding the respective pulse signals of the two pixels in the pixel block 300, and the non-addition low illuminance mode and the non-addition high illuminance mode are modes for not adding the signals. Furthermore, the non-addition low illuminance mode is a mode set at low illuminance when the illuminance is equal to or less than a predetermined value, and the non-addition high illuminance mode is a mode set at high illuminance when the illuminance is higher than the predetermined value.

The control contents of the non-addition low illuminance mode of the sixteenth embodiment are similar to the control contents of the low illuminance mode of the first embodiment illustrated in FIG. 5. The control contents of the non-addition high illuminance mode of the sixteenth embodiment are similar to the control contents of the high illuminance mode of the first embodiment illustrated in FIG. 5. The control contents of the addition mode of the sixteenth embodiment are similar to the control contents of the addition mode of the thirteenth embodiment illustrated in FIG. 36.

As described above, according to the sixteenth embodiment of the present technology, since the resolution of the counter is extended at high illuminance in the non-addition mode, the dynamic range can be extended at high illuminance.

17. Seventeenth Embodiment

In the first embodiment described above, the circuits in the solid-state imaging element 200 are arranged on a single semiconductor chip, but in this configuration, it is difficult to reduce the circuit scale for each chip. A solid-state imaging element 200 in a seventeenth embodiment is different from that in the first embodiment in that circuits are dispersedly arranged on two stacked chips.

Figure 44:
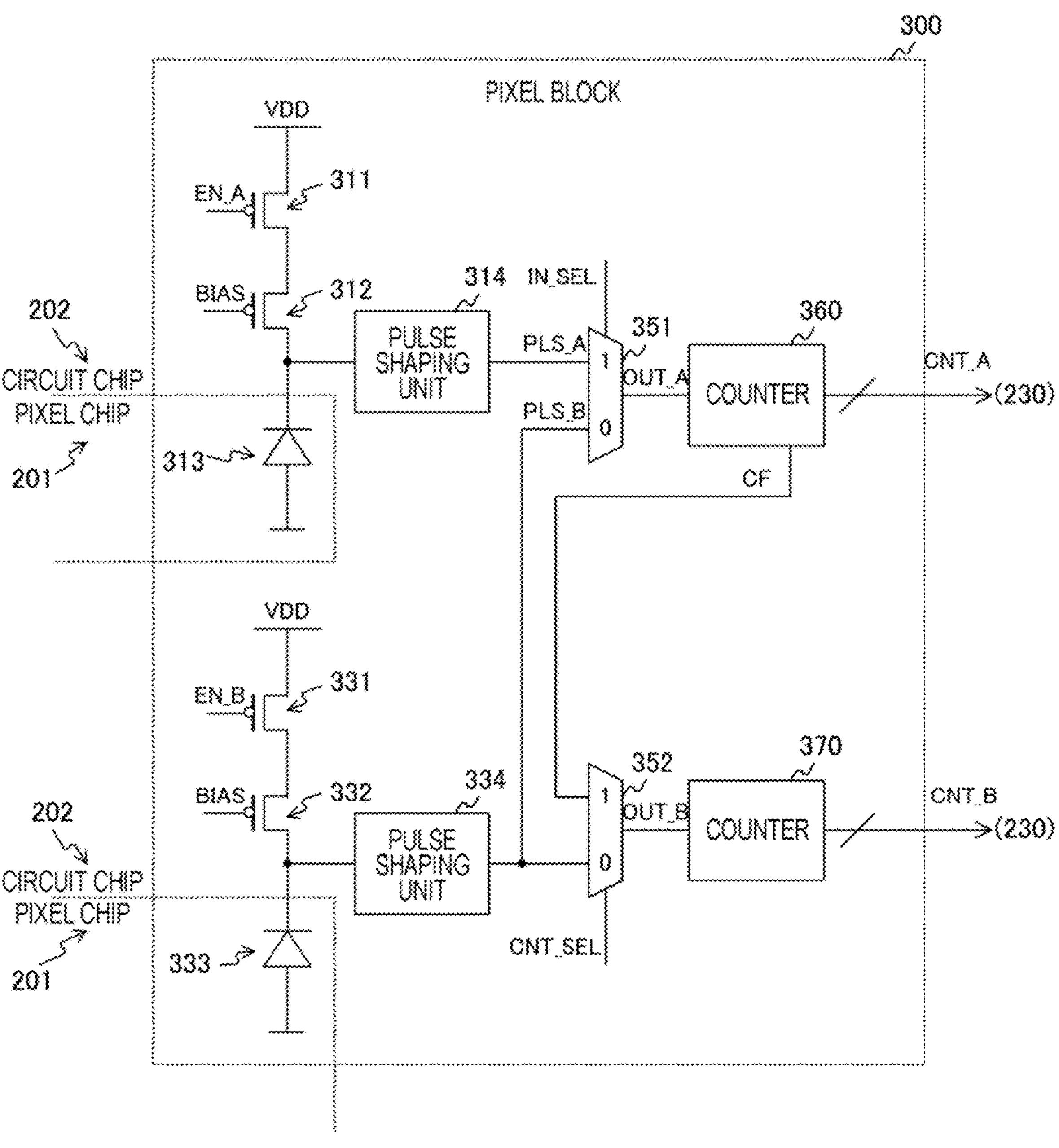
FIG. 44 is a circuit diagram illustrating a configuration example of a pixel block in a seventeenth embodiment of the present technology.

FIG. 44 is a circuit diagram illustrating a configuration example of the pixel block 300 in the seventeenth embodiment of the present technology. The solid-state imaging element 200 according to the seventeenth embodiment includes a pixel chip 201 and a circuit chip 202 that are stacked. Those chips are electrically connected via a connection portion such as a via. Note that the connection can also be made by a Cu—Cu bonding or a bump other than the via. The connection can also be made by schemes (such as magnetic coupling) other than these. Furthermore, although the two chips are stacked, three or more layers can be stacked.

The SPADs 313 and 333 are arranged on the pixel chip 201, and the remaining circuits and elements are arranged on the circuit chip 202.

As illustrated in the drawing, by adopting the stacked structure, the circuit scale for each chip can be reduced, and the number of pixels can be easily increased.

Note that each of the second to sixteenth embodiments can be applied to the seventeenth embodiment.

Figure 45:
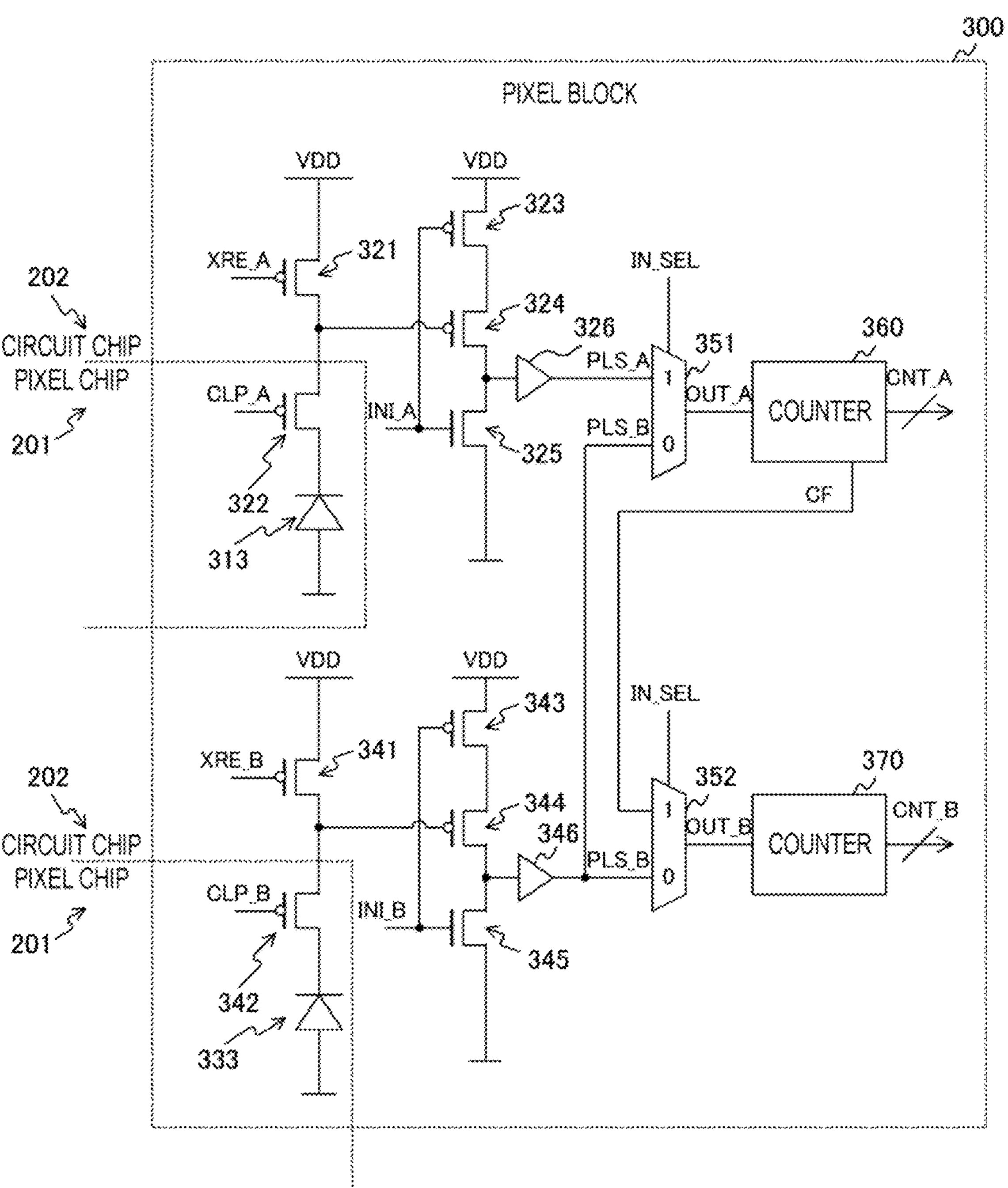
FIG. 45 is a circuit diagram illustrating another example of a pixel block in the seventeenth embodiment of the present technology.

In a case where the circuit illustrated in FIG. 21 has a stacked structure, the clip transistors 322 and 342 are arranged in the pixel chip 201 as illustrated in FIG. 45.

As described above, according to the seventeenth embodiment of the present technology, the number of pixels can be easily increased due to the stacked structure.

18. Eighteenth Embodiment

In the first embodiment described above, the control circuit 210 causes all the pixels in the pixel array unit 220 to output the pulse signal, but in this configuration, it is difficult to reduce the read time and the data amount. A solid-state imaging element 200 according to an eighteenth embodiment is different from that of the first embodiment in that a control circuit 210 causes some pixels in a pixel array unit 220 to output a pulse signal.

Figure 46:
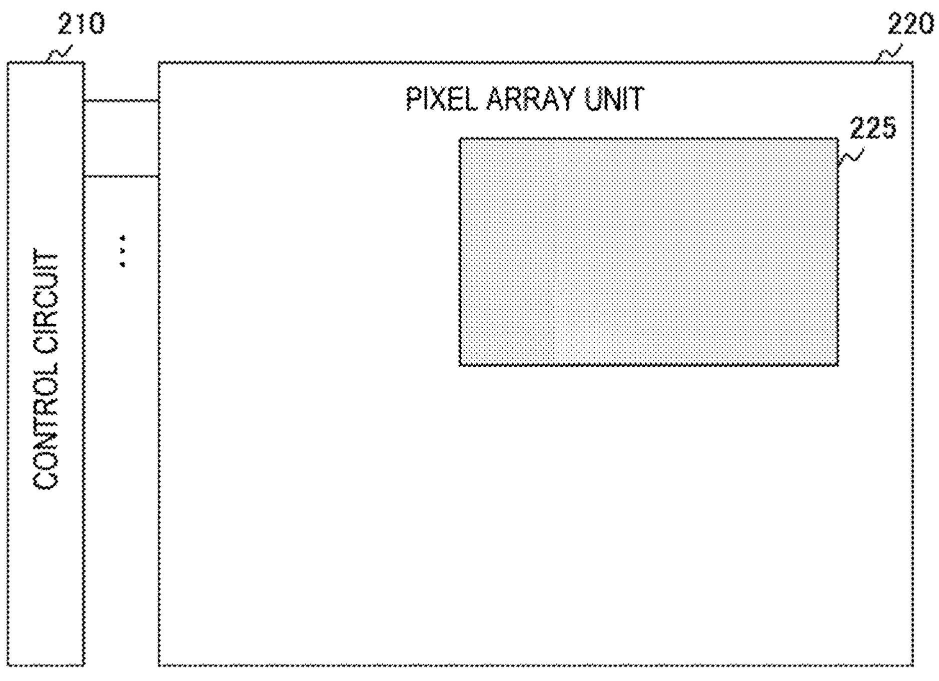
FIG. 46 is a diagram illustrating an example of a region to be controlled according to an eighteenth embodiment of the present technology.

FIG. 46 is a diagram illustrating an example of a region to be controlled according to the eighteenth embodiment of the present technology. In the pixel array unit 220, a region 225 such as a region of interest (ROI) is set as a control target. For example, the region 225 is set by a user's operation or execution of various applications.

The control circuit 210 sets a pixel in the region 225 to be valid among all the pixels by an enable signal and outputs a pulse signal. Therefore, the time required for reading and the amount of data to be read can be reduced as compared with the case of controlling all the pixels.

Note that each of the second to seventeenth embodiments can be applied to the eighteenth embodiment.

As described above, according to the eighteenth embodiment of the present technology, since the control circuit 210 causes some pixels to output pulse signals, it is possible to reduce the reading time and the data amount.

19. Application Example to Mobile Body

The technology according to the present disclosure (present technology) can be applied to various products. For example, the technology of the present disclosure may be achieved in the form of a device to be mounted on a mobile body of any kind, such as an automobile, an electric vehicle, a hybrid electric vehicle, a motorcycle, a bicycle, a personal mobility, an airplane, a drone, a vessel, or a robot.

Figure 47:
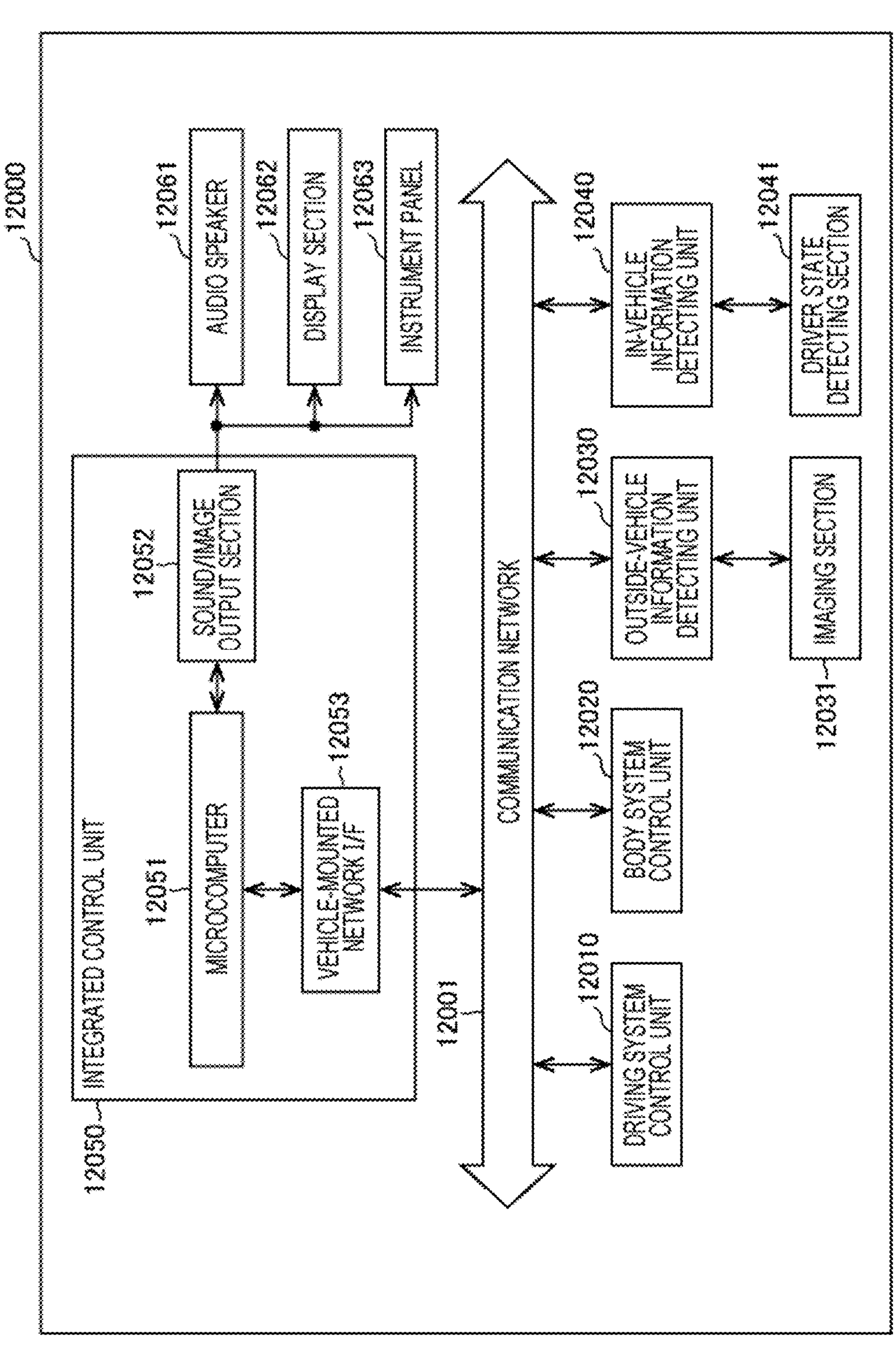
FIG. 47 is a block diagram illustrating an example of schematic configuration of a vehicle control system.

FIG. 47 is a block diagram illustrating an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 47, the vehicle control system 12000 includes a driving system control unit 12010, a body system control unit 12020, an outside-vehicle information detecting unit 12030, an in-vehicle information detecting unit 12040, and an integrated control unit 12050. Furthermore, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

Furthermore, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 47, an audio speaker 12061, a display section 12062, and an instrument panel 12063 are illustrated as the output device. The display section 12062 may, for example, include at least one of an on-board display and a head-up display.

Figure 48:
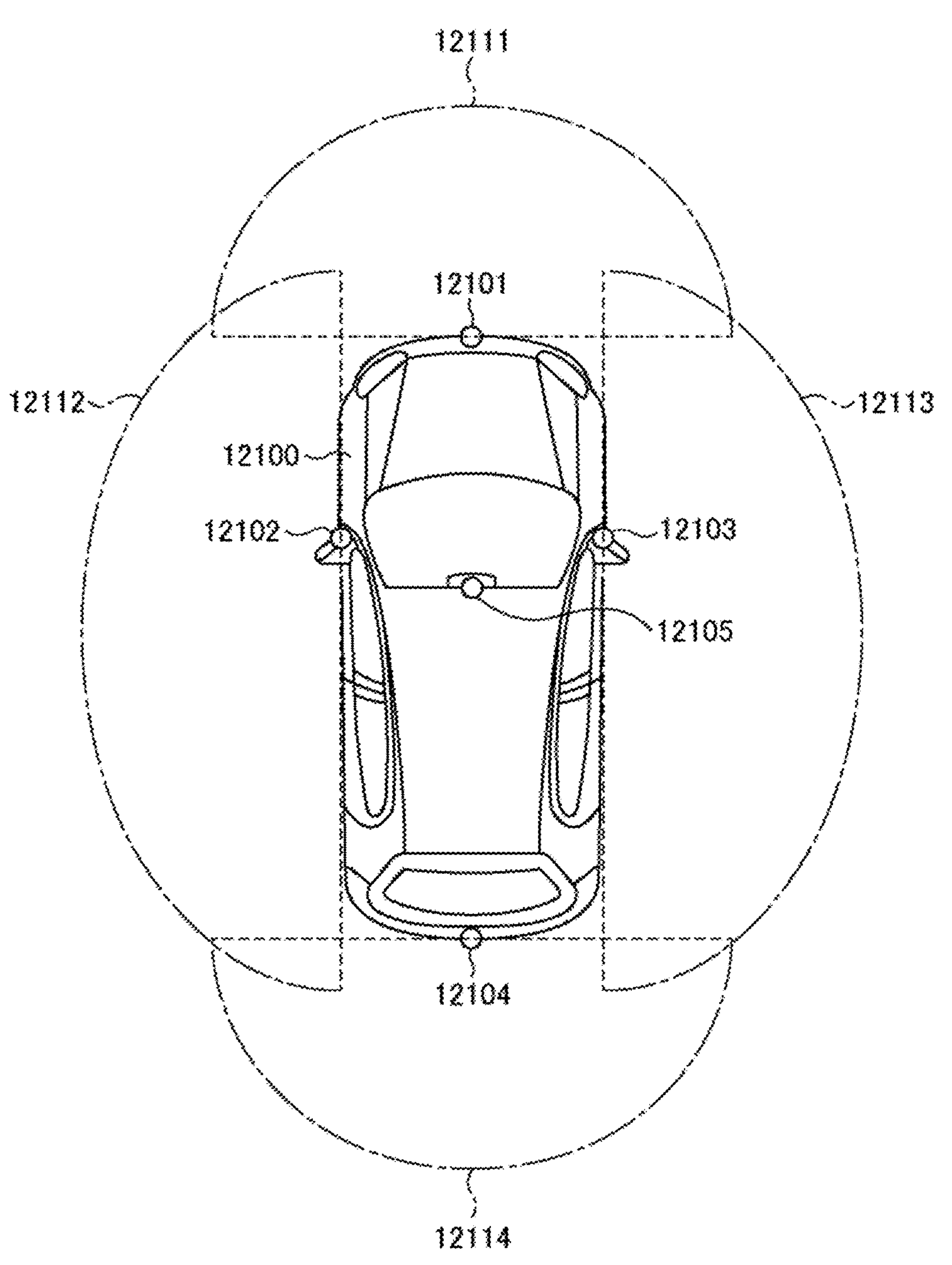
FIG. 48 is an explanatory diagram illustrating an example of an installation position of an imaging section.

FIG. 48 is a diagram illustrating an example of the installation position of the imaging section 12031.

In FIG. 48, the imaging section 12031 includes imaging sections 12101, 12102, 12103, 12104, and 12105.

The imaging sections 12101, 12102, 12103, 12104, 12105 are provided, for example, at positions such as a front nose, a sideview mirror, a rear bumper, a back door, and an upper portion of a windshield in the interior of a vehicle 12100. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Note that FIG. 47 depicts an example of imaging ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure can be applied has been described above. The technology according to the present disclosure can be applied, for example, to the imaging section 12031 among the configurations described above. Specifically, the imaging device 100 in FIG. 1 can be applied to the imaging section 12031. By applying the technology of the present disclosure to the imaging section 12031, a more easily viewable captured image can be obtained, by which fatigue of the driver can be reduced.

Note that the embodiments described above show examples for embodying the present technology, and the matters in the embodiments and the matters specifying the invention in the claims have correspondence relationships. Similarly, the matters specifying the invention in the claims and matters with the same names in the embodiments of the present technology have correspondence relationships. However, the present technology is not limited to the embodiments, and can be embodied by applying various modifications to the embodiments without departing from the scope of the present technology.

Note that advantageous effects described in the present description are merely examples and are not limited, and other advantageous effects may be provided.

Note that the present technology may also have the following configurations.

(1) A photodetection device including:

a first sensor unit that generates a first pulse signal in response to incidence of photons;

a second sensor unit that generates a second pulse signal in response to incidence of photons;

a first counter that counts a count value in synchronization with one of a plurality of signals including the first and second pulse signals, and outputs a first digital signal indicating the count value and a first carry flag indicating whether or not overflow has occurred; and a second counter that counts a count value in synchronization with one of the first carry flag and the second pulse signal and outputs a second digital signal indicating the count value.

(2) The photodetection device according to (1), further including: a first multiplexer that selects one of the first and second pulse signals and outputs a selected signal to the first counter as a first output signal; and a second multiplexer that selects one of the first carry flag and the second pulse signal and outputs a selected one to the second counter as a second output signal, in which the first counter counts in synchronization with the first output signal, and the second counter counts in synchronization with the second output signal.

(3) The photodetection device according to (2), in which the first multiplexer selects the first pulse signal in a case where a low illuminance mode in which illuminance does not exceed a predetermined value is set, and alternately selects the first and second pulse signals in a case where a high illuminance mode in which illuminance is higher than the predetermined value is set, and the second multiplexer selects the second pulse signal in a case where the low illuminance mode is set, and selects the first carry flag in a case where the high illuminance mode is set.

(4) The photodetection device according to (3), further including:

a determiner that determines whether or not illuminance is higher than the predetermined value on the basis of the first and second digital signals and sets one of the high illuminance mode and the low illuminance mode.

(5) The photodetection device according to (4), in which at least one of the first and second counters outputs a specific bit of a digital signal to the determiner, and the determiner sets one of the high illuminance mode and the low illuminance mode on the basis of the specific bit.

(6) The photodetection device according to any one of (1) to (5), in which the first sensor unit is arranged in one of first and second pixels of a same color among a plurality of pixels arranged in a pixel array unit, and the second sensor unit is arranged in another pixel.

(7) The photodetection device according to (6), further including:

a microlens that guides incident light to a plurality of pixels of a same color including the first and second pixels.

(8) The photodetection device according to (2), further including:

a control circuit that controls the first and second sensor units, in which each of the first and second sensor units includes:

an avalanche photodiode; and a recharge transistor that performs recharge to return a cathode potential of the avalanche photodiode to a predetermined potential, the control circuit controls a count interval, which is an interval at which the recharge is performed, to one of a plurality of intervals, the first multiplexer selects the first pulse signal in a case where the count interval is a long interval longer than a predetermined interval, and alternately selects the first and second pulse signals in a case where the count interval is a short interval shorter than the predetermined interval, and the second multiplexer selects the second pulse signal in a case where the count interval is the long interval, and selects the first carry flag in a case where the count interval is the short interval.

(9) The photodetection device according to (8), further including:

a determiner that determines, on the basis of the first and second digital signals, whether or not counting of each of the first and second counters is set to be valid in a period in which a count interval is one of the long interval and the short interval, in which each of the first and second sensor units further includes a logic gate that turns off the recharge transistor in a case where it is determined to set counting to be invalid.

(10) The photodetection device according to (8) or (9), in which the first sensor unit is arranged in one of a first pixel and a second pixel among a plurality of pixels arranged in a pixel array unit, and the second sensor unit is arranged in another pixel, the control circuit switches the count interval a plurality of times in a frame period for imaging one frame, and the first and second multiplexers switch a selection destination a plurality of times in the frame period.

(11) The photodetection device according to (10), in which the control circuit sequentially selects a plurality of rows of the pixel array unit and starts exposure.

(12) The photodetection device according to (10), in which the control circuit selects all pixels of the pixel array unit at a start of the frame period and simultaneously starts exposure, and selects all pixels immediately before an end of the frame period and simultaneously ends exposure.

(13) The photodetection device according to (12), in which the control circuit sequentially selects a plurality of rows of the pixel array unit in the frame period and starts exposure.

(14) The photodetection device according to (12), in which the control circuit selects all the pixels and simultaneously ends the exposure in the frame period, and switches the count interval after completion of reading of all the pixels and then selects all the pixels and simultaneously starts exposure.

(15) The photodetection device according to (14), in which the control circuit simultaneously selects and exposes one of first and second rows sharing a signal line for transmitting a digital signal, and simultaneously selects and exposes another one of the first and second rows during reading of the one digital signal.

(16) The photodetection device according to (1), further including:

a first logic gate that outputs a result of a logic operation on the first and second pulse signals as a first operation result;

a first multiplexer that selects one of a plurality of signals including the first pulse signal and the first operation result and outputs a selected one to the first counter as a first output signal; and a second multiplexer that selects one of the first carry flag and the second pulse signal and outputs a selected one to the second counter as a second output signal, in which the first counter counts in synchronization with the first output signal, and the second counter counts in synchronization with the second output signal.

(17) The photodetection device according to (16), further including a control circuit that controls the first and second sensor units, in which each of the first and second sensor units includes:

an avalanche photodiode; and a recharge transistor that performs recharge to return a cathode potential of the avalanche photodiode to a predetermined potential, the control circuit controls a count interval, which is an interval at which the recharge is performed, to one of a plurality of intervals, the first multiplexer selects the first pulse signal in a case where the count interval is a long interval longer than a predetermined interval, and alternately selects the first and second pulse signals in a case where the count interval is a short interval shorter than the predetermined interval, and the second multiplexer selects the second pulse signal in a case where the count interval is the long interval, and selects the first carry flag in a case where the count interval is the short interval.

(18) The photodetection device according to (16), further including:

a third sensor unit that generates a third pulse signal in response to incidence of photons;

a fourth sensor unit that generates a fourth pulse signal in response to incidence of photons;

a second logic gate that outputs a result of a logic operation on the third and fourth pulse signals as a second operation result;

a third logic gate that outputs a result of a logic operation on an output of each of the first and second logic gates as a third operation result;

a third multiplexer that outputs one of a second carry flag indicating whether or not overflow has occurred, the third pulse signal, and the second operation result as a third output signal;

a third counter that counts a count value in synchronization with the third output signal and outputs a third digital signal indicating the count value and a third carry flag indicating whether or not overflow has occurred;

a fourth multiplexer that outputs one of the third carry flag or the fourth pulse signal as a fourth output signal; and a fourth counter that counts a count value in synchronization with the fourth output signal and outputs a fourth digital signal indicating the count value, in which the first multiplexer selects one of the first pulse signal, the first operation result, and the third operation result, and the second counter further generates the second carry flag.

(19) The photodetection device according to (16), in which the first multiplexer selects the first pulse signal in a case where a non-addition low illuminance mode in which illuminance does not exceed a predetermined value is set, alternately selects the first pulse signal and the first operation result in a case where a non-addition high illuminance mode in which illuminance is higher than the predetermined value is set, and selects the first operation result in a case where an addition mode is set, and the second multiplexer selects the second pulse signal in a case where the non-addition low illuminance mode is set, selects the first carry flag in a case where the non-addition high illuminance mode is set, and selects the first carry flag in a case where the addition mode is set.

(20) The photodetection device according to any one of (1) to (19), in which a part of the first sensor unit and a part of the second sensor unit are arranged on a predetermined pixel chip, and a rest of the first sensor unit, a rest of the second sensor unit, and the first and second counters are arranged on a predetermined circuit chip.

(21) The photodetection device according to any one of (1) to (20), further including a control circuit that controls a plurality of pixels, in which the first sensor unit is arranged in one of first and second pixels among the plurality of pixels, and the second sensor unit is arranged in another pixel, and the control circuit controls some of the plurality of pixels to generate a pulse signal.

REFERENCE SIGNS LIST

100 Imaging device
110 Imaging lens
120 Recording unit
130 Imaging control unit
200 Solid-state imaging element
201 Pixel chip
202 Circuit chip
210 Control circuit
220 Pixel array unit
221 Microlens
230 Signal processing unit
300 Pixel block
301, 302 Pixel
303, 304, 305, 306 r pixel
310, 330, 315, 335 Sensor unit
311, 312, 323, 324, 331, 332, 343, 344 pMOS transistor
313, 333 SPAD
314, 334 Pulse shaping unit
321, 341 Recharge transistor
322, 342 Clip transistor
nMOS transistor 325, 345
326, 346 Buffer
327, 347, 391 to 393 OR (logical sum) gate
328, 348 Resistive element
351 to 356 Multiplexer
360, 365, 370, 375 Counter
361 to 364, 371 to 374 Flip-flop
380, 381 Determiner
12031 Imaging section

The invention claimed is:

1. A photodetection device comprising:

a first sensor circuit that generates a first pulse signal in response to incidence of photons;

a second sensor circuit that generates a second pulse signal in response to incidence of photons;

a first counter that counts a count value in synchronization with one of a plurality of signals including the first and second pulse signals, and outputs a first digital signal indicating the count value and a first carry flag indicating whether or not overflow has occurred;

a second counter that counts a count value in synchronization with one of the first carry flag and the second pulse signal and outputs a second digital signal indicating the count value;

a first multiplexer that selects one of the first and second pulse signals and outputs a selected signal to the first counter as a first output signal; and a second multiplexer that selects one of the first carry flag and the second pulse signal and outputs a selected one to the second counter as a second output signal, wherein the first counter counts in synchronization with the first output signal, the second counter counts in synchronization with the second output signal, the first multiplexer selects the first pulse signal in a case where a low illuminance mode in which illuminance does not exceed a predetermined value is set, and alternately selects the first and second pulse signals in a case where a high illuminance mode in which illuminance is higher than the predetermined value is set, and the second multiplexer selects the second pulse signal in a case where the low illuminance mode is set, and selects the first carry flag in a case where the high illuminance mode is set.

2. The photodetection device according to claim 1, further comprising a determiner circuit that determines whether or not illuminance is higher than the predetermined value on a basis of the first and second digital signals and sets one of the high illuminance mode and the low illuminance mode.

3. The photodetection device according to claim 2, wherein at least one of the first and second counters outputs a specific bit of a digital signal to the determiner circuit, and the determiner circuit sets one of the high illuminance mode and the low illuminance mode on a basis of the specific bit.

4. The photodetection device according to claim 1, wherein the first sensor circuit is arranged in one of first and second pixels of a same color among a plurality of pixels arranged in a pixel array, and the second sensor circuit is arranged in another pixel.

5. The photodetection device according to claim 4, further comprising a microlens that guides incident light to a plurality of pixels of a same color including the first and second pixels.

6. The photodetection device according to claim 1, further comprising:

a first logic gate that outputs a result of a logic operation on the first and second pulse signals as a first operation result;

a first multiplexer that selects one of a plurality of signals including the first pulse signal and the first operation result and outputs a selected one to the first counter as a first output signal; and a second multiplexer that selects one of the first carry flag and the second pulse signal and outputs a selected one to the second counter as a second output signal, wherein the first counter counts in synchronization with the first output signal, and the second counter counts in synchronization with the second output signal.

7. The photodetection device according to claim 1, wherein a part of the first sensor circuit and a part of the second sensor circuit are arranged on a predetermined pixel chip, and a rest of the first sensor circuit, a rest of the second sensor circuit, and the first and second counters are arranged on a predetermined circuit chip.

8. The photodetection device according to claim 1, further comprising a control circuit that controls a plurality of pixels, wherein the first sensor circuit is arranged in one of first and second pixels among the plurality of pixels, and the second sensor circuit is arranged in another pixel, and the control circuit controls some of the plurality of pixels to generate a pulse signal.

9. A photodetection device comprising:

a first sensor circuit that generates a first pulse signal in response to incidence of photons;

a second sensor circuit that generates a second pulse signal in response to incidence of photons;

a first counter that counts a count value in synchronization with one of a plurality of signals including the first and second pulse signals, and outputs a first digital signal indicating the count value and a first carry flag indicating whether or not overflow has occurred; and a second counter that counts a count value in synchronization with one of the first carry flag and the second pulse signal and outputs a second digital signal indicating the count value;

a first multiplexer that selects one of the first and second pulse signals and outputs a selected signal to the first counter as a first output signal;

a second multiplexer that selects one of the first carry flag and the second pulse signal and outputs a selected one to the second counter as a second output signal;

a control circuit that controls the first and second sensor circuits, wherein each of the first and second sensor circuits includes an avalanche photodiode, and a recharge transistor that performs recharge to return a cathode potential of the avalanche photodiode to a predetermined potential, the first counter counts in synchronization with the first output signal, the second counter counts in synchronization with the second output signal, the control circuit controls a count interval, which is an interval at which the recharge is performed, to one of a plurality of intervals, the first multiplexer selects the first pulse signal in a case where the count interval is a long interval longer than a predetermined interval, and alternately selects the first and second pulse signals in a case where the count interval is a short interval shorter than the predetermined interval, and the second multiplexer selects the second pulse signal in a case where the count interval is the long interval, and selects the first carry flag in a case where the count interval is the short interval.

10. The photodetection device according to claim 9, further comprising a determiner circuit that determines, on a basis of the first and second digital signals, whether or not counting of each of the first and second counters is set to be valid in a period in which a count interval is one of the long interval and the short interval, wherein each of the first and second sensor circuits further includes a logic gate that turns off the recharge transistor in a case where it is determined to set counting to be invalid.

11. The photodetection device according to claim 9, wherein the first sensor circuit is arranged in one of a first pixel and a second pixel among a plurality of pixels arranged in a pixel array, and the second sensor circuit is arranged in another pixel, the control circuit switches the count interval a plurality of times in a frame period for imaging one frame, and the first and second multiplexers switch a selection destination a plurality of times in the frame period.

12. The photodetection device according to claim 11, wherein the control circuit sequentially selects a plurality of rows of the pixel array and starts exposure.

13. The photodetection device according to claim 11, wherein the control circuit selects all pixels of the pixel array at a start of the frame period and simultaneously starts exposure, and selects all pixels immediately before an end of the frame period and simultaneously ends exposure.

14. The photodetection device according to claim 13, wherein the control circuit sequentially selects a plurality of rows of the pixel array in the frame period and starts exposure.

15. The photodetection device according to claim 13, wherein the control circuit selects all the pixels and simultaneously ends the exposure in the frame period, and switches the count interval after completion of reading of all the pixels and then selects all the pixels and simultaneously starts exposure.

16. The photodetection device according to claim 15, wherein the control circuit simultaneously selects and exposes one of first and second rows sharing a signal line for transmitting a digital signal, and simultaneously selects and exposes another one of the first and second rows during reading of the one digital signal.

17. A photodetection device comprising:

a first sensor circuit that generates a first pulse signal in response to incidence of photons;

a second sensor circuit that generates a second pulse signal in response to incidence of photons;

a first counter that counts a count value in synchronization with one of a plurality of signals including the first and second pulse signals, and outputs a first digital signal indicating the count value and a first carry flag indicating whether or not overflow has occurred;

a second counter that counts a count value in synchronization with one of the first carry flag and the second pulse signal and outputs a second digital signal indicating the count value;

a first logic gate that outputs a result of a logic operation on the first and second pulse signals as a first operation result;

a first multiplexer that selects one of a plurality of signals including the first pulse signal and the first operation result and outputs a selected one to the first counter as a first output signal;

a second multiplexer that selects one of the first carry flag and the second pulse signal and outputs a selected one to the second counter as a second output signal, wherein the first counter counts in synchronization with the first output signal, and the second counter counts in synchronization with the second output signal; and a control circuit that controls the first and second sensor circuits, wherein each of the first and second sensor circuits includes an avalanche photodiode, and a recharge transistor that performs recharge to return a cathode potential of the avalanche photodiode to a predetermined potential, the control circuit controls a count interval, which is an interval at which the recharge is performed, to one of a plurality of intervals, the first multiplexer selects the first pulse signal in a case where the count interval is a long interval longer than a predetermined interval, and alternately selects the first and second pulse signals in a case where the count interval is a short interval shorter than the predetermined interval, and the second multiplexer selects the second pulse signal in a case where the count interval is the long interval, and selects the first carry flag in a case where the count interval is the short interval.

18. A photodetection device comprising:

a first sensor circuit that generates a first pulse signal in response to incidence of photons;

a second sensor circuit that generates a second pulse signal in response to incidence of photons;

a first counter that counts a count value in synchronization with one of a plurality of signals including the first and second pulse signals, and outputs a first digital signal indicating the count value and a first carry flag indicating whether or not overflow has occurred;

a second counter that counts a count value in synchronization with one of the first carry flag and the second pulse signal and outputs a second digital signal indicating the count value;

a first logic gate that outputs a result of a logic operation on the first and second pulse signals as a first operation result;

a first multiplexer that selects one of a plurality of signals including the first pulse signal and the first operation result and outputs a selected one to the first counter as a first output signal;

a second multiplexer that selects one of the first carry flag and the second pulse signal and outputs a selected one to the second counter as a second output signal, wherein the first counter counts in synchronization with the first output signal, and the second counter counts in synchronization with the second output signal; and a third sensor circuit that generates a third pulse signal in response to incidence of photons;

a fourth sensor circuit that generates a fourth pulse signal in response to incidence of photons;

a second logic gate that outputs a result of a logic operation on the third and fourth pulse signals as a second operation result;

a third logic gate that outputs a result of a logic operation on an output of each of the first and second logic gates as a third operation result;

a third multiplexer that outputs one of a second carry flag indicating whether or not overflow has occurred, the third pulse signal, and the second operation result as a third output signal;

a third counter that counts a count value in synchronization with the third output signal and outputs a third digital signal indicating the count value and a third carry flag indicating whether or not overflow has occurred;

a fourth multiplexer that outputs one of the third carry flag or the fourth pulse signal as a fourth output signal; and a fourth counter that counts a count value in synchronization with the fourth output signal and outputs a fourth digital signal indicating the count value, wherein the first multiplexer selects one of the first pulse signal, the first operation result, and the third operation result, and the second counter further generates the second carry flag.

19. A photodetection device comprising:

a first sensor circuit that generates a first pulse signal in response to incidence of photons;

a second sensor circuit that generates a second pulse signal in response to incidence of photons;

a first counter that counts a count value in synchronization with one of a plurality of signals including the first and second pulse signals, and outputs a first digital signal indicating the count value and a first carry flag indicating whether or not overflow has occurred;

a second counter that counts a count value in synchronization with one of the first carry flag and the second pulse signal and outputs a second digital signal indicating the count value;

a first logic gate that outputs a result of a logic operation on the first and second pulse signals as a first operation result;

a first multiplexer that selects one of a plurality of signals including the first pulse signal and the first operation result and outputs a selected one to the first counter as a first output signal; and a second multiplexer that selects one of the first carry flag and the second pulse signal and outputs a selected one to the second counter as a second output signal, wherein the first counter counts in synchronization with the first output signal, and the second counter counts in synchronization with the second output signal, the first multiplexer selects the first pulse signal in a case where a non-addition low illuminance mode in which illuminance does not exceed a predetermined value is set, alternately selects the first pulse signal and the first operation result in a case where a non-addition high illuminance mode in which illuminance is higher than the predetermined value is set, and selects the first operation result in a case where an addition mode is set, and the second multiplexer selects the second pulse signal in a case where the non-addition low illuminance mode is set, selects the first carry flag in a case where the non-addition high illuminance mode is set, and selects the first carry flag in a case where the addition mode is set.

* * * * *